US009601880B2

(12) United States Patent
Rynaski et al.

(10) Patent No.: US 9,601,880 B2
(45) Date of Patent: Mar. 21, 2017

(54) CABLE ASSEMBLIES AND ASSOCIATED SYSTEMS AND METHODS

(71) Applicant: Ortronics, Inc., New London, CT (US)

(72) Inventors: Chester H. Rynaski, Franklin, CT (US); Gregg J. LaFontaine, Lebanon, CT (US); Kenneth A. Cupples, Lebanon, CT (US); Adam Murano, San Marcos, CA (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 14/739,434

(22) Filed: Jun. 15, 2015

(65) Prior Publication Data

US 2015/0280363 A1 Oct. 1, 2015

Related U.S. Application Data

(63) Continuation-in-part of application No. 13/838,740, filed on Mar. 15, 2013, now abandoned, which is a (Continued)

(51) Int. Cl.
*H01R 13/72* (2006.01)
*B65H 75/36* (2006.01)

(Continued)

(52) U.S. Cl.
CPC .......... *H01R 13/72* (2013.01); *B65H 75/364* (2013.01); *B65H 75/4402* (2013.01);

(Continued)

(58) Field of Classification Search
USPC .... 439/799, 501, 528, 131, 4, 502; 191/12.4
See application file for complete search history.

(56) References Cited

U.S. PATENT DOCUMENTS 2,182,446 A 12/1939 Nelson
2,976,374 A * 3/1961 Poulsen ................ H02G 11/02 191/12.4

(Continued)

OTHER PUBLICATIONS

ProFlex Package, REELEX Packaging Solutions, Inc., Patterson, NY, USA, available at http://www.reelex.com/Literature/Product%20Sheets/Packaging%20Info%20Sheets/ProFlex%20Package.pdf.

(Continued)

*Primary Examiner* — Alexander Gilman
(74) *Attorney, Agent, or Firm* — McCarter & English, LLP

(57) ABSTRACT

Cable assemblies, methods and systems are provided that generally include a first patch cord, a second patch cord and a third patch cord that are removably positioned within a housing for packaging and payout thereof. The first patch cord includes a first elongated cord and a first connector mounted with respect to one end of the first elongated cord. The second patch cord generally includes a second elongated cord and a second connector mounted with respect to one end of the second elongated cord. The third patch cord generally includes a third elongated cord and a third connector mounted with respect to one end of the third elongated cord. The patch cord assemblies generally include a first coupler element for detachably securing the first patch cord relative to the second patch cord. A second coupler element is provided for detachably securing the second patch cord relative to the third patch cord.

11 Claims, 54 Drawing Sheets

Related U.S. Application Data continuation-in-part of application No. 13/630,485, filed on Sep. 28, 2012, now abandoned, which is a continuation-in-part of application No. 13/399,371, filed on Feb. 17, 2012, now Pat. No. 8,758,046, said application No. 14/739,434 is a continuation-in-part of application No. 14/210,665, filed on Mar. 14, 2014, now abandoned.

(60) Provisional application No. 61/557,108, filed on Nov. 8, 2011, provisional application No. 61/793,130, filed on Mar. 15, 2013.

(51) Int. Cl.

| | |
|---|---|
| ***B65H 75/44*** | (2006.01) |
| ***H01R 13/60*** | (2006.01) |
| *H01R 24/64* | (2011.01) |
| *H01R 43/26* | (2006.01) |

(52) U.S. Cl.

CPC ......... *B65H 75/4471* (2013.01); *H01R 13/60* (2013.01); *B65H 2701/34* (2013.01); *H01R 24/64* (2013.01); *H01R 43/26* (2013.01); *Y10T 29/49204* (2015.01)

(56) References Cited

U.S. PATENT DOCUMENTS

| | | | | |
|---|---|---|---|---|
| 2,987,690 A | | 6/1961 | Marbais | |
| 3,773,987 A | * | 11/1973 | Davis | B65H 75/4431 191/12.4 |
| 3,815,078 A | * | 6/1974 | Fedrick | H02G 11/02 174/135 |
| 3,826,879 A | * | 7/1974 | Penn | A47L 9/26 191/12.2 R |
| 4,077,586 A | * | 3/1978 | Thomas | B65D 85/04 242/129.5 |
| 4,258,834 A | | 3/1981 | Hawley et al. | |
| 4,384,688 A | * | 5/1983 | Smith | B65H 75/4434 191/12.2 R |
| 4,405,827 A | * | 9/1983 | Mixon, Jr. | F16G 11/00 174/84 C |
| D283,221 S | | 4/1986 | West | |
| 4,713,497 A | * | 12/1987 | Smith | H02G 11/02 191/12.2 R |
| 5,103,068 A | * | 4/1992 | Schrader | H01R 4/186 174/71 R |
| 5,261,625 A | * | 11/1993 | Lanoue | B65H 49/322 242/129.62 |
| 5,421,501 A | | 6/1995 | Haines | |
| 5,560,390 A | * | 10/1996 | Royds | B65H 75/38 137/355.12 |
| 5,679,925 A | * | 10/1997 | Dilley | H02G 11/02 174/53 |
| 5,701,981 A | * | 12/1997 | Marshall | H02G 11/02 191/12.4 |
| 5,732,445 A | | 3/1998 | Stodolka et al. | |
| 5,892,177 A | | 4/1999 | Mazaris | |
| 5,923,147 A | * | 7/1999 | Martensson | B60L 11/1818 320/111 |
| D434,002 S | | 11/2000 | Rossman et al. | |
| 6,198,046 B1 | | 3/2001 | Moodie | |
| 6,224,433 B1 | * | 5/2001 | Chadbourne | H01R 4/186 174/71 R |
| D445,766 S | | 7/2001 | Solomon | |
| 6,309,239 B1 | | 10/2001 | Johnston | |
| 6,353,181 B1 | | 3/2002 | Jarry et al. | |
| 6,428,348 B1 | | 8/2002 | Bean | |
| 6,503,097 B2 | | 1/2003 | Archambault | |
| 6,538,205 B2 | | 3/2003 | Ueno | |
| 6,567,277 B1 | | 5/2003 | Doherty et al. | |
| 6,699,060 B1 | * | 3/2004 | Scott | H01R 13/6395 439/373 |
| 6,746,272 B2 | | 6/2004 | Bean | |
| 6,780,021 B1 | * | 8/2004 | Owen | H01R 13/72 439/35 |
| D495,999 S | | 9/2004 | Lewis | |
| 6,905,374 B2 | | 6/2005 | Milan | |
| 6,979,221 B1 | | 12/2005 | Hunter | |
| 7,123,716 B2 | | 10/2006 | Jozitis et al. | |
| 7,172,456 B1 | | 2/2007 | Nagy | |
| 7,182,624 B1 | | 2/2007 | Miller | |
| 7,186,151 B2 | | 3/2007 | Komiyama | |
| 7,230,181 B2 | | 6/2007 | Simmons et al. | |
| 7,293,895 B2 | | 11/2007 | Grossman et al. | |
| 7,393,242 B1 | | 7/2008 | Saje | |
| 7,407,405 B1 | | 8/2008 | Slenczka | |
| 7,419,309 B2 | | 9/2008 | Faika et al. | |
| 7,442,067 B1 | | 10/2008 | Amaral | |
| 7,465,182 B1 | | 12/2008 | McDonald | |
| 7,470,141 B2 | | 12/2008 | Yoest | |
| 7,607,618 B2 | * | 10/2009 | Mori | H02G 3/32 248/51 |
| 7,754,968 B2 | * | 7/2010 | Fallstrom | H01R 4/183 174/84 C |
| 7,811,117 B2 | | 10/2010 | Andrade | |
| 7,815,025 B2 | | 10/2010 | Chen et al. | |
| 7,887,360 B2 | | 2/2011 | Andrade | |
| 8,011,950 B2 | | 9/2011 | McGrath et al. | |
| 8,137,135 B2 | | 3/2012 | Lee et al. | |
| 8,203,077 B2 | | 6/2012 | Honeycutt et al. | |
| 8,267,706 B2 | | 9/2012 | Patel et al. | |
| 8,348,685 B2 | | 1/2013 | Liao et al. | |
| 8,348,695 B2 | | 1/2013 | Puzio et al. | |
| 8,353,719 B2 | * | 1/2013 | Watts | H01R 13/52 439/528 |
| 8,399,769 B2 | | 3/2013 | Doll | |
| 8,447,062 B2 | | 5/2013 | Lin | |
| 8,535,082 B2 | | 9/2013 | Lifson | |
| 8,615,849 B2 | | 12/2013 | Rothbaum et al. | |
| 8,758,046 B2 | * | 6/2014 | Pezzetti | H01R 13/60 439/527 |
| 8,802,991 B1 | | 8/2014 | Hua et al. | |
| 8,869,345 B2 | * | 10/2014 | Conrad | A47L 5/362 15/327.2 |
| 2008/0256761 A1 | | 10/2008 | Bukoski | |
| 2011/0039446 A1 | | 2/2011 | Maass | |
| 2013/0115806 A1 | | 5/2013 | Pezzetti et al. | |
| 2013/0210264 A1 | | 8/2013 | Rynaski et al. | |
| 2014/0263815 A1 | | 9/2014 | LaFontaine et al. | |

OTHER PUBLICATIONS

PCT International Search Report and PCT Written Opinion from PCT/US2013/049869 dated Dec. 17, 2013.
PCT International Search Report and PCT Written Opinion from PCT/US2013/061922 dated Feb. 28, 2014.
PCT International Search Report and PCT Written Opinion from PCT/US2014/025309 dated Jul. 8, 2014.
"Pigtail", Atis Telecom Glossary, Sep. 27, 2011.
U.S. Appl. No. 61/793,130, filed Mar. 15, 2013.
U.S. Appl. No. 61/557,108, filed Nov. 8, 2011.

* cited by examiner

CABLE ASSEMBLIES AND ASSOCIATED SYSTEMS AND METHODS

CROSS-REFERENCE TO RELATED APPLICATIONS

The present application is a continuation-in-part application that claims priority benefit to commonly assigned non-provisional patent application entitled "Cable Assemblies, Methods and Systems," filed with the U.S. Patent and Trademark Office on Mar. 15, 2013, and assigned Ser. No. 13/838,740, which in turn is a continuation-in-part application that claims priority benefit to a non-provisional patent application entitled "Patch Cord Assemblies, Methods and Systems," filed with the U.S. Patent and Trademark Office on Sep. 28, 2012, and assigned Ser. No. 13/630,485, which claims priority to a non-provisional patent application entitled "Patch Cord Assemblies, Methods and Systems," filed with the U.S. Patent and Trademark Office on Feb. 17, 2012, and assigned Ser. No. 13/399,371, which, in turn, claims priority to a provisional patent application entitled "Patch Cord Assembly and Method," filed with the U.S. Patent and Trademark Office on Nov. 8, 2011, and assigned Ser. No. 61/557,108. The present application is also a continuation-in-part application claiming priority benefit to commonly assigned non-provisional patent application entitled "Cable Assemblies and Associated Systems and Methods," filed with the U.S. Patent and Trademark Office on Mar. 14, 2014, and assigned Ser. No. 14/210,665, which, in turn, claims priority to a provisional patent application entitled "Cable Assemblies and Associated Systems and Methods," filed with the U.S. Patent and Trademark Office on Mar. 15, 2013, and assigned Ser. No. 61/793,130. The entire content of the foregoing non-provisional and provisional patent applications is incorporated herein by reference.

BACKGROUND

1. Technical Field

The present disclosure is directed generally to patch cord assemblies, associated methods and systems and, more particularly, to daisy chain patch cord assemblies, associated methods and patch cord assembly packaging and payout systems.

2. Background Art

Cables, e.g., patch cords, fiber optic cables, and the like, are generally used in a variety of settings to create electrical connections for communication between electronic devices, e.g., networking between switches, servers, storage devices, etc. In packaging/supplying cables to the trade, manufacturers generally package cables individually, e.g., in plastic packaging. In addition, the site preparation prior to installation of cables generally requires an inventory of necessary cables to be allocated, the cables to be sorted, removed from their unit packaging, unbundled, and finally uncoiled in order to make the connection. Thus, large amounts of material are typically wasted in packaging cables and each cables must be individually removed prior to installation, thereby slowing the installation process and generally inconveniencing the installer. In an industry where large numbers of cables may be required for installation at one time, individually removing cables from individual packages can lead to lengthy installation times.

Thus, a need exists for cables assemblies, methods and systems that facilitate cost effective packaging and/or efficient cables access and installation in the field. These and other needs are addressed by the assemblies, methods and systems of the present disclosure.

SUMMARY

In accordance with embodiments of the present disclosure, cable assemblies, e.g., patch cord assemblies, and methods are disclosed that generally involve "daisy chain" assembly and/or packaging of cables. Although described herein as patch cord assemblies, it should be understood that a variety of cables can be used, i.e., cables with a variety of connectors, such as plugs, jacks, and the like. For example, in addition to including two plugs attached at opposing ends to an elongated cord, the cable can include, e.g., a plug attached at one end and a jack attached at an opposing end of an elongated cord, a jack attached at one end and a jack attached at an opposing end of the elongated cord, and the like. An exemplary patch cord assembly as disclosed herein generally includes a first patch cord, a second patch cord and a first coupler element that detachably secures the first patch cord relative to the second patch cord. The first patch cord generally includes a first elongated cord and a first plug mounted with respect to one end of the first elongated cord. The second patch cord generally includes a second elongated cord and a second plug mounted with respect to one end of the second elongated cord. The first coupler element is configured and dimensioned to detachably secure the first patch cord relative to the second patch cord with the first plug and the second plug in a juxtaposed relation. The exemplary embodiments of the first coupler element described herein include, but are not limited to, a first band element, a first and second band element, a sleeve element, an I-shaped coupler, first and second loops, first and second covers, a ring, first and second latches, a bit and a wedge, and the like. At the point/time of installation, the first coupler element may be removed from the first patch cord and/or the second patch cord to permit convenient and efficient access to such patch cord for field installation. The disclosed exemplary patch cord assembly, therefore, allows a more cost effective and efficient packaging, removal and installation of patch cords. In particular, the disclosed patch cord assembly addresses at least the organization of the batch of cables required by job and category, reduces the handling time prior to point-to-point connection, and minimizes the amount of refuse created from packaging.

In accordance with embodiments of the present disclosure, another exemplary patch cord assembly as disclosed herein generally includes a first patch cord, a second patch cord and a first coupler element, configured as a first band element, that detachably secures the first patch cord relative to the second patch cord. The first patch cord generally includes a first elongated cord and a first plug mounted with respect to one end of the first elongated cord. The second patch cord generally includes a second elongated cord and a second plug mounted with respect to one end of the second elongated cord. The first band element is configured and dimensioned to detachably secure the first patch cord relative to the second patch cord with the first plug and the second plug in an opposing, spaced relation.

In accordance with embodiments of the present disclosure, methods for patch cord assembly are also provided. The disclosed exemplary methods generally involve detachably securing a first patch cord relative to a second patch cord. An exemplary method of patch cord assembly as disclosed herein includes detachably securing a first patch cord relative to a second patch cord using a first coupler element, configured as a first band element. The first patch cord generally includes a first elongated cord and a first plug mounted with respect to one end of the first elongated cord. The second patch cord generally includes a second elongated cord and a second plug mounted with respect to one end of the second elongated cord. In assembling the disclosed exemplary patch cord assembly, the first band element is generally used to detachably secure the first patch cord relative to the second patch cord, generally with the first plug and the second plug in a juxtaposed relation, e.g., an opposing, spaced relation. The disclosed exemplary method of patch cord assembly, therefore, allows a more cost effective and efficient packaging, removal and installation of patch cords.

In accordance with further embodiments of the present disclosure, the first band element is generally effective to maintain the first patch cord and the second patch cord in a relatively stable configuration/orientation such that the first plug and the second plug are in confronting or opposing spaced relation. Thus, the first plug and the second plug may be positioned and maintained in a common plane by the first band element. The spacing between the first plug and the second plug ensures that the respective plugs are not damaged during storage and/or shipment, e.g., through undesirable and uncontrolled contact therebetween. In addition, the substantially planar relationship between the first and second plugs—which is maintained by the first band element—facilitates efficient "stacking" of patch cord assemblies of the present disclosure, e.g., in a shipping box or the like.

The disclosed exemplary patch cord assembly may include additional structures and/or features in connection with the detachable securement described herein. For example, the patch cord assembly may include one or more spacer elements positioned between (or at least partially between) the first and second plugs, such spacer element(s) advantageously functioning to further prevent inadvertent or undesirable contact between the first and second plugs. The spacer element(s) may also further facilitate maintenance of the first and second plugs in a substantially planar relationship. The spacer element(s) may be integrally formed with the first band element, mounted with respect to the first band element and/or separate/distinct from the first band element.

In exemplary embodiments, the first band element may generally include an elongated strip that extends between first and second mounting positions defined on the first and second patch cords, respectively. The first band element may further include first and second loop structures which are configured and dimensioned to be detachably positioned around the first and second patch cords. Detachment may be achieved by tearing or otherwise breaking the structural continuity of the first band element, e.g., along score lines defined at desired detachment location(s). In addition, the first and second patch cords may be released from each other by tearing or separating one from the other along one or more score lines defined on the first band element.

In accordance with another embodiment of the present disclosure, the patch cord assembly may generally further include a second coupler element, configured as a second band element, which is configured and dimensioned for detachably securing the first patch cord relative to the second patch cord with the first plug and the second plug in an opposing, spaced relation. Specifically, the second band element may be dimensionally equal to the first band element and, in exemplary embodiments, the second band element may be disposed substantially opposite relative to the first band element, such that the first band element and the second band element together define a substantially rectangular configuration.

In accordance with another embodiment of the present disclosure, the patch cord assembly may generally further include a first coupler element configured as a sleeve element. Specifically, the sleeve element may have a substantially symmetrical rectangular or box-shaped configuration, including a first and second sleeve opening dimensioned for insertion of the first and second patch cords. Further, the sleeve element may include notches to lock-in and secure the first and second plug and prevent the first and second plug from being pulled out. The sleeve element may be manufactured from a thin cardboard, paper, plastic or similar material in order to be "knocked down" flat for more advantageous storage or transport.

In accordance with another embodiment of the present disclosure, the patch cord assembly may generally further include a first coupler element configured as an I-shaped coupler. Specifically, the I-shaped coupler may have a substantially symmetrical structure, including a first and second passage for receiving the first and second plug. Further, the I-shaped coupler may include notches for locking-in and securing the first and second plug to prevent the first and second plug from being pulled out of the I-shaped coupler.

In accordance with yet another embodiment of the present disclosure, the patch cord assembly and methods may generally include detachably securing a first plug of a first patch cord in juxtaposed relation to a second plug of a second patch cord by utilizing a first coupler element to detachably secure the first plug to the second plug. Further, another exemplary embodiment of the present disclosure may generally include detachably securing the first patch cord in juxtaposed relation to the second patch cord by utilizing a first coupler element to detachably secure a first elongated cord of the first patch cord to a second elongated cord of the second patch cord. As would be understood by those of ordinary skill in the art, the juxtaposed relation of the first patch cord relative to the second patch cord may be, but is not limited to, e.g., opposed, spaced relation, side-by-side relation, and the like. In addition, in accordance with the embodiments of the present disclosure described herein, the patch cord assembly may generally include the first coupler element detachably securing the first patch cord in juxtaposed relation to the second patch cord by securing the first and second plugs, securing the first and second elongated cords, allowing the first and second plugs to pass each other and securing the first and second elongated cords, a combination of the above, and the like.

In accordance with the embodiments of the present disclosure, a system of patch cord assembly packaging and payout is also provided, generally including a housing for packaging and payout of at least one patch cord assembly. As would be understood by those of ordinary skill in the art, the at least one patch cord assembly can be, for example, any patch cord assembly described herein. Specifically, the at least one patch cord assembly generally includes at least a first patch cord that includes a first elongated cord and a first plug mounted with respect to one end of said first elongated cord, at least a second patch cord that includes a second elongated cord and a second plug mounted with respect to one end of said second elongated cord, and at least a first coupler element for detachably securing the at least first patch cord relative to the at least second patch cord with the first plug and the second plug in a juxtaposed relation. The system generally further includes at least one housing opening for paying out the at least first patch cord configured and dimensioned to prevent the at least first patch cord from receding back into the housing. The housing can optionally include at least a first coupler element remover and the at least first and second patch cords are generally continuously reeled within the housing around a rotating core.

In accordance with embodiments of the present disclosure, exemplary patch cord assemblies are provided that generally include a first patch cord that includes a first elongated cord and a first plug mounted with respect to one end of said first elongated cord. The exemplary assemblies generally include a second patch cord that includes a second elongated cord and a second plug mounted with respect to one end of said second elongated cord. Further, the exemplary assemblies generally include a first coupler element for detachably securing the first patch cord relative to the second patch cord with the first plug and the second plug in an adjoining relation.

The adjoining relation of the first and second plugs can define, e.g., a substantially co-planar orientation, an opposed relation, a side-by-side relation, and the like. The first coupler element can be configured as at least one of, e.g., a keyway mechanism, a V-groove mechanism, a male/female mechanism, and the like. The male/female mechanism generally includes a male components and a female components configured and dimensioned to slidably interact in a detachable manner to secure the first plug and the second plug. The male component generally defines a protrusion, e.g., a T-shaped protrusion, a fin-shaped protrusion, and the like. The female component generally defines a groove, e.g., a channel, cavity, recess, receiving feature and/or surface, slot, and the like. In some exemplary embodiments, the patch cord assemblies can include at least one spacer element removably positioned on the first plug and the second plug. The at least one spacer element generally functions to substantially prevent damage to the first and second plugs.

In accordance with embodiments of the present disclosure, exemplary methods of patch cord assembly are provided that generally include detachably securing a first patch cord relative to a second patch cord using a first coupler element. The first patch cord generally includes a first elongated cord and a first plug mounted with respect to one end of said first elongated cord. The second patch cord generally includes a second elongated cord and a second plug mounted with respect to one end of said second elongated cord. The first plug and the second plug are generally detachably secured in an adjoining relation.

The adjoining relation of the first and second plugs generally defines a substantially co-planar orientation. The first coupler element can be configured as at least one of, e.g., a keyway mechanism, a V-groove mechanism, a male/female mechanism, and the like. The male/female mechanism generally includes a male component and a female component configured and dimensioned to slidably interact in a detachable manner to secure the first plug and the second plug. The exemplary method generally includes removably positioning at least one spacer element on the first and second plugs. The at least one spacer element generally functions to substantially prevent damage to the first and second plugs.

In accordance with embodiments of the present disclosure, exemplary systems of patch cord assembly packaging and payout are provided that generally include a housing for packaging and payout of at least one patch cord assembly. The at least one patch cord assembly generally includes at least a first patch cord that includes a first elongated cord and a first plug mounted with respect to one end of said first elongated cord. The exemplary patch cord assembly generally includes at least a second patch cord that includes a second elongated cord and a second plug mounted with respect to one end of said second elongated cord. The exemplary patch cord assembly generally further includes at least a first coupler element for detachably securing the at least first patch cord relative to the at least second patch cord with the first plug and the second plug in an adjoining relation. The exemplary system generally includes at least one housing opening for paying out the at least first patch cord.

The at least one housing opening can be configured and dimensioned to prevent the at least first patch cord from receding back into the housing. The housing generally includes at least a first coupler element remover. The at least first coupler element remover can be configured and dimensioned to separate the at least first patch cord and the at least second patch cord. In some exemplary embodiments, the at least first and second patch cords can be continuously reeled within the housing around a rotating core. The rotating core can include at least one partition. The at least one partition generally separates and/or permits independent rotation of at least a first patch cord assembly relative to a second patch cord assembly. The at least one housing opening can include a slot configured and dimensioned to prevent the at least first patch cord from receding back into the housing. The housing can include a handle configured and dimensioned to permit lifting of the housing. In some exemplary embodiments, the at least first and second patch cords can be continuously coiled within the housing for dispensing from, e.g., an outer coil diameter, an inner coil diameter, and the like.

In accordance with embodiments of the present disclosure, exemplary cable assemblies are provided that generally include a first cable and a second cable. The first cable generally includes a first elongated cord and a first connector mounted with respect to one end of the first elongated cord. The second cable generally includes a second elongated cord and a second connector mounted with respect to one end of the second elongated cord. The first connector can be disposed in an opposing direction relative to the second connector. The first connector is positioned adjacent to the second elongated cord and the second connector is positioned adjacent to the first elongated cord. The cable assemblies generally include at least one coupler element for maintaining the first connector positioned adjacent to the second elongated cord and the second connector positioned adjacent to the first elongated cord.

The at least one coupler element can detachably secure, e.g., the first connector to the second elongated cord, the second connector to the first elongated cord, the first elongated cord to the second elongated cord, combinations thereof, and the like. The at least one coupler element can be at least one of adhesive tape, Velcro®, and a clip. The first connector and the second connector can be at least one of a plug or a jack. The cable assemblies generally include at least one spacer element removably positioned between at least one of the first connector and the second elongated cord, the second connector and the first elongated cord, and the first elongated cord and the second elongated cord.

In accordance with embodiments of the present disclosure, exemplary methods of cable assembly are provided that generally include providing a first cable and a second cable. The first cable includes a first elongated cord and a first connector mounted with respect to one end of the first elongated cord. The second cable includes a second elongated cord and a second connector mounted with respect to one end of the second elongated cord. The methods generally include positioning the first connector in an opposing direction relative to the second connector. The methods further include positioning the first connector adjacent to the second elongated cord and positioning the second connector adjacent to the first elongated cord. In general, the methods include maintaining the first connector positioned adjacent to the second elongated cord and the second connector positioned adjacent to the first elongated cord with at least one coupler element.

The methods include detachably securing, e.g., the first connector to the second elongated cord, the second connector to the first elongated cord, the first elongated cord to the second elongated cord, combinations thereof, and the like, with the at least one coupler element. The methods generally include removably positioning at least one spacer element between at least one of the first connector and the second elongated cord, the second connector and the first elongated cord, and the first elongated cord and the second elongated cord.

In accordance with embodiments of the present disclosure, exemplary systems of cable assembly packaging and payout are provided that generally include at least one support structure for packaging and payout of at least one cable assembly. The at least one cable assembly generally includes a first cable and a second cable. The first cable includes a first elongated cord and a first connector mounted with respect to one end of the first elongated cord. The second cable includes a second elongated cord and a second connector mounted with respect to one end of the second elongated cord. The first connector can be disposed in an opposing direction relative to the second connector. The first connector can be positioned adjacent to the second elongated cord and the second connector can be positioned adjacent to the first elongated cord. The cable assembly generally includes at least one coupler element for maintaining the first connector positioned adjacent to the second elongated cord and the second connector adjacent to the first elongated cord.

The systems can include a housing. The housing can include at least one opening for paying out at least the first cable of the at least one cable assembly. The system can include a first cable assembly and a second cable assembly. In some embodiments, the housing can include a force-imparting structure, e.g., a spring-loaded coupler, for maintaining the first cable assembly in engagement with the second cable assembly due to a frictional cooperation. The spring-loaded coupler can be at least one of a wheel and a bladder. The force-imparting structure generally creates a constriction point through which the first cable assembly and the second cable assembly pass.

The at least one support structure can be, e.g., a spindle, and the like. The housing can be configured and dimensioned to receive the at least one support structure for dispensing the at least one cable assembly therefrom. The system can include at least one counter mechanism. The counter mechanism can be at least partially aligned with a path of motion of each of the at least one cable assembly. The at least one counter can be actuated to count down upon payout of each cable of the at least one cable assembly. For example, the at least one counter counts down from a total number of cable assemblies to zero. The housing can include a window for visualizing an interior of the housing. The housing can also include an anti-movement feature, e.g., a textured surface, a friction surface, Velcro®, combinations thereof, and the like, on a bottom side of the housing to prevent movement of the housing when cable assemblies as dispensed therefrom.

In accordance with embodiments of the present disclosure, exemplary cable assemblies are provided that generally include a first cable and a second cable. The first cable generally includes a first elongated cord and a first connector mounted with respect to one end of the first elongated cord. The second cable generally includes a second elongated cord and a second connector mounted with respect to one end of the second elongated cord. The cable assemblies include a first coupler element for detachably securing the first cable relative to the second cable with the first connector and the second connector in a juxtaposed relation, e.g., an adjoining relation, an opposed relation, a side-by-side relation, a co-planar relation, a spaced relation, a passing relation, combinations thereof, and the like. The first connector and the second connector can be at least one of a plug and a jack.

In accordance with embodiments of the present disclosure, exemplary methods of cable assembly are provided that generally include detachably securing a first cable relative to a second cable using a coupler element. The first cable generally includes a first elongated cord and a first connector mounted with respect to one end of the first elongated cord. The second cable generally includes a second elongated cord and a second connector mounted with respect to one end of the second elongated cord. The first connector and the second connector can be detachably secured in a juxtaposed relation.

In accordance with embodiments of the present disclosure, exemplary systems of cable assembly packaging and payout are provided that generally include at least one support structure for packaging and payout of at least one cable assembly. The at least one cable assembly generally includes a first cable and a second cable. The first cable generally includes a first elongated cord and a first connector mounted with respect to one end of the first elongated cord. The second cable generally includes a second elongated cord and a second connector mounted with respect to one end of the second elongated cord. The at least one cable assembly generally includes a coupler element for detachably securing the first cable relative to the second cable with the first connector and the second connector in a juxtaposed relation.

Although the embodiments of the present disclosure are generally described with reference to patch cord assemblies, associated methods and systems, it should be apparent to one of ordinary skill in the art that the disclosed assemblies/methods/systems could be utilized with a variety of other cord-based structures, e.g., Category 5, Category 6, Category 6A, fiber optic cables, and the like.

Additional features, functions and benefits of the disclosed patch cord assembly and method will be apparent from the detailed description which follows, particularly when read in conjunction with the appended figures.

BRIEF DESCRIPTION OF FIGURES

To assist those of skill in the art in making and using the disclosed patch cord assemblies and associated methods, reference is made to the accompanying figures wherein.

DESCRIPTION OF EXEMPLARY EMBODIMENT(S)

Figures 1, 2:
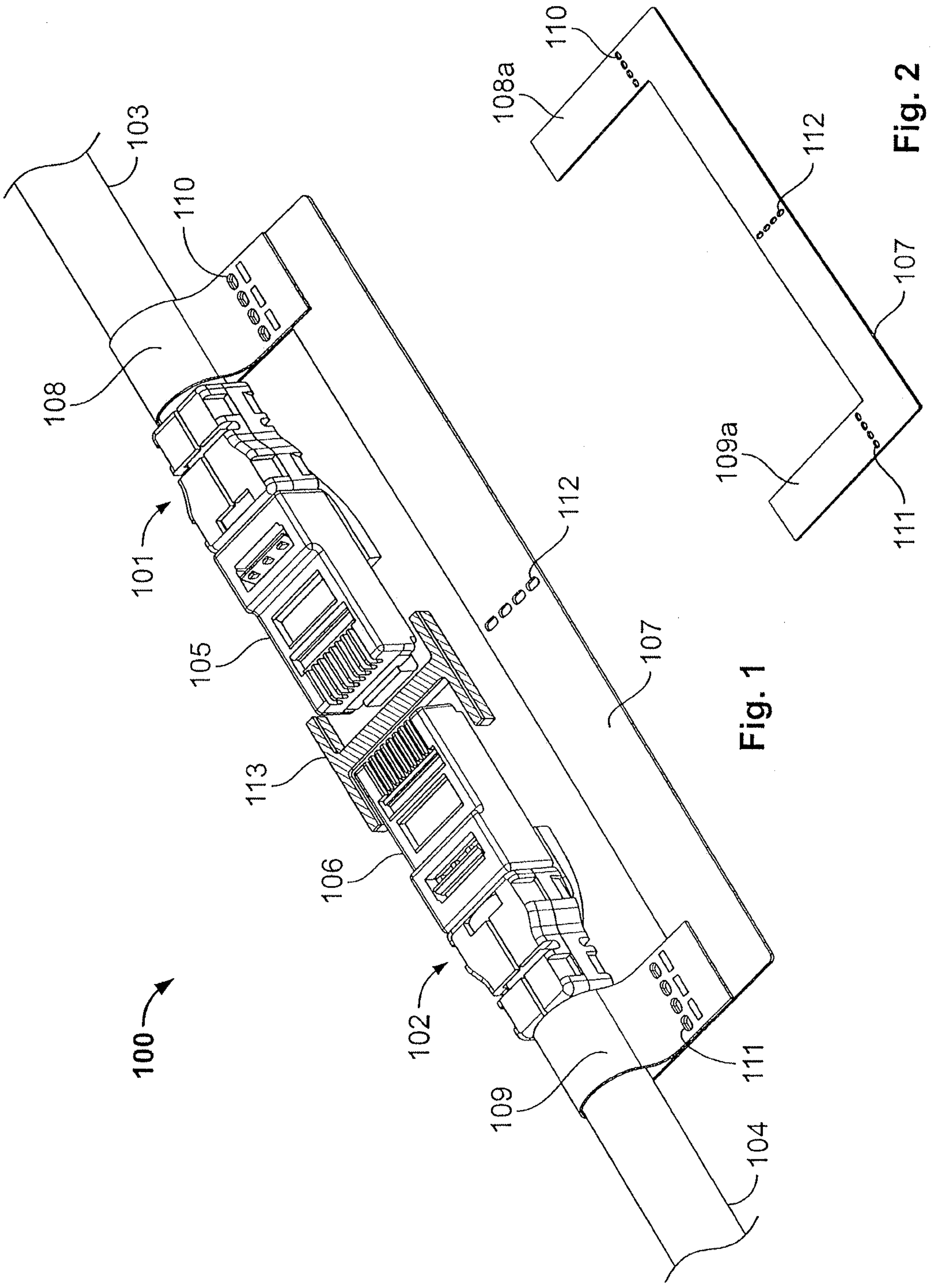
FIG. 1 is a view of an exemplary patch cord assembly with a first coupler element configured as a first band element.
FIG. 2 is a view of an exemplary first band element.

In accordance with embodiments of the present disclosure, patch cord assemblies and associated methods disclosed herein generally involve daisy chain assembly for patch cords. An exemplary patch cord assembly as disclosed herein includes a first patch cord, a second patch cord and a first coupler element. The first patch cord includes a first elongated cord and a first plug mounted with respect to one end of said first elongated cord. The second patch cord includes a second elongated cord and a second plug mounted with respect to one end of said second elongated cord. Thus, the first coupler element detachably secures the first patch cord relative to the second patch cord with the first plug and the second plug in a juxtaposed relation. With reference to FIG. 1, an exemplary embodiment of a patch cord assembly is depicted in accordance with the present disclosure in the form of a patch cord assembly 100. The patch cord assembly 100 generally includes a first patch cord 101 and a second patch cord 102. The first patch cord 101 generally includes a first elongated cord 103 and a first plug 105 mounted with respect to one end of said first elongated cord 103. The second patch cord 102 generally includes a second elongated cord 104 and a second plug 106 mounted with respect to one end of said second elongated cord 104.

The patch cord assembly 100 generally further includes a first coupler element, configured as a first band element 107, for detachably securing the first patch cord 101 relative to the second patch cord 102 with the first plug 105 and the second plug 106 in a juxtaposed relation, e.g., an opposing, spaced relation. Although not depicted, it would be apparent to one of ordinary skill in the art that the juxtaposed relation described herein may include, but is not limited to, opposed, spaced relation, side-by-side relation, and the like. The opposing spaced relation between the first plug 105 and the second plug 106 places the first and second plugs in a substantially co-planar, confronting orientation. The first band element 107 generally includes first and second loop structures 108 and 109 which are detachably positioned around the first patch cord 101 and the second patch cord 102. The first patch cord 101 and the second patch cord 102 may generally be detached from the first band element 107 by tearing along one or more of score lines 110 and 111 located between the first and second loop structures 108 and 109 and the first band element 107. Similarly, the first patch cord 101 and the second patch cord 102 may be detached from the first band element 107 by tearing along score lines 112 which are located substantially centered on the first band element 107 in relation to the first loop structure 108 and the second loop structure 109.

Still with reference to FIG. 1, the exemplary embodiment of patch cord assembly 100 may optionally include a spacer element 113 for preventing contact between the first plug 105 of the first patch cord 101 and the second plug 106 of the second patch cord 102. Although spacer element is shown in FIG. 1 as a distinct structure, spacer element 113 may extend from first band element 107, as will be apparent to persons skilled in the art. Spacer element 113 may be fabricated from low cost materials, e.g., foam, Styrofoam, or the like.

Further with reference to FIG. 1, it should be noted that the patch cord assembly 100 depicted in accordance with the present disclosure generally allows a more cost effective and efficient packaging, removal and installation of patch cords. Although only two patch cords are depicted in FIG. 1, it should be understood by those with ordinary skill in the art that the patch cord assembly 100 may be utilized with a plurality of patch cord pairs and such pairs may be advantageously stacked or otherwise combined for inventory and/or shipping purposes. Unlike the prior art, where patch cords must be individually removed from sealed packaging and a large amount of material and time is wasted on packaging and gaining access to the patch cord for installation purposes, the exemplary patch cord assembly 100 allows for a plurality of patch cords (typically, a pair of patch cords) to be packaged together and individually removed by detaching the desired patch cord from the first band element 107 by tearing along one or more of score lines 110, 111 and 112. Specifically, the score lines 112 expedite the separation between the first patch cord 101 and the second patch cord 102, while the score lines 110 and 111 expedite the removal of the first loop structure 108 from around the first patch cord 101 and the second loop structure 109 from around the second patch cord 102. It should be understood by those skilled in the art that the thickness and material of construction of first band element 107 is typically selected such that the coupler element is strong enough to maintain the plurality of patch cords connected relative to each other, while being thin and flexible enough to efficiently separate the material along score lines 110, 111 and 112. Thus, the break-away and removable links provided by the patch cord assembly 100 allow a more cost effective and efficient packaging, removal and installation of patch cords.

With reference to FIG. 2, a first band element 107 is depicted prior to the formation of the first loop structure 108 and the second loop structure 109 which detachably position the first patch cord 101 and the second patch cord 102. The first band element 107 may be made of a plastic material, e.g., a die cut plastic. Although FIG. 2 depicts the score lines 110, 111 and 112 on the first band element 107 prior to attachment of the first and second patch cords 101 and 102, it should be understood by those skilled in the art that the score lines 110, 111 and 112 may be created on the first band element 107 after the first and second patch cords 101 and 102 have been attached to the first band element 107. The first and second patch cords 101 and 102 are attached to the first band element 107 by forming the first and second loop structures 108 and 109 using the distal ends 108*a* and 109*a* of the first band element 107. Specifically, the distal end 108*a* forms a first loop structure 108 around the first patch cord 101 and the distal end 109*a* forms a second loop structure 109 around the second patch cord 102. To attach the distal ends 108*a* and 109*a* onto the first band element 107 in order to complete the first and second loop structures 108 and 109, processes known to those skilled in the art may be used, e.g., a heat stake.

Figure 3A:
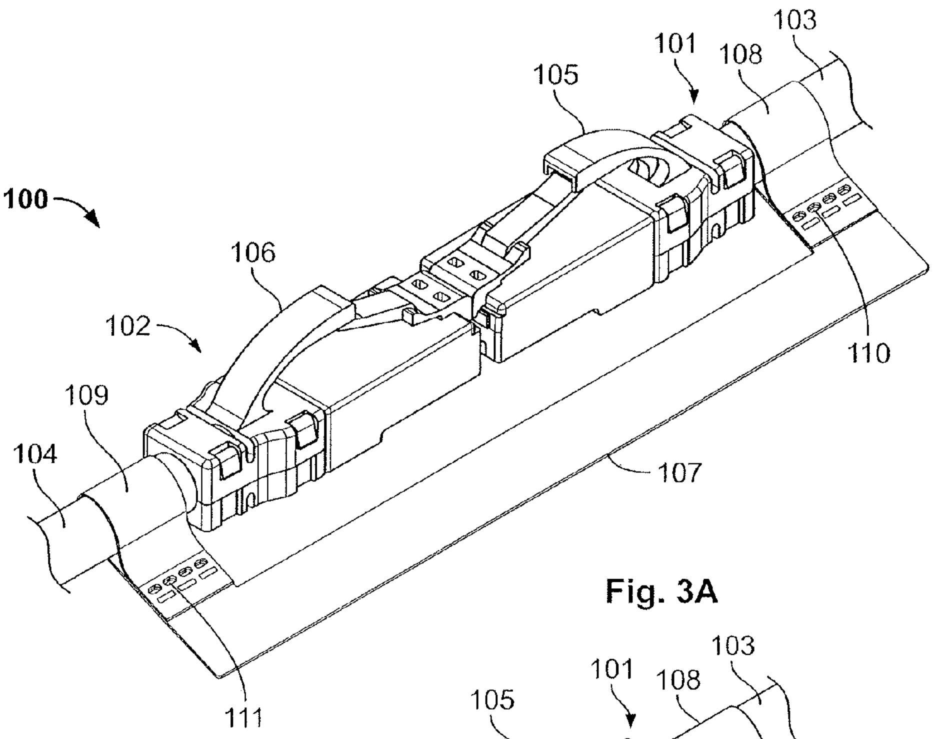
FIGS. 3A-B are views of the exemplary first coupler element prior to and after detachment of a first band element.
Figure 3B:
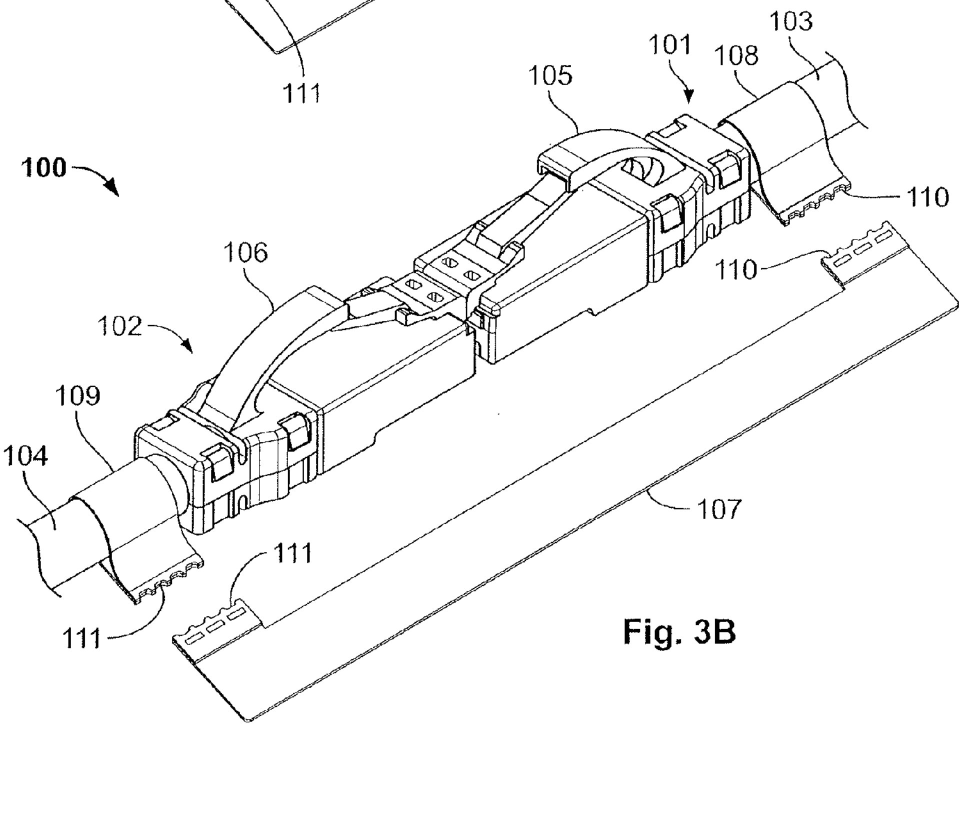

Turning now to FIGS. 3A-B, alternative views of the exemplary patch cord assembly 100 are depicted. In particular, FIG. 3A illustrates the exemplary patch cord assembly 100 prior to detachment of the first band element 107, while FIG. 3B illustrates the exemplary patch cord assembly 100 after the first band element 107 has been detached and the first patch cord 101 and second patch cord 102 are no longer secured relative to each other. Although FIGS. 3A-B do not illustrate score lines 112 or spacer element 113, the exemplary first band element may or may not include these elements as desired.

With specific reference to FIG. 3B, the first band element 107 has been detached from the first loop structure 108 and second loop structure 109 by separating the materials along score lines 110 and 111. Thus, the first band element 107 may be discarded and either or both the first and second patch cords 101 and 102 may be ready for installation. It should be noted that upon separation of the first band element 107 from the first and second loop structures 108 and 109, the score lines 110 and 111 may be configured and dimensioned in such a way as to either permit the first and second loop structures 108 and 109 to be removed from the first and second patch cords 101 and 102, or permit the first and second loop structures 108 and 109 to remain fixed to the first and second patch cords 101 and 102. Accordingly, based on the positioning of the score lines 110 and 111, the first and second loop structures 108 and 109 may be removed in the process of separating the first band element 107 along score lines 110 and 111, remain attached to the first and second patch cords 101 and 102 for subsequent removal by the installer, and/or remain permanently attached to the first and second patch cords 101 and 102.

Figure 4:
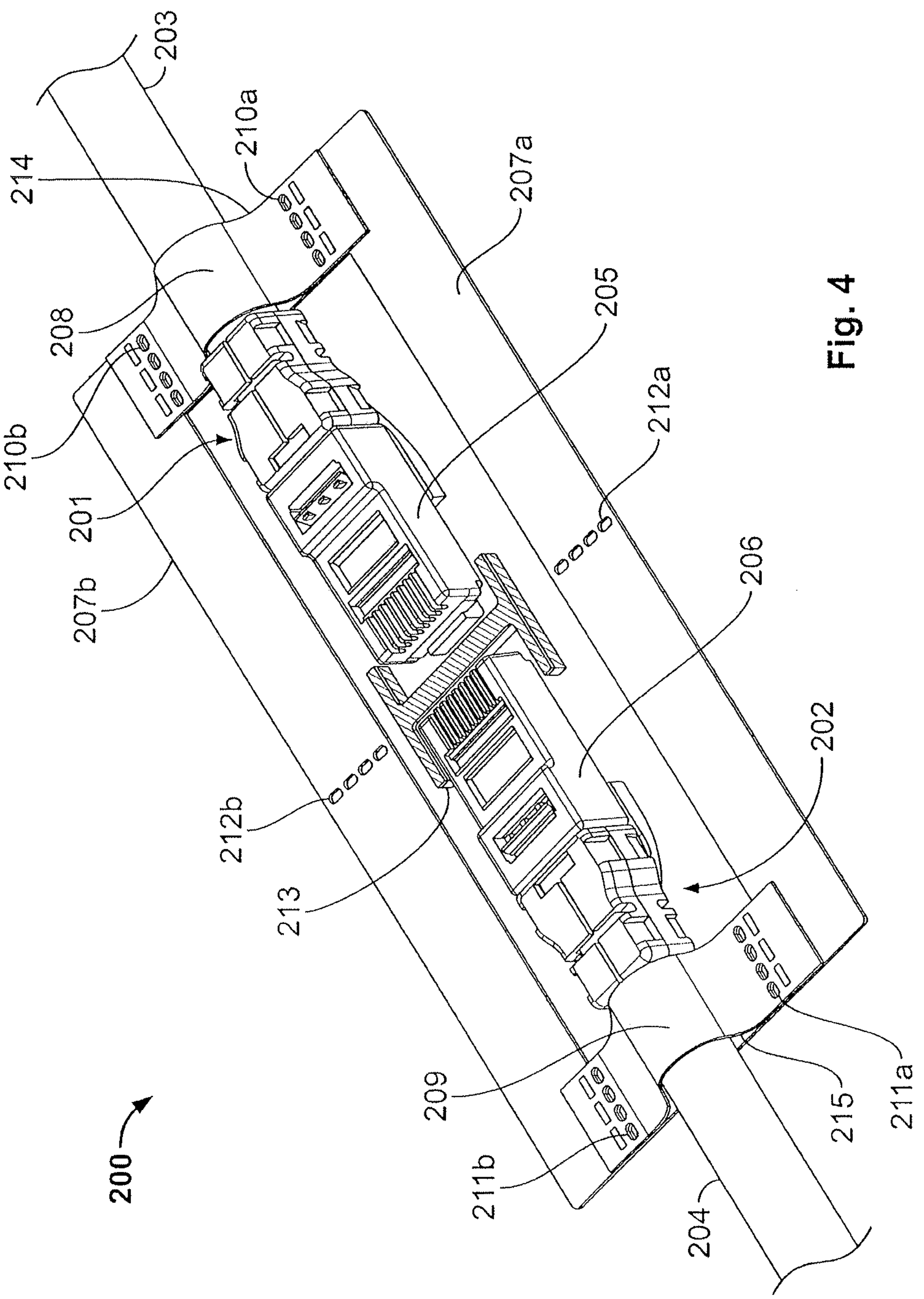
FIG. 4 is a view of an exemplary patch cord assembly with first and second coupler elements, configured as first and second band elements, and spacer.

Turning now to FIG. 4, an alternate exemplary patch cord assembly 200 is depicted in accordance with the present disclosure. In the exemplary embodiment of FIG. 4, the exemplary patch cord assembly 200 generally includes a first patch cord 201 and a second patch cord 202. The first patch cord 201 generally includes a first elongated cord 203 and a first plug 205 mounted with respect to one end of said first elongated cord 203. The second patch cord 202 generally includes a second elongated cord 204 and a second plug 206 mounted with respect to one end of said second elongated cord 204.

The exemplary patch cord assembly 200 generally further includes a second coupler element, configured as a second band element 207*b*, for detachably securing the first patch cord 201 relative to the second patch cord 202 with the first plug 205 and the second plug 206 in an opposed spaced relation. Unlike the embodiment shown in FIGS. 1 and 2, the exemplary patch cord assembly 200 of FIGS. 4 and 5 may provide a stronger and/or more stable configuration for continually maintaining the opposed/spaced relation of the first/second plugs and preventing contact therebetween, e.g., during storage and/or shipping. The opposed/spaced relation between the first plug 205 and the second plug 206 generally defines a substantially co-planar arrangement. The second band element 207*b* is generally dimensionally equal to the first band element 207*a* and is disposed substantially opposite relative to said first band element 207*a*, thereby forming a substantially rectangular configuration. The first and second band elements 207*a* and 207*b* may include first and second loop structures 208 and 209 which are detachably positioned around the first patch cord 201 and the second patch cord 202, respectively.

Specifically, the first patch cord 201 and the second patch cord 202 may be detached from each other by tearing and/or otherwise separating along one or more of score lines 210*a*, 210*b*, 211*a* and 211*b* located between the first and second loop structures 208 and 209 and the first and second band elements 207*a* and 207*b*. Similarly, the first patch cord 201 and the second patch cord 202 may be detached from the first and second band elements 207*a* and 207*b* by tearing/separating along one or more of score lines 212*a* and 212*b* which are located substantially centered on the first and second band elements 207*a* and 207*b* in relation to the first and second loop structures 208 and 209. The detachment or separation of the first and second band elements 207*a* and 207*b* from the first and second loop structures 208 and 209 may further be performed similarly to the detachment of the first band element 107 discussed above with respect to FIGS. 3A-B. Thus, based on the positioning of score lines 210*a*, 210*b*, 210*c* and 210*d*, the first and second loop structures 208 and 209 may be removed in the process of separating the first and second band elements 207*a* and 207*b* along score lines 210*a*, 210*b*, 210*c* and 210*d*, remain attached to the first and second patch cords 201 and 202 for subsequent removal by the installer, and/or remain permanently attached to the first and second patch cords 201 and 202.

Still with reference to FIG. 4, another exemplary embodiment of the patch cord assembly 200 may include a spacer element 213 for preventing contact between the first plug 205 of the first patch cord 201 and the second plug 206 of the second patch cord 202. As noted above, spacer element 213 may extend from the coupler element(s) or may be a distinct structure relative thereto.

Figure 5:
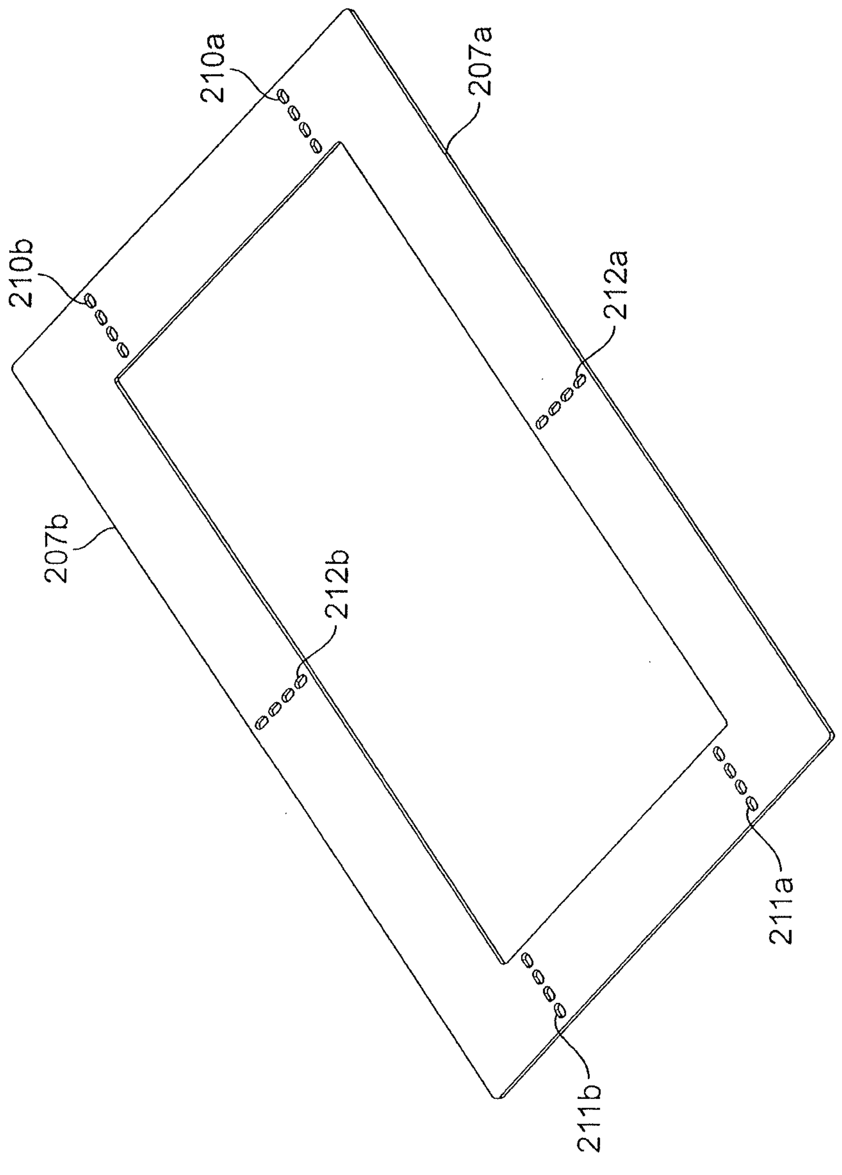
FIG. 5 is a view of exemplary first and second band elements

With reference to FIG. 5, first and second band elements 207*a* and 207*b* are depicted prior to the formation of the first and second loop structures 208 and 209 which detachably position the first and second patch cords 201 and 202. The first and second band elements 207*a* and 207*b* may be made of a plastic material, e.g. a die cut plastic. Although FIG. 5 depicts the score lines 210*a*, 210*b*, 211*a*, 211*b*, 212*a* and 212*b* on the first and second band elements 207*a* and 207*b* prior to attachment of the first and second patch cords 201 and 202, it should be understood by those skilled in the art that the score lines 210*a*, 210*b*, 211*a*, 211*b*, 212*a* and 212*b* may be created on the first and second band elements 207*a* and 207*b* after the first and second patch cords 201 and 202 have been attached to the first and second band elements 207*a* and 207*b*. With reference to FIGS. 4 and 5, the first and second patch cords 201 and 202 are detachably secured relative to the first and second band elements 207*a* and 207*b* by forming the first and second loop structures 208 and 209 using first and second strips 214 and 215 made of material substantially similar to that of the first and second band elements 207*a* and 207*b*. To attach the first and second strips 214 and 215 onto the first and second band elements 207*a* and 207*b* in order to complete the first and second loop structures 208 and 209, processes known to those skilled in the art may be used, e.g. a heat stake.

Figure 6B:
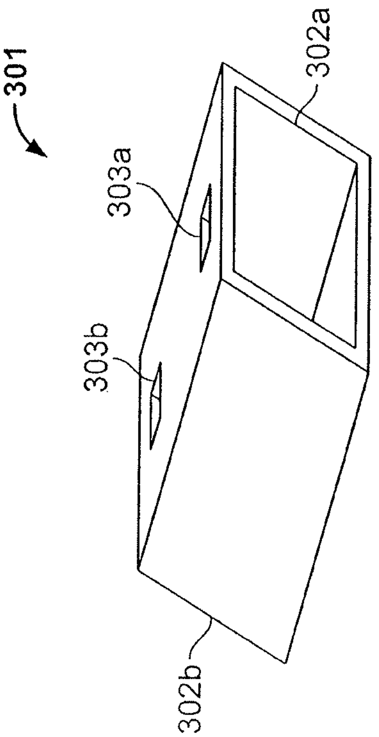
FIGS. 6A-C are views of an alternative exemplary embodiment of a first coupler element configured as a sleeve element.
Figure 6A:
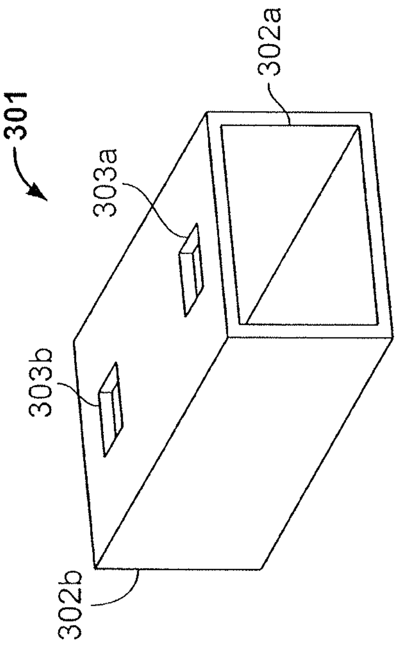
Figure 6C:
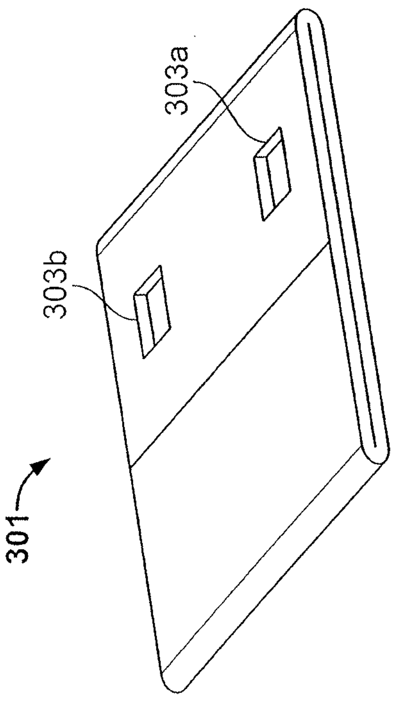

With reference to FIGS. 6A-C, an alternative exemplary embodiment of the patch cord assembly 100 may include a first coupler element configured as a sleeve element 301. The sleeve element 301 may have a rectangular or box-shaped configuration. Further, the sleeve element 301 may have a substantially symmetrical structure, including a first sleeve opening 302*a* and a second sleeve opening 302*b* on opposite sides of the sleeve element 301. The first and second sleeve openings 302*a* and 302*b* are dimensioned for the insertion of the first and second patch cords 101 and 102, respectively.

With respect to FIG. 6A, the sleeve element 301 is depicted in an "open" configuration. The first and second sleeve openings 302*a* and 302*b* are depicted in the proper configuration to receive the first and second patch cords 101 and 102. Specifically, the sleeve element 301 may be dimensioned in such a way as to provide a secure fit around the first and second plug 105 and 106 of the first and second patch cord 101 and 102. The secure fit inside the sleeve element 301 thereby prevents unwanted motion of the first and second plug 105 and 106, which reduces the damage which could occur during packaging and transportation of patch cords. Further, the sleeve element 301 includes at least two sleeve notches 303*a* and 303*b*, which lock-in and secure the first and second plug 105 and 106 of the first and second patch cords 101 and 102. Specifically, the at least two sleeve notches 303*a* and 303*b* are dimensioned to receive the spring-loaded "hook" on the first and second plug 105 and 106 in order to prevent the first and second plug 105 and 106 from being pulled out. Once the first and second patch cords 101 and 102 are required for use, the spring-loaded "hook" on the first and second plug 105 and 106 may be compressed downward in order to release it from one of the at least two sleeve notches 303*a* and 303*b*.

Still with reference to FIG. 6A, the embodiment of sleeve element 301 may optionally include a spacer element 113, as depicted in FIG. 1, for preventing contact between the first plug 105 of the first patch cord 101 and the second plug 106 of the second patch cord 102. Spacer element 113 may be fabricated from low cost materials, e.g., foam, Styrofoam, or the like, and would be configured and dimensioned to fit inside the sleeve element 301.

With respect to FIG. 6B, the sleeve element 301 is depicted in a "semi-closed" configuration. Specifically, the sleeve element 301 may be manufactured from thin cardboard, paper, plastic or a similar material. Therefore, the sleeve element 301 is flexible and may be "knocked-down" flat for easy storage or transport. FIG. 6B depicts the sleeve element 301 in a "semi-closed" configuration wherein the sleeve element 301 is being folded or "knocked-down" flat.

With respect to FIG. 6C, the sleeve element 301 is depicted in a "closed" configuration. Specifically, the sleeve element 301 has been "knocked-down" to a substantially flat configuration for easy storage or transport.

Figure 7:
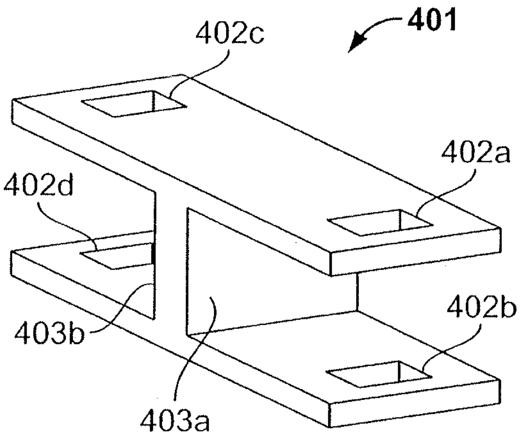
FIG. 7 is a view of an alternative exemplary embodiment of a first coupler element configured as an I-shaped coupler.

With reference to FIG. 7, an alternative exemplary embodiment of the patch cord assembly 100 generally includes a first coupler element configured as an I-shaped coupler 401. The I-shaped coupler 401 may have a substantially symmetrical structure. Specifically, each side of the I-shaped coupler 401 generally include a first and second passage 403*a* and 403*b* dimensioned in a way as to receive a first and second plug 105 and 106 of the first and second patch cords 101 and 102. Additionally, the I-shaped coupler generally include at least two notches 402*a*, 402*b*, 402*c* and 402*d* on the distal ends of the first and second passage 403*a* and 403*b* for locking-in and securing the first and second plug 105 and 106 of the first and second patch cords 101 and 102. Specifically, the at least two notches 402*a*, 402*b*, 402*c* and 402*d* are dimensioned to receive the spring loaded "hook" on the first and second plug 105 and 106 in order to prevent the first and second plug 105 and 106 from being pulled out of the I-shaped coupler 401. Once the first and second patch cords 101 and 102 are required for use, the spring-loaded "hook" on the first and second plug 105 and 106 may be compressed downward in order to release it from one of the at least two notches 402*a*, 402*b*, 402*c* and 402*d*.

Figure 8A:
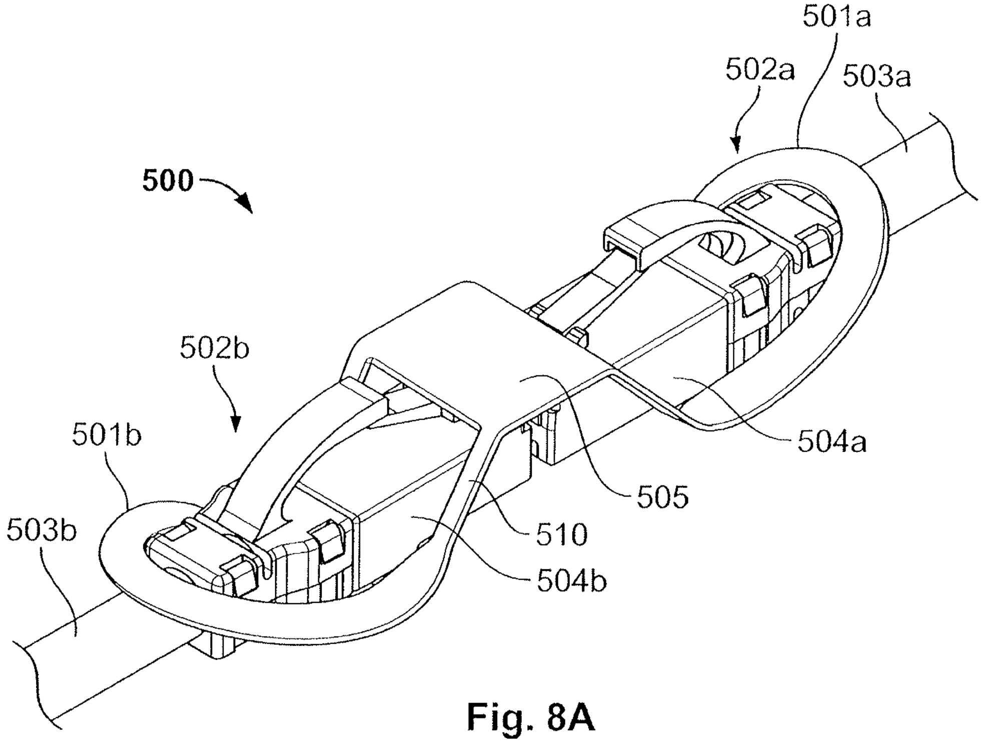
FIGS. 8A-C are views of an alternative exemplary embodiment of a first coupler element configured as first and second loops.
Figure 8B:
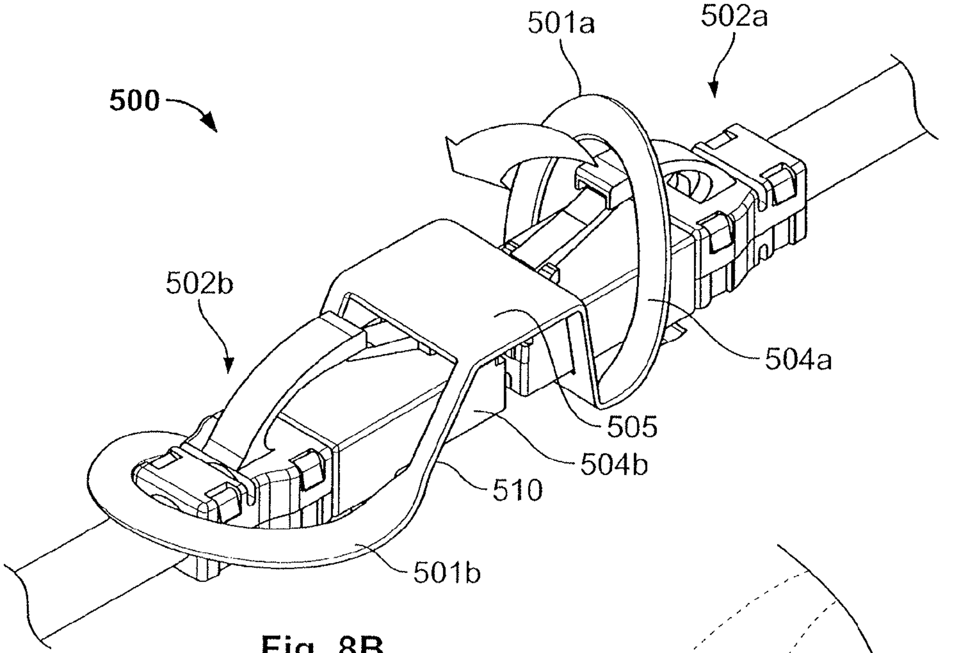
Figure 8C:
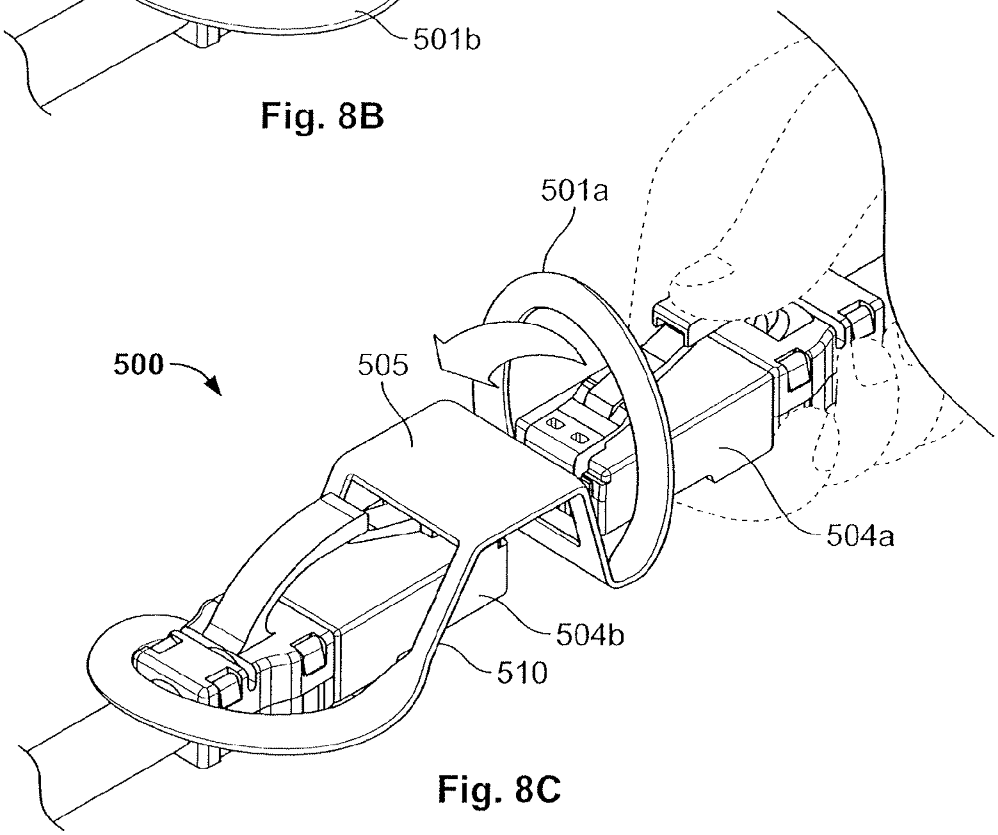

Turning now to FIGS. 8A-C, an alternative exemplary embodiment of the patch cord assembly 500 generally includes a first coupler element 510 configured as a first loop 501*a* and second loop 501*b*. In particular, the exemplary patch cord assembly 500 generally includes first and second loops 501*a* and 501*b* connected on opposing sides to a first coupler element body 505 and are configured and dimensioned to stretch and fit across the first and second plugs 504*a* and 504*b* for detachably securing the first patch cord 502*a* to the second patch cord 502*b* in a juxtaposed relation, e.g., an opposing, spaced relation.

With reference to FIG. 8A, the exemplary patch cord assembly 500 is illustrated in an "interlocked" state. Specifically, the first patch cord 502*a* and second patch cord 502*b* are detachably secured, i.e., interlocked, by the first and second loops 501*a* and 501*b*. Although not depicted, the exemplary patch cord assembly 500 may optionally include a spacer element 113, substantially similar to the spacer element 113 illustrated and discussed with respect to FIG. 1, for preventing contact between the first plug 504*a* and second plug 504*b*. In addition, to prevent contact between the first and second plugs 504*a* and 504*b*, the structure of the first and second plugs 504*a* and 504*b* may abut the first coupler element body 505 in such a manner as to prevent the first and second plugs 504*a* and 504*b* from moving closer to each other. Thus, when interlocked, the first and second loops 501*a* and 501*b* generally provide pressure against the bottom surface of the first and second plugs 504*a* and 504*b*, respectively, while the first coupler element body 505 provides pressure to the top surface of the first and second plugs 504*a* and 504*b*. The distal portion of the first and second loops 501*a* and 501*b* may also be configured and dimensioned to fit and/or "snap" around the distal end of the first and second plugs 504*a* and 504*b* at the connection between the first and second plugs 504*a* and 504*b* and the first and second elongated cables 503*a* and 503*b*, respectively, to prevent the first and second patch cords 502*a* and 502*b* from sliding back and away from the first coupler element body 505.

Therefore, as would be understood by one skilled in the art, the exemplary patch cord assembly 500 preserves an "equilibrium" in its interlocked position by preventing the first and second patch cords 502*a* and 502*b* from sliding or moving in any direction, e.g., closer or farther from each other. Further still, the first coupler element 510 may be dimensioned in such a way as to provide a secure fit around the first and second plug 504*a* and 504*b* of the first and second patch cord 502*a* and 502*b*. The secure fit inside the first coupler element 510 thereby prevents unwanted motion of the first and second plug 504*a* and 504*b*, which reduces the damage which could occur during packaging and transportation of patch cords.

Turning now to FIG. 8B, the first step in removing a first patch cord 502*a* is depicted. The first and/or second loop 501*a* and/or 501*b* may be pushed upward and toward the first coupler element body 505, as illustrated by the arrow in FIG. 8B, to free the first and/or second plug 504*a* and/or 504*b*, thereby shifting the position of the first and/or second loop 501*a* and/or 501*b* from a substantially horizontal position in the interlocked state to a substantially vertical position in the released state. The substantially vertical positioning of the first and second loops 501*a* and 501*b* releases the pressure on both the distal end and the bottom surface of the first and second plugs 504*a* and 504*b*, which was originally applied by the contour of the first and second loops 501*a* and 501*b*. Thus, as can be seen in FIG. 8C, the lack of pressure from the first and second loops 501*a* and 501*b* frees the first and second plugs 504*a* and 504*b* and permits each to be slid and/or moved out of the first and second loops 501*a* and 501*b* and away from the first coupler element body 505. As would be understood by those skilled in the art, the steps of disconnecting the first and second patch cords 502*a* and 502*b* from the exemplary patch cord assembly 500 may be reversed in order to connect said patch cords 502*a* and 502*b* in a juxtaposed relation to each other.

Figure 9A:
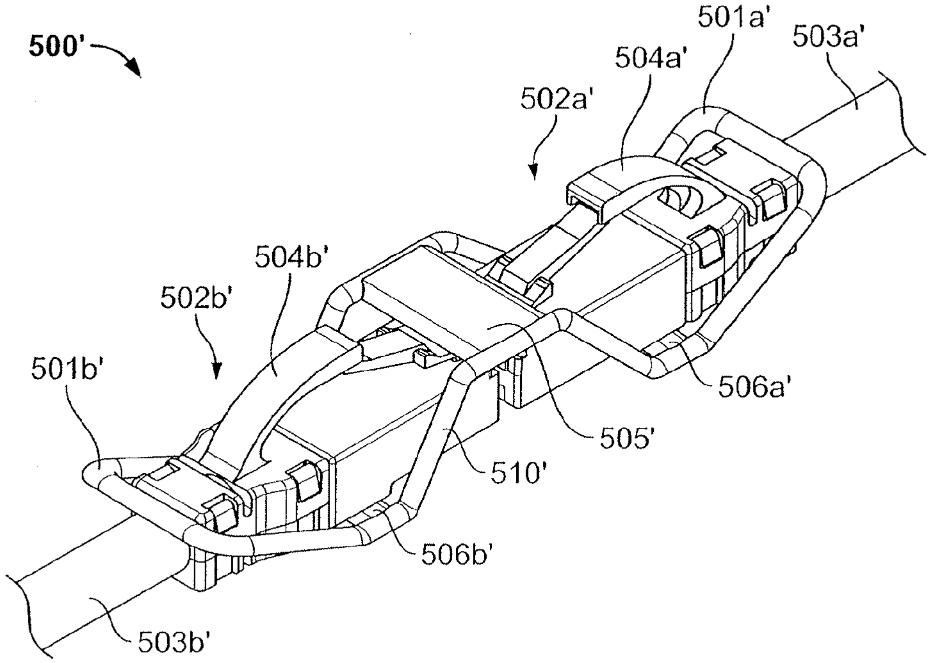
FIGS. 9A-B are views of an alternative exemplary embodiment of first and second loops.
Figure 9B:
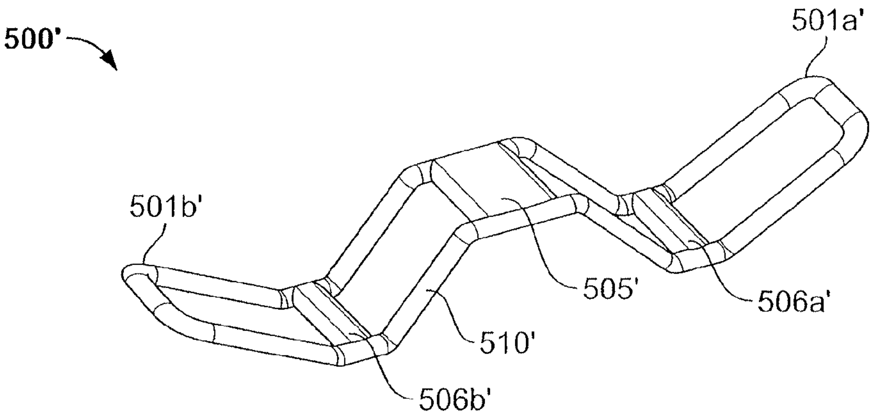

FIGS. 9A-B illustrate an alternative exemplary embodiment of the patch cord assembly 500 as discussed with respect to FIGS. 8A-C above. In particular, the exemplary patch cord assembly 500' of FIGS. 9A-B depicts a first coupler element 510' configured as a first loop 501*a'* and second loop 501*b'*. In particular, the embodiments of the first coupler element 510 and 510' discussed with respect to FIGS. 8A-C and 9A-B are merely exemplary and it should be understood that the embodiments discussed herein are not limited to circular or rectangular first and second loops 501*a*, 501*b*, 501*a'* and 501*b'*, respectively. Rather, the first and second loops 501*a*, 501*b*, 501*a'* and 501*b'* may have a variety of configurations suitable for interlocking patch cords, e.g., circular, rectangular, square, hexagonal, or the like. With further reference to FIG. 9A, the first coupler element 510' generally includes first and second loops 501*a'* and 501*b'* connected on opposing sides to a first coupler element body 505' and are configured and dimensioned to stretch and fit across the first and second plugs 504*a'* and 504*b'* for detachably securing the first patch cord 502*a'* to the second patch cord 502*b'* in a juxtaposed relation, e.g., an opposing, spaced relation.

The first coupler element 510' of FIG. 9A generally further includes a first and second bottom support 506*a*' and 506*b*' for providing the necessary pressure on the bottom surface of the first and second plugs 504*a*' and 504*b*' in order to restrict movement of the first and second patch cords 502*a*' and 502*b*'. Similar to the embodiments of FIGS. 8A-C, the movement of the first and second patch cords 502*a*' and 502*b*' is generally restricted in the interlocked position by providing pressure on the bottom and top surfaces of the first and second plugs 504*a*' and 504*b*' with the first and second bottom supports 506*a*' and 506*b*' and the first coupler element body 505'. In addition, the first and second loops 501*a*' and 501*b*' may fit and/or snap around the distal end of the first and second plugs 504*a*' and 504*b*'. Thus, the first and second patch cords 502*a*' and 502*b*' are restricted in motion, keeping the first and second plugs 504*a*' and 504*b*' in a desired orientation and preventing said plugs from slipping out of the first coupler element 510' during regular operation or storage. To disconnect the first and second patch cords 502*a*' and 503*a*', a similar pressing and bending of the first and second loops 501*a*' and 501*b* may be performed as was discussed relative to FIGS. 8B and C. It should be understood by those skilled in the art that the thickness and material of construction of the first coupler element 510', as well as other embodiments of the first coupler element discussed herein, are typically selected such that the coupler element is strong enough to maintain the plurality of patch cords connected relative to each other, while being thin and flexible enough to efficiently bend and connect/disconnect said patch cords to allow a more cost effective and efficient packaging, removal and installation of patch cords.

Figure 10A:
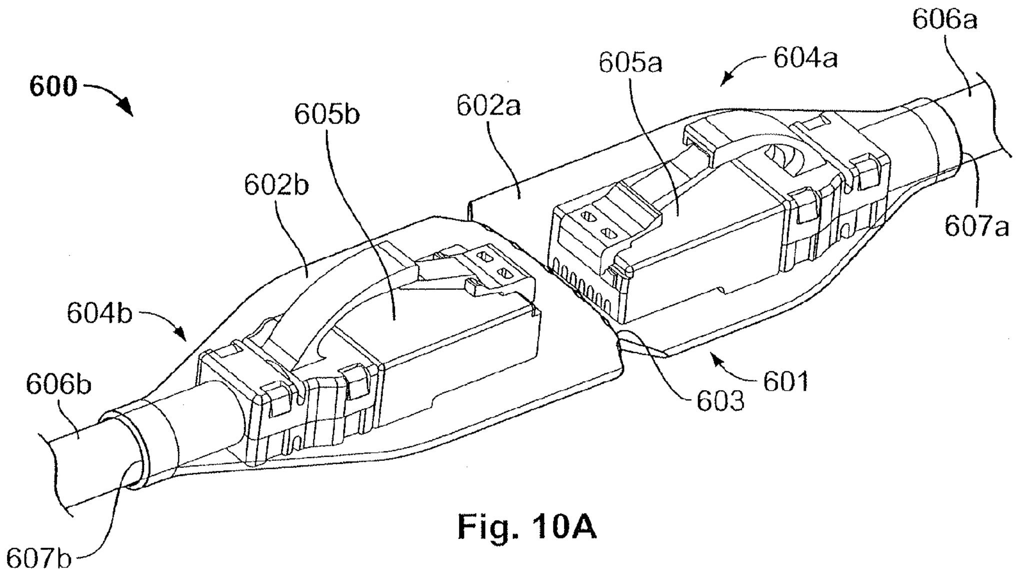
FIGS. 10A-C are views of an alternative exemplary embodiment of a first coupler element configured as first and second covers.
Figure 10B:
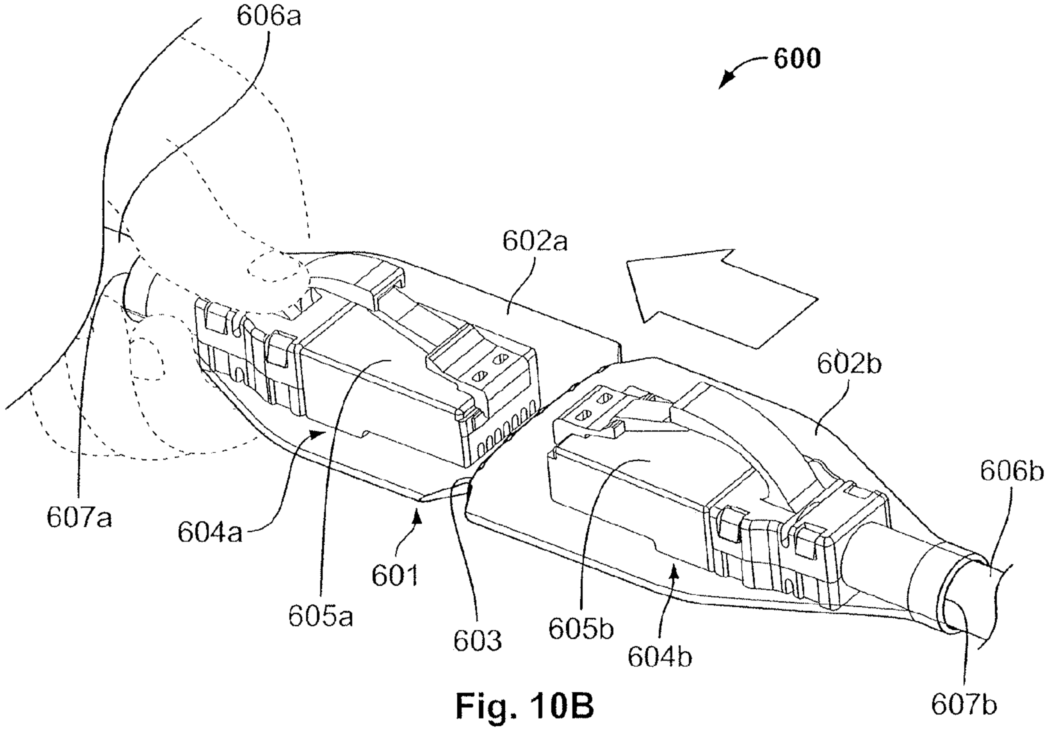
Figure 10C:
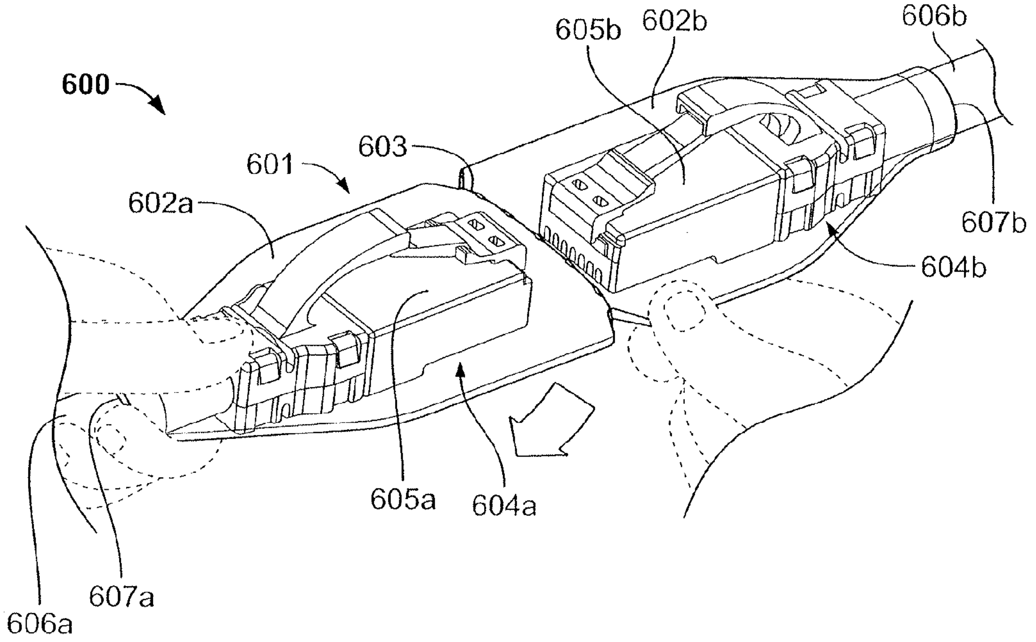

Turning now to FIGS. 10A-C, an alternative exemplary embodiment of the patch cord assembly 600 generally includes a first coupler element 601 configured as a first cover 602*a* and second cover 602*b*. In particular, the exemplary patch cord assembly 600 generally includes a first and second cover 602*a* and 602*b* configured in an opposing relation and connected at the center score lines 603. The first and second cover 602*a* and 602*b* are further configured and dimensioned to fit around first and second plugs 605*a* and 605*b*, while being closed, e.g., tightened, wrapped, or the like, at the first and second elongated cords 606*a* and 606*b*, for detachably securing the first patch cord 604*a* to the second patch cord 604*b* in a juxtaposed relation, e.g., an opposing, spaced relation. As would be understood by one skilled in the art, for securing the first and second patch cords 604*a* and 604*b* relative to each other, the first and second covers 602*a* and 602*b* are generally configured and dimensioned to permit the insertion of the first and second plugs 605*a* and 605*b* from the first and second openings 607*a* and 607*b* at the distal end of the respective covers. Thus, initially, the first and second openings 607*a* and 607*b* are sufficiently large enough to permit the insertion of the first and second plugs 605*a* and 605*b*. It should be noted that although the first and second openings 607*a* and 607*b* are initially open, the portion of the first coupler element 601 which generally includes the center score lines 603 is generally configured in a smaller diameter or opening than the size of the first and second plugs 605*a* and 605*b*, thereby preventing unwanted contact between the respective plugs. Once the first and second plugs 605*a* and 605*b* have been inserted into the first and second covers 602*a* and 602*b*, the first and second openings 607*a* and 607*b* may be "locked", e.g., tightened, wrapped, or the like, around the first and second elongated cords 606*a* and 606*b* to prevent the first and second plugs 605*a* and 605*b* from undesired separation from each other. It should be noted that the "locked" position of the first and second openings 607*a* and 607*b* is sufficiently strong to maintain the plurality of patch cords connected relative to each other, while being flexible enough to permit the first and second plugs 605*a* and 605*b* to be detached from the exemplary patch cord assembly 600 when sufficient pulling pressure is applied.

With reference to FIGS. 10B and C, the steps for separating the first and second patch cords 604*a* and 604*b* from each other are illustrated. The user/installer may detach the first and second patch cords 604*a* and 604*b* in at least one of two methods, or a combination of both. As depicted in FIG. 10B, the user/installer may grasp and pull the first patch cord 604*a* away from the exemplary patch cord assembly 600, i.e., the direction of the arrow shown. Thus, the pressure from first plug 605*a* causes the "locked" portion of the first cover 602*a* at first opening 607*a* to open and permits the first plug 605*a* to be removed and separated from the exemplary patch cord assembly 600. The user/installer may optionally choose to grasp and twist the first cover 602*a* and/or first plug 605*a* along center score lines 603, as illustrated in FIG. 10C, in order to tear apart and thereby separate the first patch cord 604*a* from the second patch cord 604*b*. Post separation, the user/installer may elect to either remove the first and second covers 602*a* and 602*b*, or the first and second covers 602*a* and 602*b* may remain attached to the first and second elongated cords 606*a* and 606*b* during installation and/or use. In particular, upon separation, the center score lines 603 of the first and second covers 602*a* and 602*b* are configured and dimensioned to create a sufficiently large opening to permit the first and second plugs 605*a* and 605*b* to extended through it and be connected/installed as desired.

Figure 11A:
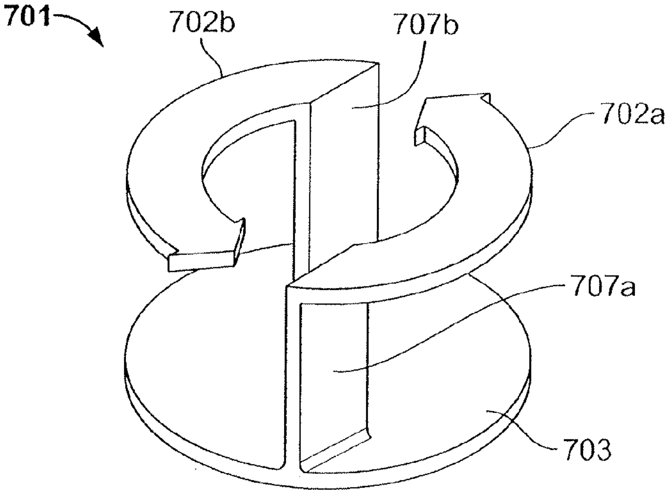
FIGS. 11A-C are views of an alternative exemplary embodiment of a first coupler element configured as a ring.
Figure 11B:
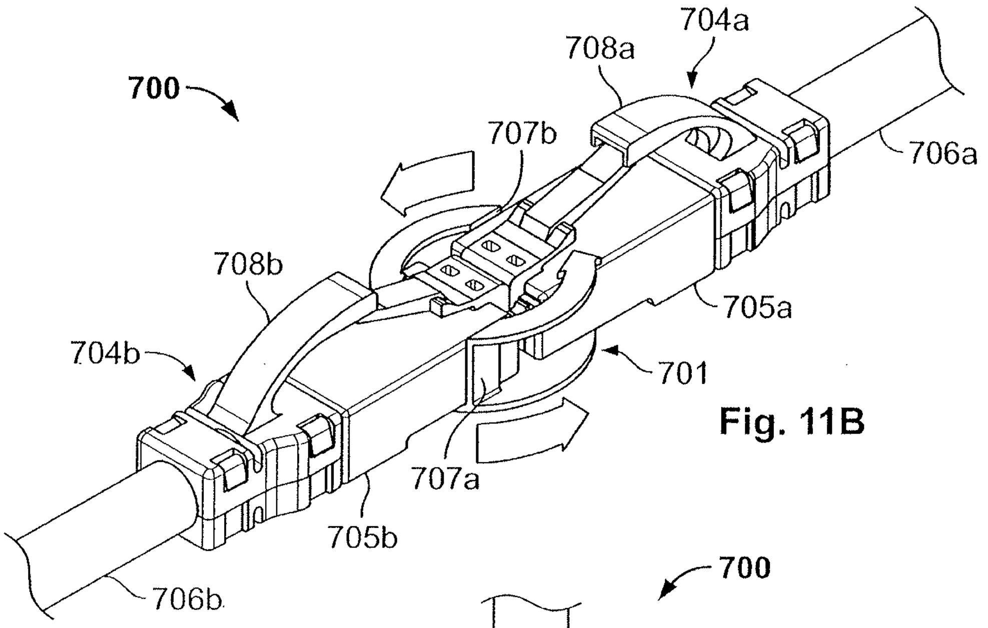
Figure 11C:
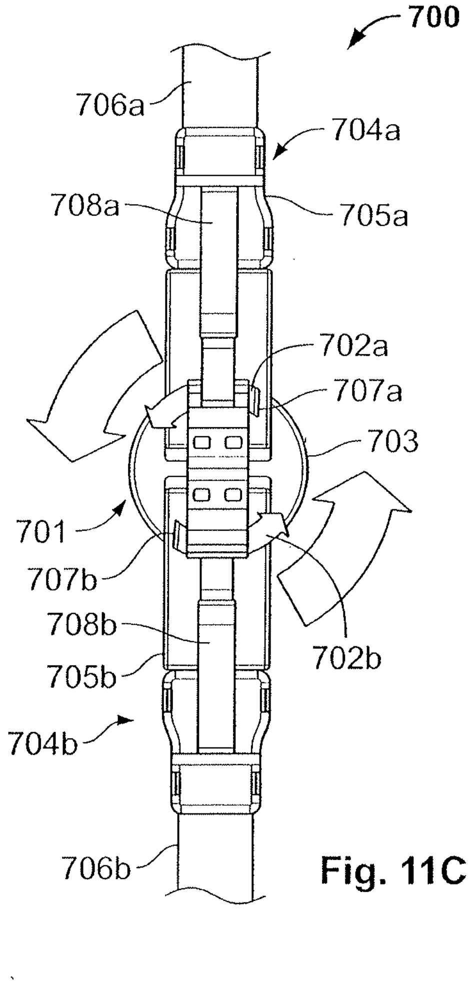

Turning now to FIGS. 11A-C, an alternative exemplary embodiment of the patch cord assembly 700 generally includes a first coupler element 701 configured as a first ring 702*a* and second ring 702*b*. In particular, the exemplary patch cord assembly 700 generally includes first and second rings 702*a* and 702*b* raised over and connected to a first coupler element base 703 and configured and dimensioned to detachably secure the first patch cord 704*a* to the second patch cord 704*b* in a juxtaposed relation, e.g., an opposing, spaced relation.

With reference to FIG. 11A, the exemplary first coupler element 701 is depicted prior to securing the first and second patch cords 704*a* and 704*b* relative to each other. Each of the first and second rings 702*a* and 702*b* is arranged in a substantially semicircular form on opposing sides of the first coupler element base 703, although the exemplary first and second rings 702*a* and 702*b* may be a variety of shapes, e.g., substantially hexagonal, square, or the like. Additionally, the first and second rings 702*a* and 702*b* are raised over and connected to the first coupler element base 703 by first and second vertical connectors 707*a* and 707*b*, respectively. The first and second vertical connectors 707*a* and 707*b* are configured and dimensioned to permit a first and second plug 705*a* and 705*b* to securely fit between the top surface of the first coupler element base 703 and the bottom surface of the first and second rings 702*a* and 702*b*. The horizontal distance between the first and second vertical connectors 707*a* and 707*b* is also configured and dimensioned to securely permit a patch cord with a specific width to fit therein. Further, the first and second plugs 705*a* and 705*b* each include protruding first and second bridges 708*a* and 708*b*. Therefore, once the first and second plugs 705*a* and 705*b* are securely fitted between the top surface of the first coupler element base 703 and the bottom surface of the first and second rings 702*a* and 702*b*, the first coupler element 701 is configured and dimensioned to rotate/twist in such a way as to securely pass the first and second rings 702*a* and 702*b* under the first and second bridges 708*a* and 708*b*, respectively.

With reference to FIG. 11B, the initial position for interlocking the first and second patch cords 704*a* and 704*b* is illustrated. In particular, the first and second patch cords 704*a* and 704*b* are oriented in a juxtaposed relation, e.g., an opposing relation, and the first and second plugs 705*a* and 705*b* have been placed between the first and second vertical connectors 707*a* and 707*b*. Next, the user/installer may rotate the first coupler element 701 in the direction indicated by the arrows in FIG. 11B to interlock the first and second patch cords 704*a* and 704*b*. Specifically, the first coupler element 701 may be rotated in the direction indicated until the first and second vertical connectors 707*a* and 707*b* abut the side surface of the first and second plugs 705*a* and 705*b*.

FIG. 11C depicts the fully interlocked state of the exemplary patch cord assembly 700. The first coupler element 701 has been rotated in the direction indicated by the arrows until the first and second vertical connectors 707*a* and 707*b* have abutted against the side surface of the first and second plugs 705*a* and 705*b*. In addition, as the first coupler element 701 is rotated, the first and second rings 702*a* and 702*b* have securely passed underneath the first and second bridges 708*a* and 708*b*. In particular, the first and second rings 702*a* and 702*b* are configured and dimensioned to securely fit between the bottom surface of the first and second bridges 708*a* and 708*b* and the top surface of the first and second plugs 705*a* and 705*b*, respectively. Thus, in an interlocked state, the placement of the first and second rings 702*a* and 702*b*, in conjunction with the pressure applied to the bottom of the first and second plugs 705*a* and 705*b* by the top surface of the first coupler element base 703, provides a secure fit of the first and second patch cords 704*a* and 704*b*, thereby preventing unwanted motion of the first and second plugs 705*a* and 705*b*.

Still with reference to FIGS. 11B and C, although the first and second plugs 705*a* and 705*b* are illustrated in direct contact relative to each other, an alternative embodiment may generally include an opposing, spaced relation of the first and second plugs 705*a* and 705*b*, or an incorporation of a spacer element 113, as discussed with respect to FIG. 1. In a further embodiment of the first coupler element 701, the spacer element 113 may be connected to/protrude out of the first and second vertical connectors 707*a* and 707*b* or to the first coupler element base 703. The spaced relation or spacer element 113 may further prevent unwanted motion of the first and second plugs 705*a* and 705*b*, thereby preventing damage. As would be understood by one skilled in the art, the steps discussed above may be reversed in order to detach the first and second patch cords 704*a* and 704*b* from the first coupler element 701.

Figure 12A:
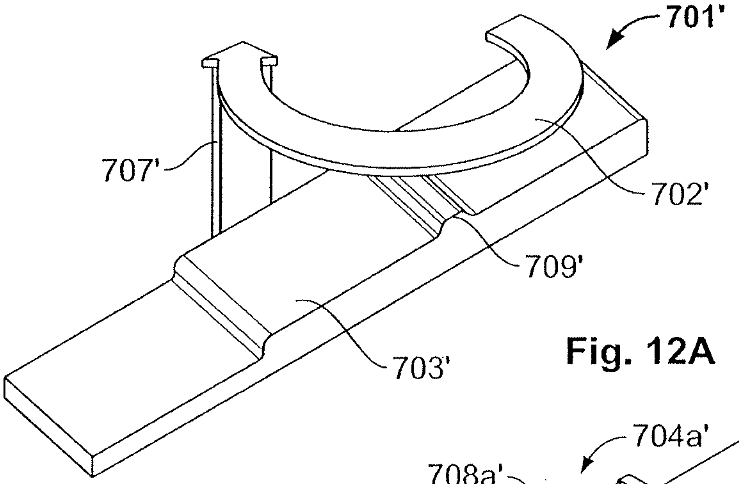
FIGS. 12A-C are views of an alternative exemplary embodiment of a ring.
Figure 12B:
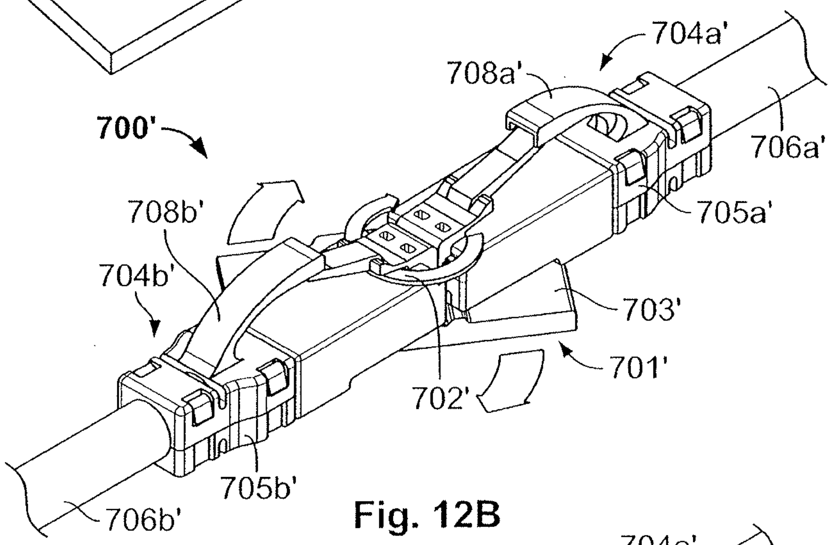
Figure 12C:
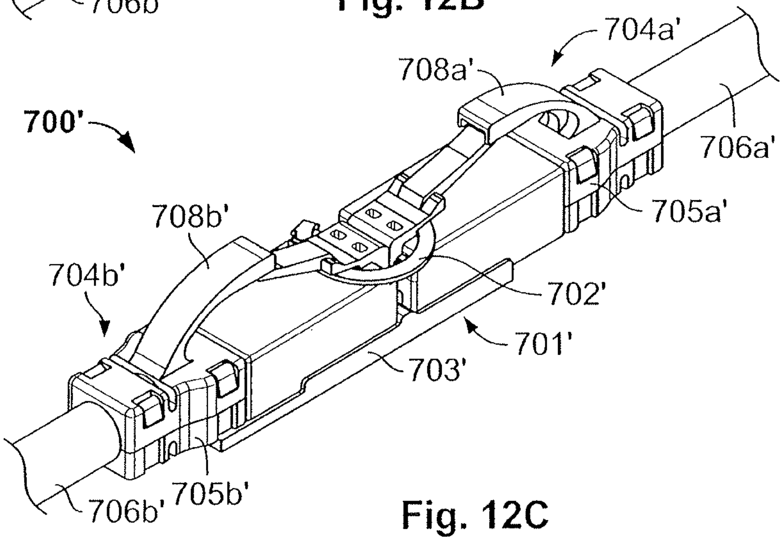

Turning now to FIGS. 12A-C, an alternative exemplary embodiment of the patch cord assembly 700' generally includes a first coupler element 701' configured as a first ring 702', rather than first and second rings 702*a* and 702*b* of exemplary patch cord assembly 700. In particular, the exemplary patch cord assembly 700' generally includes a first ring 702' offset from and connected to a first coupler element base 703' by a vertical connector 707' and is configured and dimensioned to detachably secure the first patch cord 704*a'* to the second patch cord 704*b'* in a juxtaposed relation, e.g., an opposing, spaced relation.

With reference to FIG. 12A, the exemplary first coupler element 701' is depicted prior to securing the first and second patch cords 704*a'* and 704*b'* relative to each other. The first ring 702' is arranged in a substantially circular form, although the exemplary first ring 702' may be configured in a variety of shapes, e.g., hexagonal, square, or the like. The vertical connector 707' is configured and dimensioned to permit a first and second plug 705*a'* and 705*b'* to securely fit between the top surface of the first coupler element base 703' and the bottom surface of the first ring 702'. The width of the first coupler element base 703' is also configured and dimensioned to be substantially equal to the width of the first and second plugs 705*a'* and 705*b'*, thereby providing the required support of the components. The first coupler element base 703' may also include a spacer element 709', although a spacer element 113 similar to the one in FIG. 1 may be implemented. In addition, the spacer element 709' may be positioned substantially centered with respect to the length of the first coupler element base 703' or offset by a distance in order to provide the required orientation of the first and second plugs 705*a'* and 705*b'*. The spaced relation or spacer element 709' or 113 may further prevent unwanted motion of the first and second plugs 705*a'* and 705*b'*, thereby preventing damage. Further, the first and second plugs 705*a'* and 705*b'* each include protruding first and second bridges 708' a and 708*b'*. Therefore, once the first and second plugs 705*a* and 705*b* are securely fitted between the top surface of the first coupler element base 703' and the bottom surface of the first ring 702', the first coupler element 701' is configured and dimensioned to rotate/twist in such a way as to securely pass the first ring 702' under the first and second bridges 708*a'* and 708*b'*.

With reference to FIG. 12B, the initial position for interlocking the first and second patch cords 704*a'* and 704*b'* is illustrated. In particular, the first and second patch cords 704*a'* and 704*b'* are oriented in a juxtaposed relation, e.g., an opposing relation, and the first and second plugs 705*a'* and 705*b'* have been placed on the top surface of the first coupler element base 703' in such a way as to provide support to the first and second plugs 705*a'* and 705*b'*, as well as permit the bottom surfaces of the first and second plugs 705*a'* and 705*b'* to abut the spacer element 709'. Next, the user/installer may rotate the first coupler element 701' in the direction indicated by the arrows in FIG. 12B to interlock the first and second patch cords 704*a'* and 704*b'*. Specifically, the first coupler element 701' may be rotated in the direction indicated until the vertical connector 707' abuts the side surface of either the first or second plug 705*a'* or 705*b'*.

FIG. 12C depicts the fully interlocked state of the exemplary patch cord assembly 700'. The first coupler element 701' has been rotated in the direction indicated by the arrows until the vertical connector 707' abuts against the side surface of either the first or second plug 705*a'* or 705*b'*. In addition, as the first coupler element 701' is rotated, the first ring 702' has securely passed underneath the first and second bridges 708*a'* and 708*b'*. In particular, the first ring 702' is configured and dimensioned to securely fit between the bottom surface of the first and second bridges 708*a'* and 708*b'* and the top surface of the first and second plugs 705*a'* and 705*b'*, respectively. Thus, in an interlocked state, the placement of the first ring 702', in conjunction with the pressure applied to the bottom of the first and second plugs 705*a'* and 705*b'* by the top surface of the first coupler element base 703', provides a secure fit of the first and second patch cords 704*a'* and 704*b'*, thereby preventing unwanted motion of the first and second plugs 705*a'* and 705*b'*. As would be understood by one skilled in the art, the steps discussed above may be reversed in order to detach the first and second patch cords 704*a'* and 704*b'* from the first coupler element 701'.

Figure 13A:
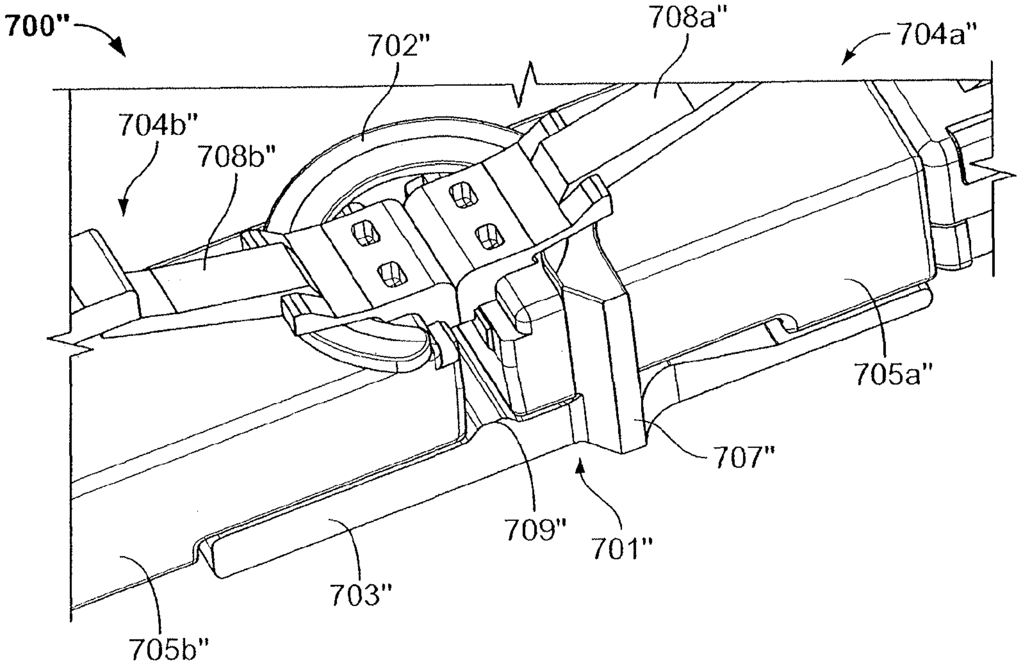
FIGS. 13A-B are views of another alternative exemplary embodiment of a ring.
Figure 13B:
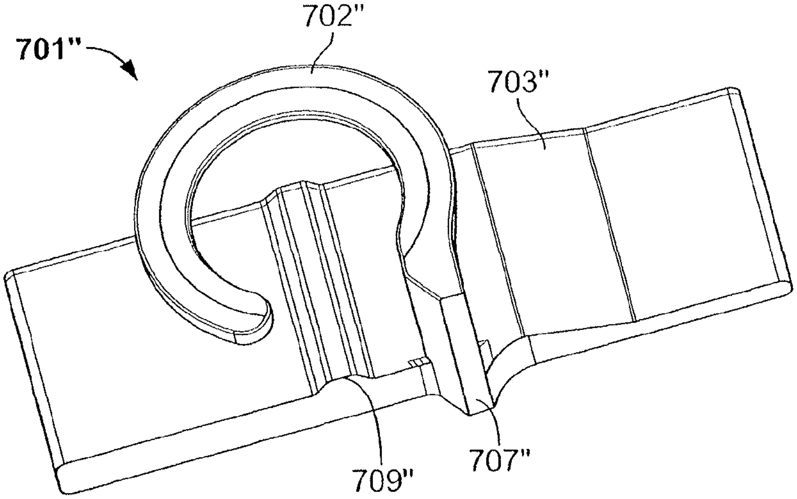

Turning now to FIGS. 13A and B, an alternative exemplary embodiment of the patch cord assembly 700' is depicted as exemplary patch cord assembly 700". Exemplary patch cord assembly 700" generally includes a first coupler element 701" configured as a first ring 702". In particular, the elements and function of exemplary patch cord assembly 700" are substantially similar to those of exemplary patch cord assembly 700'. However, as illustrated in FIGS. 13A and B and as would be understood by one skilled in the art, the first ring 702" may further be configured and dimensioned to be supported by a vertical connector 707" which is greater in dimension/thickness and/or protrudes from the first coupler element base 703" a greater distance in order to provide greater support, security and stability for the first ring 702" and the exemplary patch cord assembly 700" as a whole. In addition, the edges of the first coupler element 701" may either be angled or chamfered, depending on the type and configuration of patch cords utilized, thereby providing an enhanced meshing of the first and second patch cords 704*a*" and 704*b*" to the first coupler element 701". The enhanced meshing of components further improves the stability and security of the exemplary patch cord assembly, whether during storage or implementation, and prevents unwanted motion of the first and second plugs 705*a*" and 705*b*".

Figures 14A, 14B, 14C:
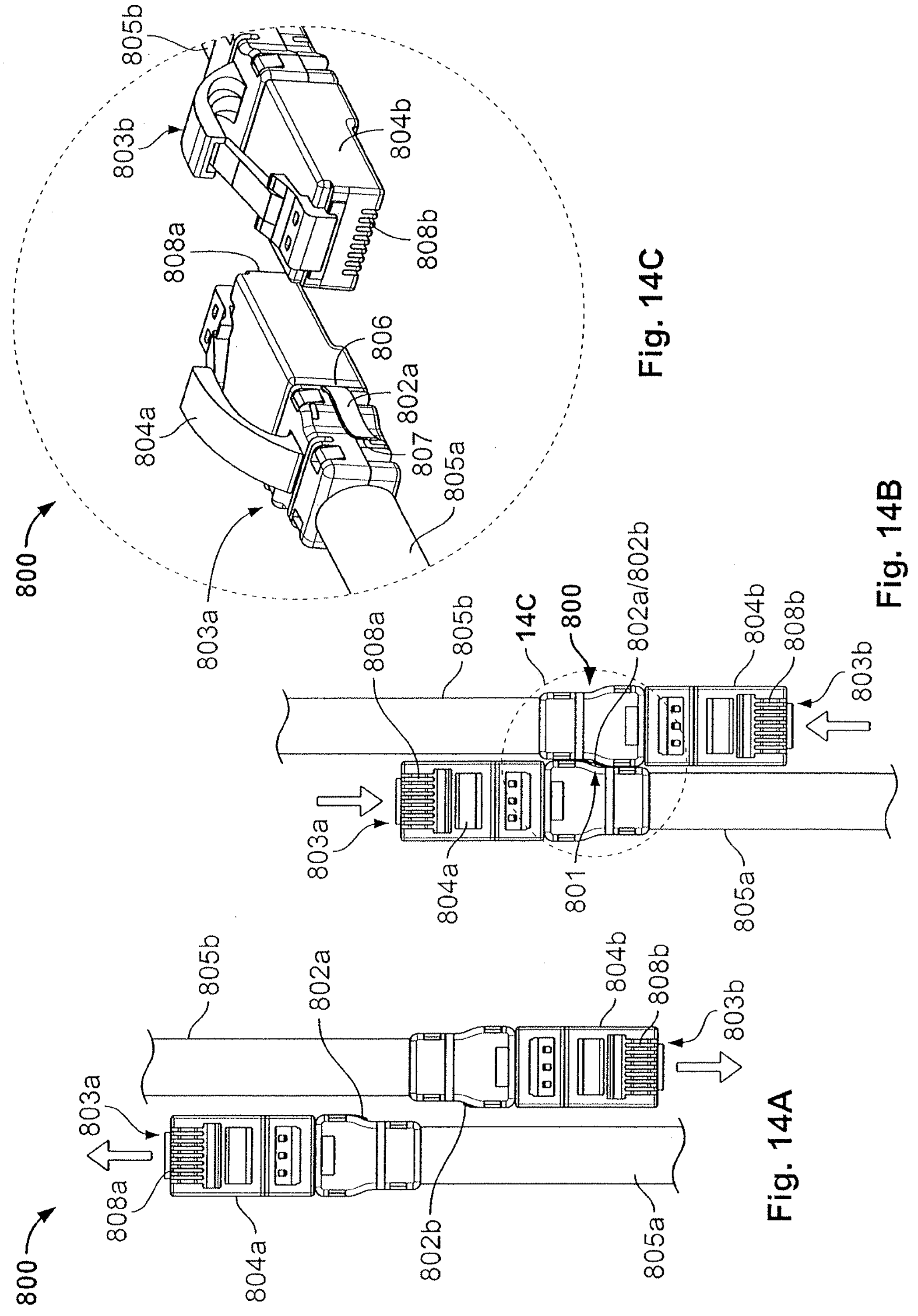
FIGS. 14A-C are views of an alternative exemplary embodiment of a first coupler element configured as first and second latches.

With reference to FIGS. 14A-C, an alternative exemplary embodiment of the patch cord assembly 800 generally includes a first coupler element 801 configured as a first latch 802*a* and a second latch 802*b*. In particular, the exemplary patch cord assembly 800 generally includes first and second latches 802*a* and 802*b*, each connected to a first and second plug 804*a* and 804*b*, respectively, and are configured and dimensioned to latch against each other for detachably securing the first patch cord 803*a* to the second patch cord 803*b* in a juxtaposed relation, e.g., opposing, side-by-side relation.

With reference first to the enlarged view depicted in FIG. 14C, the first and second latches 802*a* and 802*b* are securely attached/connected to a side surface of the first and second plugs 804*a* and 804*b*, respectively. Although the first and second latches 802*a* and 802*b* are shown attached to a specific location on the first and second plugs 804*a* and 804*b*, as would be understood by one skilled in the art, the first and second latches 802*a* and 802*b* may be connected on any surface of the first and second plugs 804*a* and 804*b* whereby latching would be permitted and the first and second latches 802*a* and 802*b* would not restrict the implementation of the essential elements of the first and second patch cords 803*a* and 803*b* for creating an electrical connection, e.g., bridges 804*a* and 804*b*, connectors 808*a* and 808*b*, and the like. Further, the first and second latches 802*a* and 802*b* for FIGS. 14A-C are merely exemplary, and it would be understood by those in the art that the configuration and dimensions of said latches could vary, e.g., be shorter, longer, wider, thinner, or the like. Still with reference to FIG. 14C, the first and second latches 802*a* and 802*b* may be manufactured from an elastic material, thereby creating a spring-like and/or tensioned property, which permits the first and second latches 802*a* and 802*b* to provide continuous pressure against the side surface of the first and second plugs 804*a* and 804*b*. Thus, slight pressure may be needed to lift and/or bend the first and second latch 802*a* and 802*b* upward and away from the side surface of the first and second plug 804*a* and 804*b* so as to permit the first and second latches 802*a* and 802*b* to securely and detachably interlock.

With reference to FIGS. 14A and B, the steps for detachably securing the first and second patch cords 803*a* and 803*b* are illustrated. Initially, the first and second plugs 804*a* and 804*b* may need to partially or substantially pass each other in a co-planar and opposing orientation as depicted in FIG. 14A. Specifically, the first and second plugs 804*a* and 804*b* must pass each other in the direction shown by the arrows at least to a point whereby the first and second latches 802*a* and 802*b* pass each other, thereby positioning/aligning the first and second patch cords 803*a* and 803*b* in an orientation suitable for latching. Next, with reference to FIG. 14B, the first and second patch cords 803*a* and 803*b* are to be moved in the direction of the arrows depicted so as to latch/interlock the first and second latches 802*a* and 802*b*. The secure, yet detachable, fit/interlock between the first and second latches 802*a* and 802*b* thereby prevents unwanted motion and/or damage of the first and second plugs 804*a* and 804*b*. As an additional support, although not required, the placement of the first and second latches 802*a* and 802*b* on the first and second plugs 804*a* and 804*b* may cause the angled configuration of the sides of the first and second plugs 804*a* and 804*b* to abut each other and further prevent unwanted motion of the first and second plugs 804*a* and 804*b*, as is depicted in FIG. 14B. However, as would be understood by one of skill in the art, the placement of the first and second latches 802*a* and 802*b* may be decided based on the configuration and dimensions of the cord being utilized. Although not depicted, to provide additional protection to the first and second plugs 804*a* and 804*b*, and specifically to the connectors 808*a* and 808*b*, a protective cover similar to the spacer element 113 of FIG. 1 may be utilized so that the electrical connections of connectors 808*a* and 808*b* are not damaged during storage, removal, and/or installation. The protective cover may also be one generally utilized in the industry. As would be understood by one of skill in the art, to detach the first and second plugs 804*a* and 804*b*, the steps discussed herein may be reversed to unlatch the first and second latches 802*a* and 802*b*.

Figure 15A:
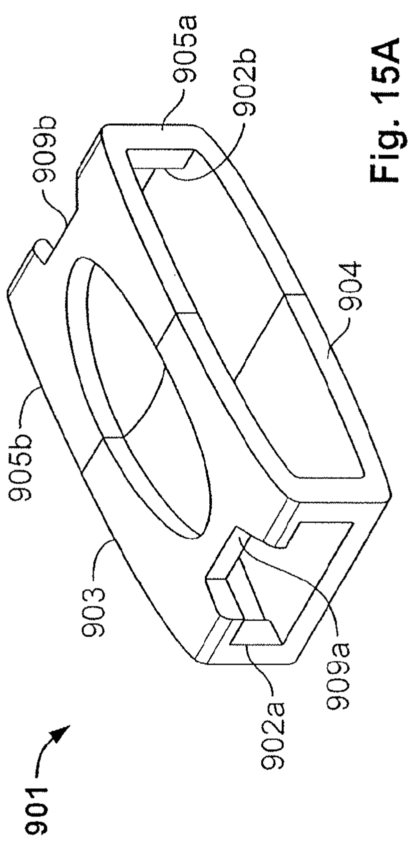
FIGS. 15A-C are views of an alternative exemplary embodiment of a first coupler element configured as a bit.
Figure 15B:
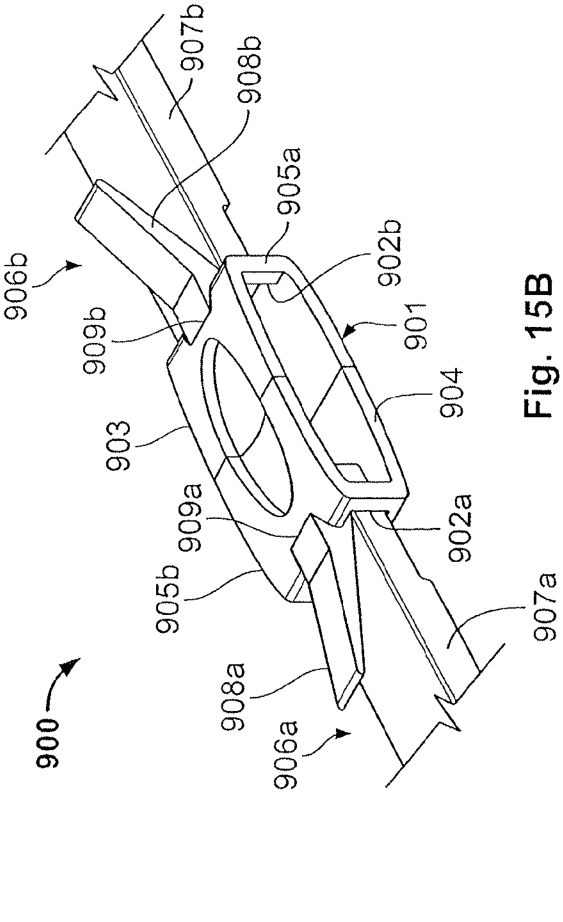
Figure 15C:
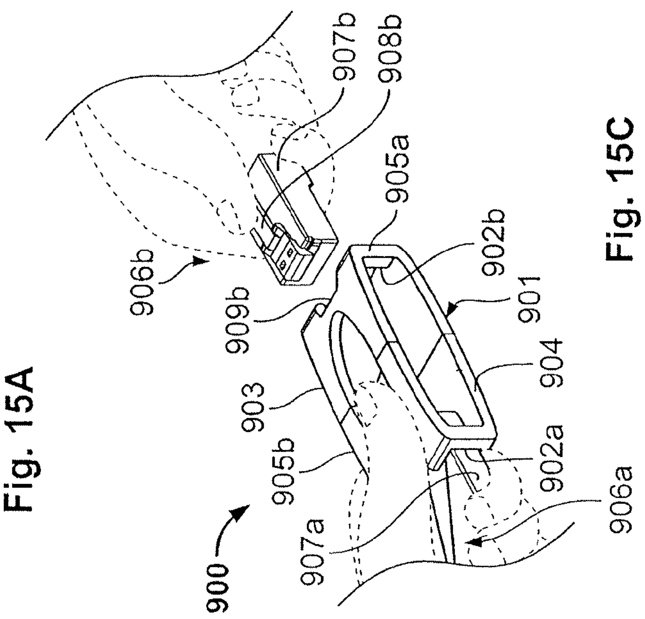

Turning now to FIGS. 15A-C, an alternative exemplary embodiment of the patch cord assembly 900 generally includes a first coupler element configured as a bit element 901. The bit element 901 may have a rectangular or box-shaped configuration. Further, the bit element 901 may have a substantially symmetrical structure, generally including a first opening 902*a* and a second opening 902*b* on opposite sides of the bit element 901. The first and second openings 902*a* and 902*b* are configured and dimensioned for insertion of the first and second patch cords 906*a* and 906*b*, respectively, i.e., detachably securing the first and second patch cords 906*a* and 906*b* in a juxtaposed relation, e.g., opposing, spaced relation.

With respect to FIG. 15A, the bit element 901 is depicted in an "open" configuration. The first and second openings 902*a* and 902*b* are depicted in the proper configuration to receive the first and second patch cords 906*a* and 906*b*. In particular, the bit element 901 may be configured and dimensioned in such a way as to provide a secure fit around the first and second plug 907*a* and 907*b* of the first and second patch cords 906*a* and 906*b*. The secure fit inside the bit element 901 thereby prevents unwanted motion of the first and second plugs 907*a* and 907*b*, which generally reduces the damage which could occur during packaging and transportation of patch cords. Further, the bit element 901 generally includes at least two bit notches 909*a* and 909*b*, which lock-in and secure the first and second bridges 908*a* and 908*b* of first and second plugs 907*a* and 907*b*. Specifically, the at least two bit notches 909*a* and 909*b* are configured and dimensioned to receive the spring-loaded first and second bridges 908*a* and 908*b* on the first and second plugs 907*a* and 907*b* in order to prevent the first and second plugs 907*a* and 907*b* from being pulled out of the bit element 901. Once the first and second patch cords 906*a* and 906*b* are required for use, the spring-loaded first and second bridges 908*a* and 908*b* on the first and second plugs 907*a* and 907*b* may be compressed downward in order to release the first and second plugs 907*a* and 907*b* from one of the at least two bit notches 909*a* and 909*b*, respectively.

Still with reference to FIG. 15A, the embodiment of the bit element 901 may optionally include a spacer element 113, as depicted in FIG. 1, for preventing contact between the first plug 907*a* of the first patch cord 906*a* and the second plug 907*b* of the second patch cord 906*b*. Spacer element 113 may be fabricated from low cost materials, e.g., foam, Styrofoam, or the like, and would be configured and dimensioned to fit inside the bit element 901. The bit element 901 further includes a top surface 903, a bottom surface 904, and side surfaces 905*a* and 905*b*. In particular, as depicted in FIG. 15A, top surface 903 may optionally include an indented and/or sunken portion of a variety of configurations, including but not limited to, e.g., circular, elliptical, rectangular, square, or the like. The indented and/or sunken portion of the top surface 903 provides an improved gripping of the bit element 901, especially during the course of separating the first and second patch cords 906*a* and 906*b*. Specifically, the user/installer may use the indented and/or sunken portion of the top surface 903 to grip and pull away the bit element 901 as the user/installer depresses the first or second bridge 908*a* or 908*b* of the first or second plugs 907*a* or 907*b* and removes the first or second plug 907*a* or 907*b* from the bit element 901. Further still, although the bit element 901 is illustrated with "open" side surfaces 905*a* and 905*b* in FIG. 15A, the bit element 901 may optionally include a solid side surface 905*a* and 905*b* or an "open" side surface of a variety of configurations and dimensions, including, e.g., circular, elliptical, rectangular, square, or the like.

With reference now to FIG. 15B, the exemplary embodiment of the patch cord assembly 900 is depicted in an interlocked position. In particular, the first and second plugs 907*a* and 907*b* of the first and second patch cords 906*a* and 906*b* have been locked into the bit element 901 by locking and/or snapping in and securing the first and second bridges 908*a* and 908*b* into the first and second bit notches 909*a* and 909*b*. The removal of the second patch cord 906*b* is illustrated in FIG. 15C. Specifically, the bit element 901 has been gripped by the user/installer, the second bridge 908*b* has been depressed, and the second plug 907*b* has been detached from the bit element 901. As would be understood by one skilled in the art, the process of removing the second patch cord 906*b* from the bit element 901 may be repeated in order to similarly detach the second patch cord 906*a* from the bit element 901.

Figure 16A:
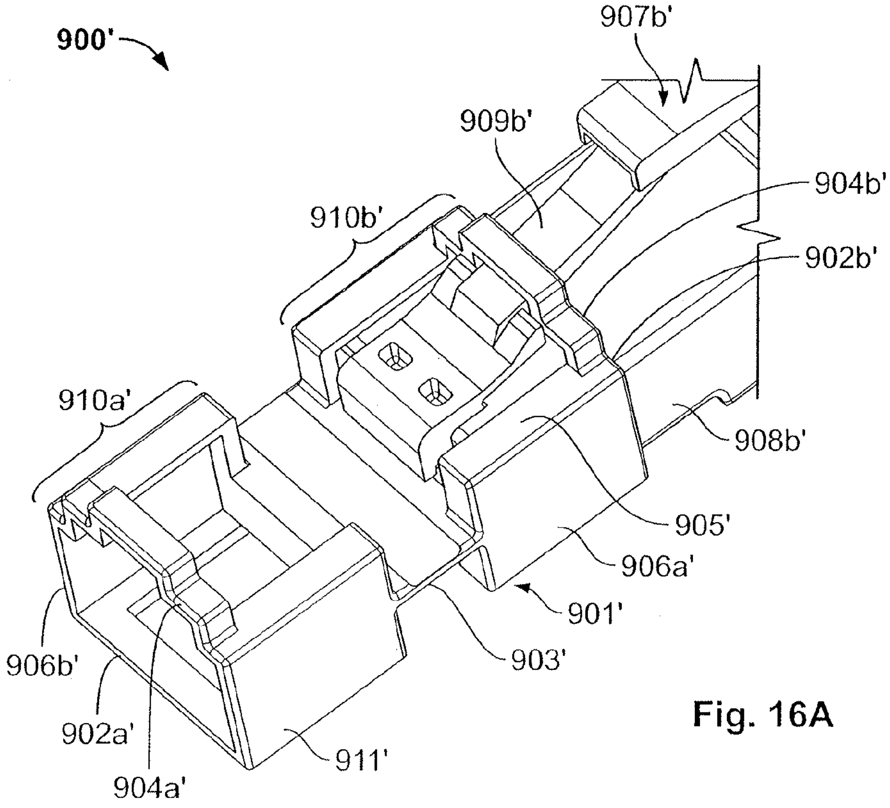
FIGS. 16A-B are views of an alternative exemplary embodiment of a bit.

Turning now to FIGS. 16A and B, an alternative exemplary embodiment of the patch cord assembly 900 as discussed with respect to FIGS. 15A-C is illustrated. In particular, the exemplary patch cord assembly 900' generally includes a first coupler element configured as a bit element 901'. The bit element 901' may have a substantially rectangular or box-shaped configuration. Further, the bit element 901' may have a substantially symmetrical structure, generally including a first bit element 910*a*' and a second bit element 910*b*' further including a first opening 902*a*' and a second opening 902*b*', respectively, on opposite sides of the bit element 901'. The first and second openings 902*a*' and 902*b*' are configured and dimensioned for insertion of the first and second patch cords 907*a*' (not shown) and 907*b*', respectively, i.e., for detachably securing the first and second patch cords 907*a*' and 907*b*' in a juxtaposed relation, e.g., an opposing, spaced relation.

FIG. 16A illustrates the exemplary embodiment of the patch cord assembly 900' including only the second patch cord 907*b*'. However, it should be understood that the first patch cord 907*a*' may be detachably secured to the exemplary patch cord assembly 900' in a similar fashion as that shown for the second patch cord 907*b*', i.e., by insertion of the first plug 908*a*' into the first opening 902*a*'. With specific reference to the structure of the bit element 901', the first and second bit elements 910*a*' and 910*b*' are connected by a bit element connector 903'. The bit element connector 903' may be configured and dimensioned in a variety of sizes so as to provide sufficient stability and strength to the structure of the bit element 901', thereby preventing unwanted motion and damage to the first and second patch cords 907*a*' and 907*b*'. A thin yet strong profile of the bit element connector 903' may further reduce the materials necessary for manufacturing the first coupler element as disclosed herein. The I-shaped profile of the first and second sides 906*a*' and 906*b*' permits the bit element 901' to have a degree of flexibility so as to permit the bit element 901' to slightly bend at the bit element connector 903' during packaging of the plurality of patch cords. The first and second bit elements 910*a*' and 910*b*' generally further include first and second notches 904*a*' and 904*b*' for locking in the spring-loaded first and second bridges 909*a*' and 909*b*' of the first and second plugs 908*a*' and 908*b*', respectively. In particular, the first and second notches 904*a*' and 904*b*' may be configured and dimensioned in a variety of forms so as to capture and securely hold the first and second plug 908*a*' and 908*b*' in a juxtaposed relation and preventing unwanted motion of said plugs. The first and second bit elements 910*a*' and 910*b*' further include a top surface 905' which may either be solid or may be uncovered as depicted. It should be understood by those of skill in the art that the top surface 905' would be configured so as to permit the first and second plugs 908*a*' and 908*b*' to be inserted into the first and second openings 902*a*' and 902*b*' and for the first and second bridges 909*a*' and 909*b*' to pass through and lock into the first and second notches 904*a*' and 904*b*'. The bottom surface 911' of the first and second bit elements 910*a*' and 910*b*' may also be solid or uncovered, e.g., perforated, open, or the like, as depicted. The solid configuration may be desired to, e.g., further strengthen the structure of the bit element 901', and an uncovered configuration may be desired to, e.g., reduce the materials utilized for manufacturing the bit element 901', thereby reducing the waste created and cost of manufacturing.

Figure 16B:
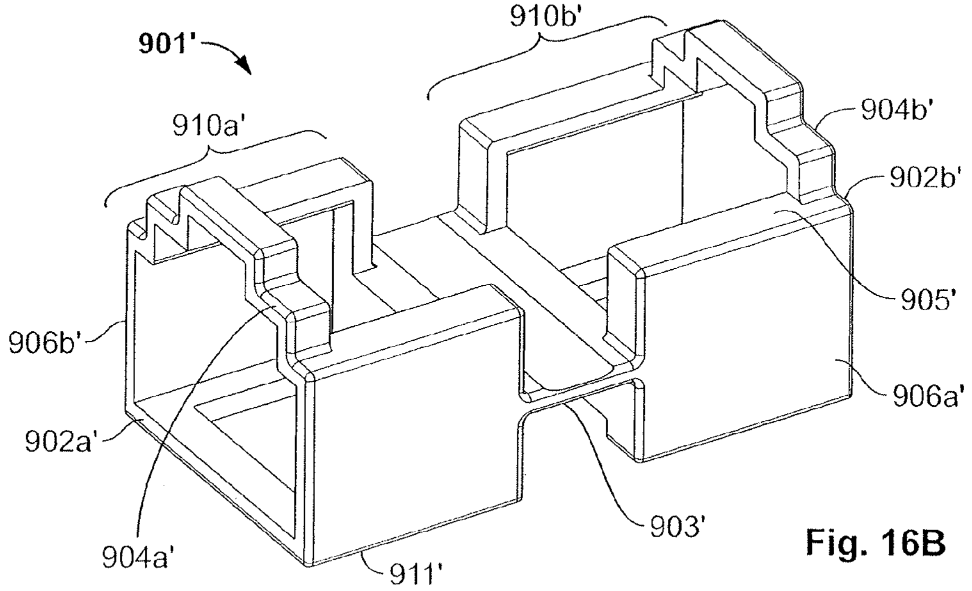

As would be understood by those of skill in the art, to detachably secure the first and second patch cords 907*a*' and 907*b*' to the bit element 901', the first and second plugs 908*a*' and 908*b*' may be pushed/pressed into the first and second openings 902*a*' and 902*b*' until the first and second bridges 909*a*' and 909*b*' engage and/or lock into the first and second notches 904*a*' and 904*b*'. To detach one or both of the first and second patch cords 907*a*' and 907*b*' from the bit element 901', the process may be reversed by depressing the first and second bridges 909*a*' and 909*b*' until the first and second notches 904*a*' and 904*b*' have been disengaged, i.e., unclipped or unlocked, and pulling out the first and second plugs 908*a*' and 908*b*'. FIG. 16B further illustrates the bit element 901' in an "open" configuration, i.e., prior to detachably securing a first and second patch cord 907*a*' and 907*b*' to the bit element 901'.

Figure 17A:
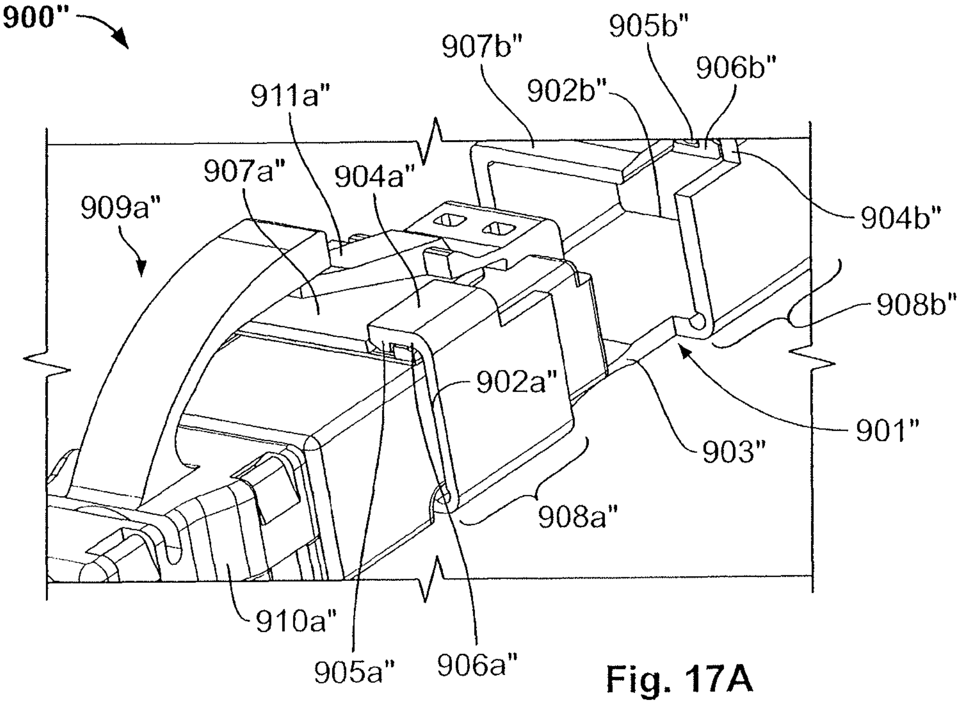
FIGS. 17A-C are views of another alternative exemplary embodiment of a bit.
Figure 17B:
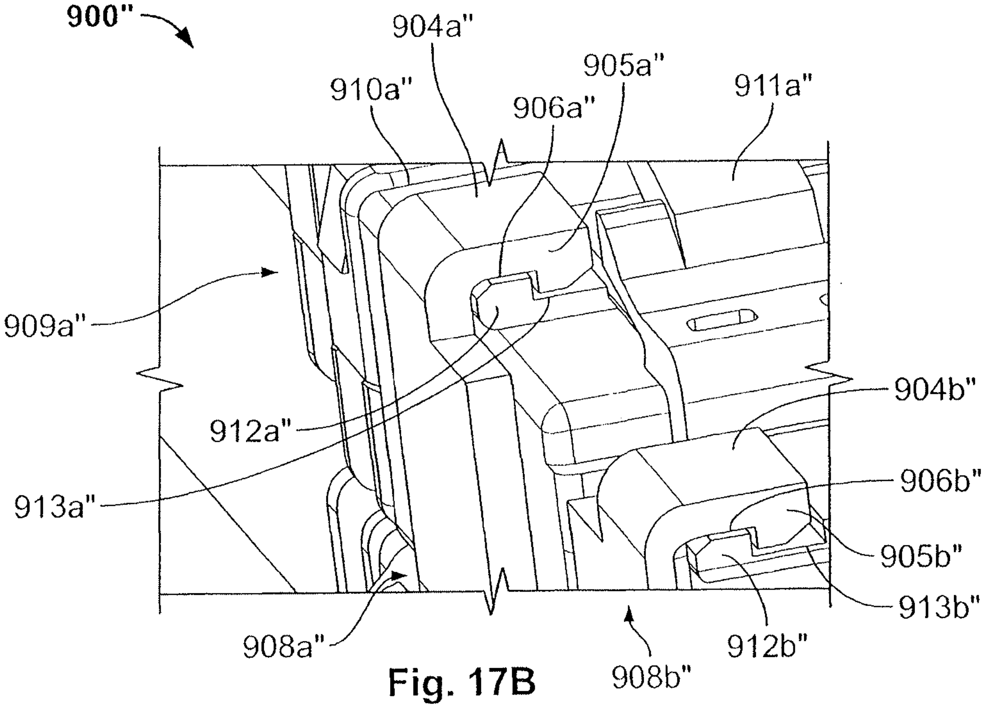
Figure 17C:
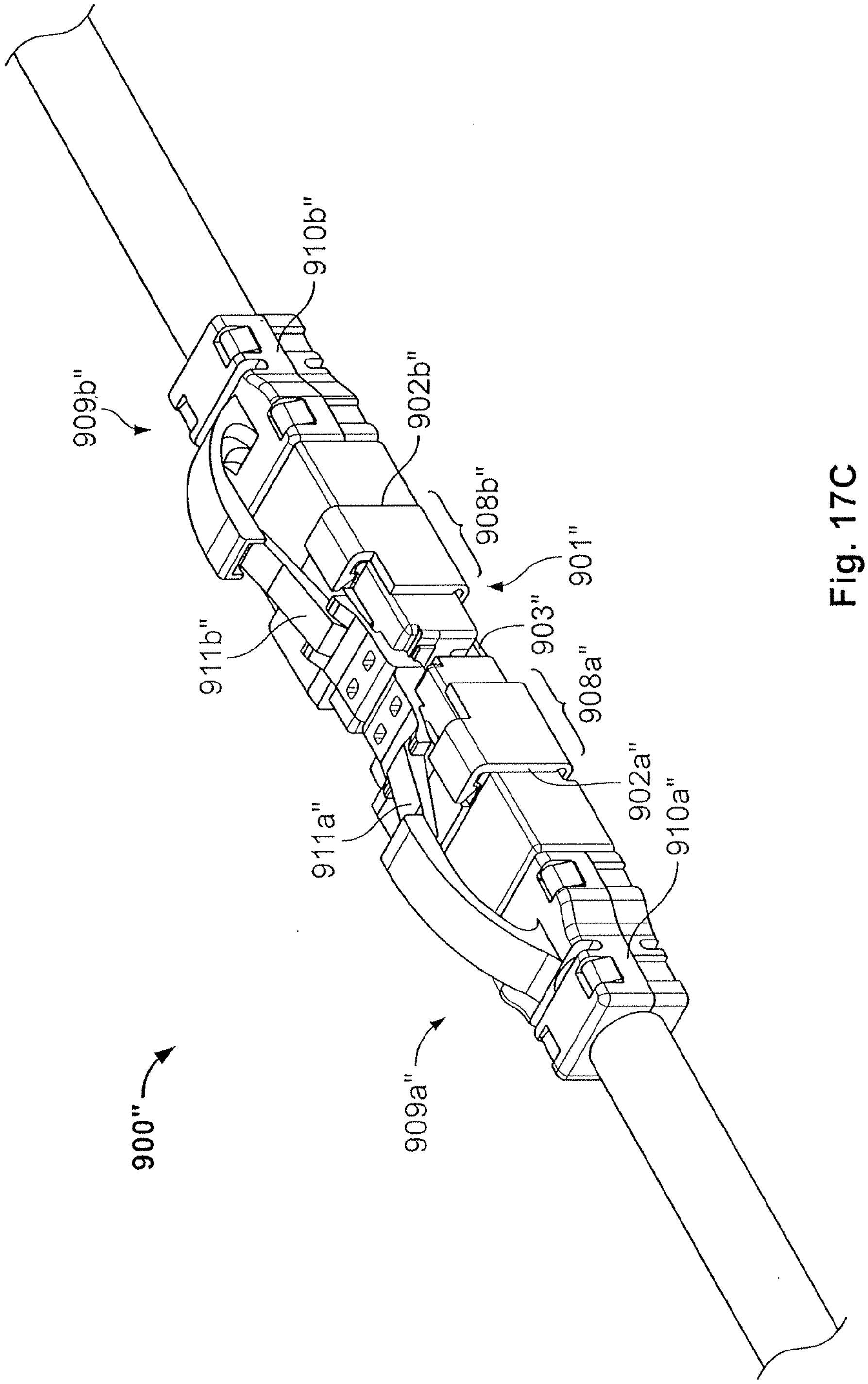

Turning now to FIGS. 17A-C, yet another alternative exemplary embodiment of the patch cord assembly 900 as discussed with respect to FIGS. 15A-C is illustrated. In particular, the exemplary patch cord assembly 900" generally includes a first coupler element configured as a bit element 901". The bit element 901" may have a substantially rectangular or box-shaped configuration. Further, the bit element 901" may have a substantially symmetrical structure, generally including a first bit element 908*a*" and a second bit element 908*b*" further including a first opening 902*a*" and a second opening 902*b*", respectively, on opposite sides of the bit element 901". The first and second openings 902*a*" and 902*b*" are configured and dimensioned for insertion of the first and second patch cords 909*a*" and 909*b*" (not shown), respectively, i.e., for detachably securing the first and second patch cords 909*a*" and 909*b*" in a juxtaposed relation, e.g., an opposing, spaced relation.

As can be seen in FIGS. 17A-C, the structure of the bit element 901" includes a first and second bit element 908*a*" and 908*b*" in an opposed relation and connected at the center by a bit connector 903". The bit connector 903" extends from the center and connects to the bottom surface of the first and second bit elements 908*a*" and 908*b*" to provide support for the bottom surface of the first and second plugs 910*a*" and 910*b*". Because the first and second bit elements 908*a*" and 908*b*" are substantially symmetrical in structure and configuration, a detailed description of only one of the bit elements will be provided. The first bit element 908*a*" generally further includes a first connector 904*a*" and a second connector 907*a*" which are configured and dimensioned to detachably interlock around the first plug 910*a*". In particular, the first connector 904*a*" has a first male element 905*a*" and a first female element 906*a*", while the second connector 907*a*" has a second male element 912*a*" and a second female element 913*a*", which can be more clearly seen in FIG. 17B. The first bit element 908*a*" is configured and dimensioned to permit the first male element 905*a*" and the second female element 913*a*" and the second male element 912*a*" and first female element 906*a*", respectively, to interact and more importantly to clasp each other in a detachable manner to secure the first plug 910*a*" and prevent unwanted motion. The first bit element 908*a*" may further be manufactured from a flexible material, e.g., plastic, which permits the side surfaces of the first bit element 908*a*" to be bent outward to permit the insertion of the first plug 910*a*". Once the first bridge 911*a*" of the first plug 910*a*" has passed the first and second connectors 904*a*" and 907*a*" in the direction of the bit connector 903", the first and second connectors 904*a*" and 907*a*" may be bent back around the first plug 910*a*" and clasped and/or interlocked with each other through the first and second male elements 905*a*" and 912*a*" and first and second female elements 906*a*" and 913*a*". Thus, the interlocked first bit element 908*a*" prevents the first plug 910*a*" from moving side to side, while the first and second connectors 904*a*" and 907*a*" prevent the first plug 910*a*" from moving away from the bit connector element 903" by abutting the bridge 911*a*".

Still with reference to FIGS. 17A-C, although not depicted, the exemplary patch cord assembly 900" may further include a spacer element similar to the spacer element 113 of FIG. 1 for preventing contact between the first plug 910*a*" and second plug 910*b*" of the first patch cord 909*a*" and the second patch cord 909*b*". As noted above, spacer element 113 may extend from the bit element 901" or may be a distinct structure relative thereto.

Turning now to FIGS. 18A-D, an alternative exemplary embodiment of the patch cord assembly 1000 generally includes a first coupler element 1001 configured as a first wedge 1002*a* and a second wedge 1002*b*. In particular, the exemplary patch cord assembly 1000 generally includes first and second wedges 1002*a* and 1002*b* connected on opposing sides to a first coupler element body 1003 and are configured and dimensioned to fit underneath the first and second bridges 1008*a* and 1008*b* of the first and second plugs 1007*a* and 1007*b* for detachably securing the first patch cord 1006*a* to the second patch cord 1006*b* in a juxtaposed relation, e.g., an opposing, spaced relation.

Figure 18A:
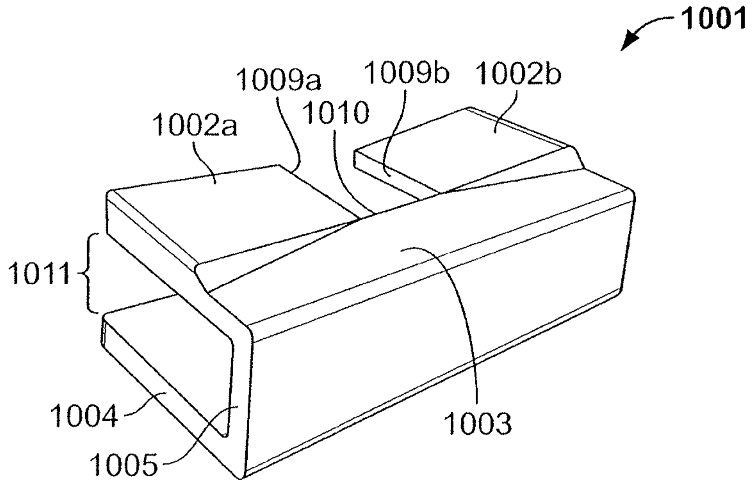
FIGS. 18A-D are views of an alternative exemplary embodiment of a first coupler element configured as a wedge.
Figure 18B:
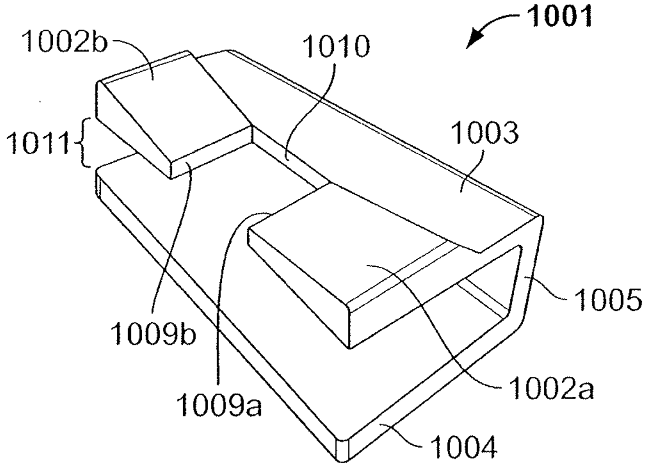

With specific reference to FIGS. 18A and B, the first coupler element 1001 is depicted in an "open" configuration, i.e., prior to detachably securing the first and second patch cords 1006*a* and 1006*b*. The first coupler element body 1003 and the first and second wedges 1002*a* and 1002*b* are configured and dimensioned to provide support against the top surface of the first and second plugs 1007*a* and 1007*b*. The bottom surface 1004 and side surface 1005 are configured and dimensioned to provide support against the bottom and side surfaces of the first and second plugs 1007*a* and 1007*b*, respectively. Thus, the first and second plugs 1007*a* and 1007*b* are prevented from unwanted motion and damage during storage and/or installation. In particularly, the first and second wedges 1002*a* and 1002*b* may have a slanted configuration, e.g., thicker at a distal point away from the first coupler element body 1003 and thinner at the proximal wedge point 1009*a* and 1009*b*, for a more secure fit between the top surface of the first and second plugs 1007*a* and 1007*b* and the bottom surface of the first and second bridges 1008*a* and 1008*b*. The wedge space 1010 further permits the first coupler element 1001 to be detachably secured to the first and second plugs 1007*a* and 1007*b*, while permitting a path for the first and second bridges 1008*a* and 1008*b* to pass freely until the side surface of the first and second plugs 1007*a* and 1007*b* abuts the side surface 1005. The substantially C-shaped configuration of the first and second wedges 1002*a* and 1002*b*, first coupler element body 1003, side surface 1005 and bottom surface 1004 create a coupler side opening 1011 through which the first and second plugs 1007*a* and 1007*b* may be introduced.

Figure 18C:
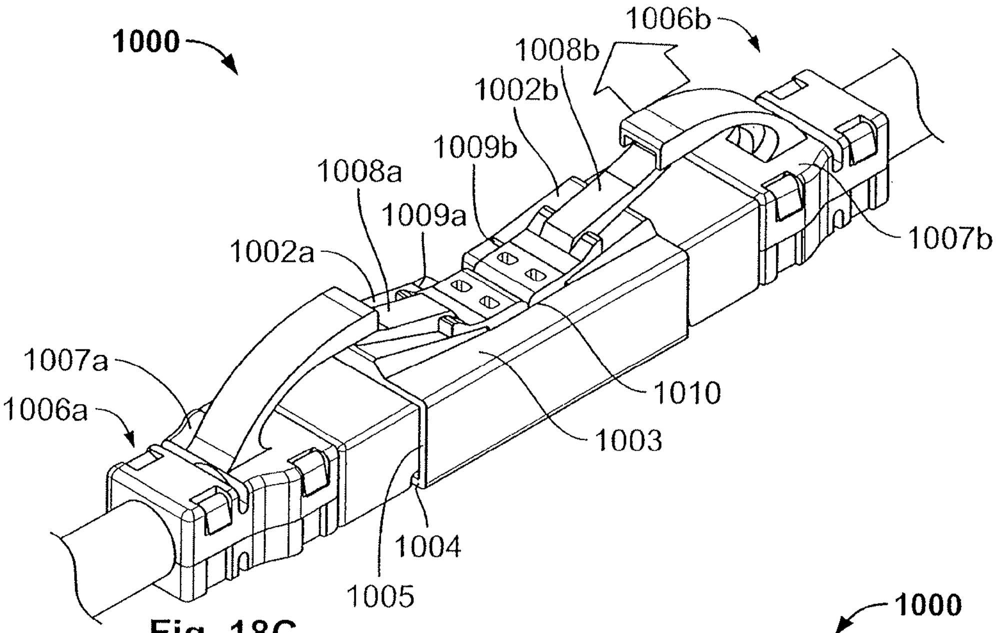
Figure 18D:
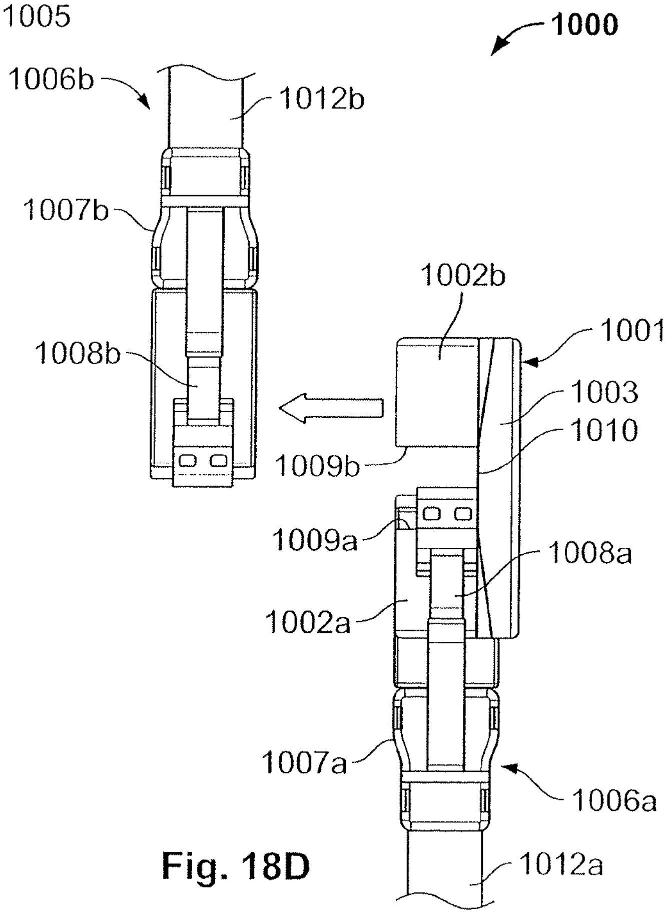

The steps for detachably securing the first and second plugs 1007*a* and 1007*b* in a juxtaposed relation are illustrated in FIGS. 18C and D. In particular, the first and second plugs 1007*a* and 1007*b* may be introduced and/or slid in a sideways direction through the coupler side opening 1011, thereby locking the wedge underneath the first and second bridges 1008*a* and 1008*b* and preventing unwanted motion and damage to the first and second plugs 1007*a* and 1007*b*. As would be understood by one skilled in the art, to detach either or both of the first and second plugs 1007*a* and 1007*b*, the first and second plugs 1007*a* and 1007*b* may be pushed and/or slid in a sideways direction as shown by the arrows in FIGS. 18C and D, i.e., out of the coupler side opening 1011.

Another exemplary embodiment of the patch cord assembly 1000 may include a spacer element 113 similar to the one of FIG. 1 for preventing contact between the first plug 1007*a* and the second plug 1007*b*. As noted above, spacer element 113 may extend from the coupler element(s) or may be a distinct structure relative thereto.

Figure 19A:
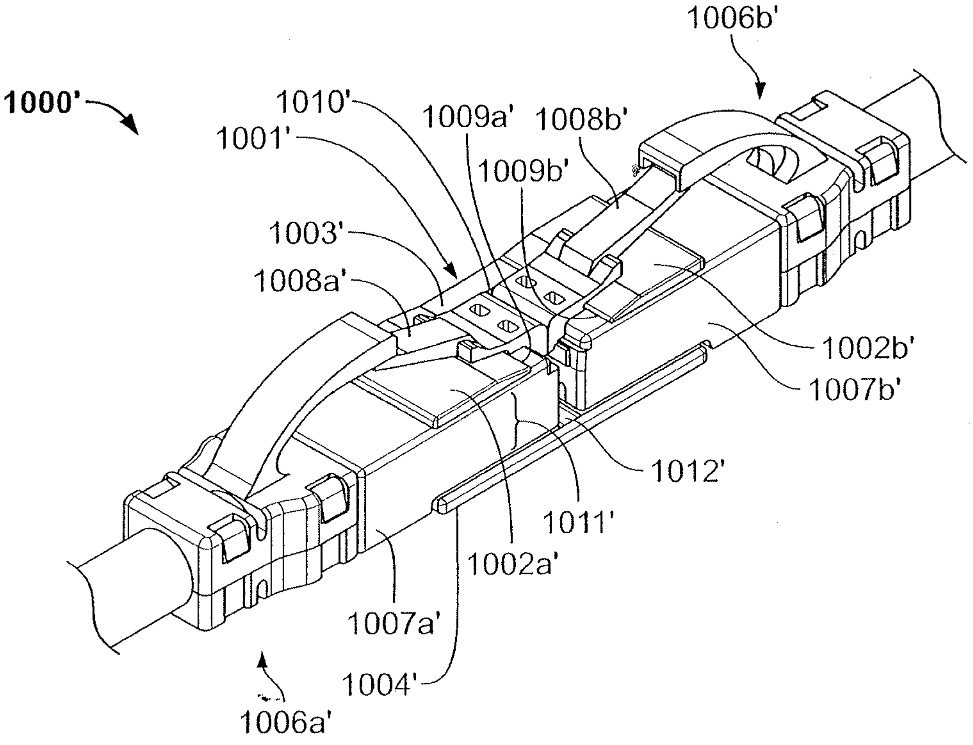
FIGS. 19A-C are views of an alternative exemplary embodiment of a wedge.
Figure 19B:
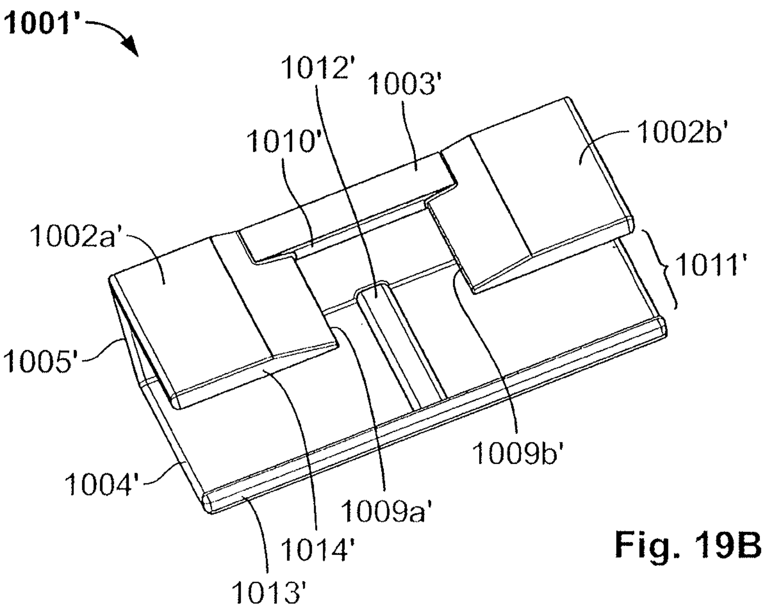
Figure 19C:
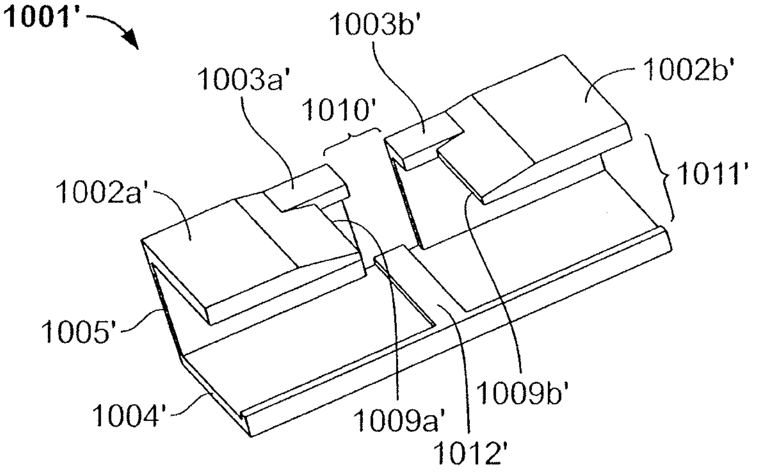

Turning now to FIGS. 19A-C, yet another alternative exemplary embodiment of the patch cord assembly 1000 as discussed with respect to FIGS. 18A-D is illustrated. In particular, the exemplary patch cord assembly 1000' generally includes a first coupler element 1001' configured as a first wedge 1002*a*' and a second wedge 1002*b*'. The exemplary patch cord assembly 1000' generally further includes first and second wedges 1002*a*' and 1002*b*' connected on opposing sides to a first coupler element body 1003' and are configured and dimensioned to include a top surface which generally fits underneath the first and second bridges 1008*a*' and 1008*b*' of the first and second plugs 1007*a*' and 1007*b*' for detachably securing the first and second patch cords 1006*a*' and 1006*b*' in a juxtaposed relation, e.g., an opposing, spaced relation.

FIG. 19A illustrates the exemplary patch cord assembly 1000' in an interlocked state, i.e., wherein the first and second patch cords 1006*a*' and 1006*b*' are detachably secured relative to each other in a juxtaposed relation. It should be noted that the first coupler element 1001' is configured and dimensioned to function substantially similarly to the first coupler element 1001 of FIGS. 18A-D, except for the elements and/or characteristics mentioned herein. In particular, the first coupler element 1001' may include a first coupler element body 1003' which spans and/or extends from the first wedge 1002*a*' to the second wedge 1002*b*' and thereby connects the two as depicted in FIG. 19B. However, the first coupler element 1001' may also optionally include a first coupler element body 1003*a*' and 1003*b*' which does not connect the first and second wedges 1002*a*' and 1002*b*' to each other, but instead connects the first and second wedges 1002*a*' and 1002*b*' to the side surface 1005' as depicted in FIG. 19B. Although the connecting first coupler element body 1003' may be implemented to provide a stronger structure and/or support of the first and second plugs 1007*a*' and 1007*b*', the non-connecting first coupler element body 1003*a*' and 1003*b*' may be implemented to reduce the amount of materials to dispose and the cost of manufacturing due to less materials being utilized.

In addition, as can be seen from FIGS. 19B and C, the first coupler element 1001' may further include a spacer element 1012'. Although the exemplary patch cord assembly 1000' may include a spacer element 113 similar to the one in FIG. 1, a raised spacer element 1012' may also be implemented for preventing contact between the first and second plugs 1007*a*' and 1007*b*'. However, it should be noted that the spacer element 1012' may extend form the coupler element (s) or may be a distinct structure relative thereto. As an additional means of detachably securing the first and second plugs 1007*a*' and 1007*b*' with the first coupler element 1001', the bottom surface 1004' and/or optionally the bottom surface of the first and second wedges 1002*a*' and 1002*b*' may further include a first and/or second raised edge 1013' and/or 1014'. Thus, once the first and second plugs 1007*a*' and 1007*b*' have been introduced and/or slid into the coupler side opening 1011' until the side surface of the first and second plugs 1007*a*' and 1007*b*' abuts the inner side surface 1005' of the first coupler element 1001', the first and second raised edges 1013' and 1014' snap and/or lock around the outer edge of the side surface of the first and second plugs 1007*a*' and 1007*b*' to prevent said plugs from sliding out of the coupler side opening 1011'. As would be understood by one skilled in the art, to detach the first and second plugs 1007*a*' and 1007*b*' from the first coupler element 1001', the first coupler element 1001' may be grasped by a user/installer with one hand, while the other hand is used to pull and/or provide pressure on the first and second plugs 1007*a*' and 1007*b*' in the direction of the coupler side opening 1011'.

Figure 20A:
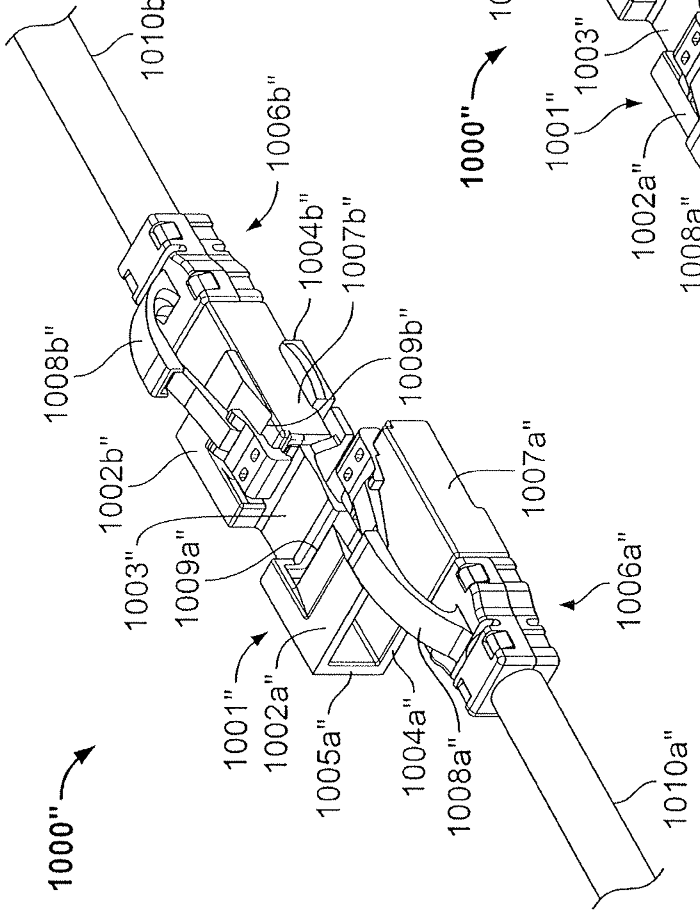
FIGS. 20A-B are views of an alternative exemplary embodiment of a wedge.
Figure 20B:
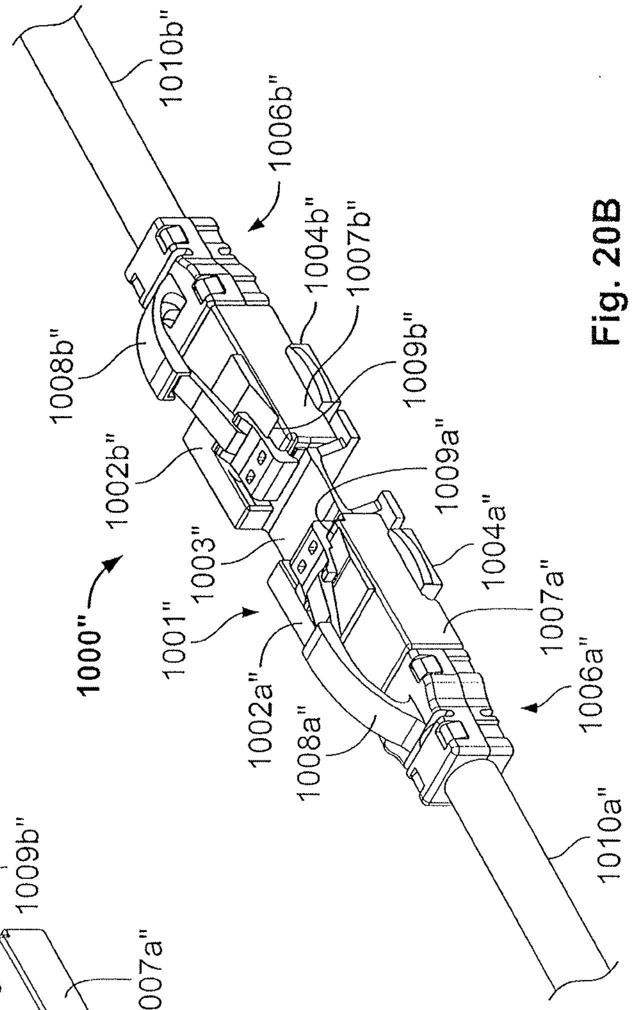

Turning now to FIGS. 20A-B, yet another alternative exemplary embodiment of the patch cord assembly 1000 as discussed with respect to FIGS. 18A-D is illustrated. In particular, the exemplary patch cord assembly 1000" generally includes a first coupler element 1001" configured as a first wedge 1002*a*" and a second wedge 1002*b*". The exemplary patch cord assembly 1000" generally further includes first and second wedges 1002*a*" and 1002*b*" connected in an opposing relation to a wedge connector 1003" and are configured and dimensioned to include a top surface which generally fits underneath the first and second bridges 1008*a*" and 1008*b*" of the first and second plugs 1007*a*" and 1007*b*" for detachably securing the first and second patch cords 1006*a*" and 1006*b*" in a juxtaposed relation, e.g., an opposing, spaced relation. It should be noted that the first coupler element 1001" is configured and dimensioned to function substantially similarly to the first coupler element 1001 of FIGS. 18A-D, except for the elements and/or characteristics mentioned herein.

With reference to FIG. 20A, the exemplary patch cord assembly 1000" is illustrated in a semi-interlocked state, i.e., wherein the second patch cord 1006*b*" is detachably secured to the first coupler element 1001", while the first patch cord 1006*a*" is not detachably secured relative to the second patch cord 1006*b*". As would be understood by those of ordinary skill in the art, the first and second patch cords 1006*a*" and 1006*b*" can generally be introduced and/or slid into the first coupler element 1001" side opening until the side surface of the first and second plugs 1007*a*" and 1007*b*" abuts the inner side surface 1005*a*" of the first coupler element 1001". The top surface of the first and second wedges 1002*a*" and 1002*b*" thus fits between the top surface of the first and second plugs 1007*a*" and 1007*b*" and the first and second bridges 1008*a*" and 1008*b*", while the first bottom surface 1004*a*" and the second bottom surface (not shown) support the bottom surface of the first and second plugs 1007*a*" and 1007*b*". The first coupler element 1001" can optionally include raised edges on a side portion of the first bottom surface 1004*a*" and the second bottom surface (not shown) for additional security in detachably securing the first and second plugs 1007*a*" and 1007*b*" relative to the first coupler element 1001". Once the first and second plugs 1007*a*" and 1007*b*" have been introduced and/or slid into the first coupler element 1001", the raised edges generally snap and/or lock around the outer edge of the side surface of the first and second plugs 1007*a*" and 1007*b*" to prevent said plugs from sliding out of the first coupler element 1001" side opening.

FIG. 20B illustrates the exemplary patch cord assembly 1000" in an interlocked state, i.e., wherein the first and second patch cords 1006*a*" and 1006*b*" are detachably secured relative to each other in a juxtaposed relation. In particular, the first coupler element 1001" generally includes a wedge connector 1003" substantially similar to the bit element connector 903' of FIGS. 16A-B. The wedge connector 1003" thus generally has a substantially I-shaped configuration when connected to the first and second wedges 1002*a*" and 1002*b*" and, depending on the thickness of the wedge connector 1003", provides a flexible property to the exemplary patch cord assembly 1000". Specifically, the wedge connector 1003" permits the first and second wedge 1002*a*" and 1002*b*" to bend and/or flex slightly relative to each other for, e.g., improved packaging of patch cords, management of patch cords during installation, or the like. The wedge connector 1003" thereby provides, e.g., a secure, yet flexible structure and/or support of the first and second plugs 1007*a*" and 1007*b*", preserves a spaced relation between the first and second plugs 1007*a*" and 1007*b*" to prevent damage to said plugs, and may be implemented to reduce the amount of materials required for fabrication and/or disposal after installation. As would be understood by one skilled in the art, to detach the first and second plugs 1007*a*" and 1007*b*" from the first coupler element 1001", the first coupler element 1001" can generally be grasped by a user/installer with one hand, while the other hand is used to pull and/or provide pressure on the first and second plugs 1007*a*" and 1007*b*" in the direction of the first coupler element 1001" side opening.

The present disclosure also encompasses an exemplary method of patch cord assembly which generally includes detachably securing a first patch cord 101 relative to a second patch cord 102 using a first coupler element, configured as one of a first band element 107, a first sleeve element 301, a first I-shaped coupler 401, first and second loops 501*a* and 501*b*, first and second covers 602*a* and 602*b*, first and second rings 702*a* and 702*b*, first and second latches 802*a* and 802*b*, a bit 901, first and second wedges 1002*a* and 1002*b*, or a similar coupling member as discussed herein. With particular reference to FIGS. 1 and 2, the first patch cord 101 generally includes a first elongated cord 103 and a first plug 105 mounted with respect to one end of said first elongated cord 103, and the second patch cord 102 may include a second elongated cord 104 and a second plug 106 mounted with respect to one end of said second elongated cord 104. Further, the first plug 105 and the second plug 106 may be detachably secured in a juxtaposed relation, e.g., an opposing spaced relation and/or in a substantially co-planar orientation. The exemplary method of patch cord assembly may advantageously function to prevent (or substantially prevent) contact between the first and second plugs 105 and 106, whether based on relative spacing achieved by the coupler element and/or the further spacing achieved by a spacer element.

With respect to FIGS. 4 and 5, the exemplary method of patch cord assembly generally further includes detachably securing the first patch cord 201 relative to the second patch cord 202 using a second coupler element, configured as a second band element 207*b*, wherein the first plug 205 and the second plug 206 are detachably secured in an opposed, spaced relation. The second band element 207*b* is generally dimensionally equal to the first band element 207*a* and is disposed substantially opposite relative to said first band element 207*a*, thereby forming a substantially rectangular configuration.

With respect to FIGS. 6A-C, the exemplary method of patch cord assembly generally further includes detachably securing the first patch cord 101 relative to the second patch cord 102 using an alternative first coupler element, configured as a sleeve element 301, wherein the first plug 105 and the second plug 106 are detachably secured in an opposed, spaced relation. The sleeve element 301 may have a substantially symmetrical rectangular or box-shaped structure, thereby permitting insertion of the first plug 105 and the second plug 106 into the first sleeve opening 302*a* and second sleeve opening 302*b*. The sleeve element 301 further includes at least two sleeve notches 303*a* and 303*b* for locking-in and securing the first and second plug 105 and 106 by receiving the spring-loaded "hook" of the first and second plug 105 and 106, thereby preventing the first and second plug 105 and 106 from being pulled out of the sleeve element 301. The exemplary method of patch cord assembly may advantageously reduce the number of components necessary to detachably secure the first patch cord 101 relative to the second patch cord 102 and provides a more efficient storage and transport of the sleeve element 301, as it may be "knocked-down" to a substantially flat configuration as depicted in FIG. 6C.

With respect to FIG. 7, the exemplary method of patch cord assembly generally further includes detachably securing the first patch cord 101 relative to the second patch cord 102 using an alternative first coupler element, configured as an I-shaped coupler 401. The I-shaped coupler 401 may have a substantially symmetrical structure, including a first and second passage 403*a* and 403*b* dimensioned to receive the first and second plug 105 and 106. Further, the I-shaped coupler 401 includes at least two notches 402*a*, 402*b*, 402*c* and 403*d* on the distal ends of the first and second passage 403*a* and 403*b* for locking-in and securing the first and second plug 105 and 106.

In accordance with yet another embodiment of the present disclosure, the exemplary methods generally include detachably securing a first plug of a first patch cord in juxtaposed relation to a second plug of a second patch cord by utilizing a first coupler element to detachably secure the first plug to the second plug. In particular, the first coupler element can be configured as one of a first band element 107, a first sleeve element 301, a first I-shaped coupler 401, first and second loops 501*a* and 501*b*, first and second covers 602*a* and 602*b*, first and second rings 702*a* and 702*b*, first and second latches 802*a* and 802*b*, a bit 901, first and second wedges 1002*a* and 1002*b*, or a similar coupling member as discussed herein. Further, another exemplary embodiment of the present disclosure may include detachably securing the first patch cord in juxtaposed relation to the second patch cord by utilizing a first coupler element to detachably secure a first elongated cord of the first patch cord to a second elongated cord of the second patch cord. As would be understood by those of ordinary skill in the art, the juxtaposed relation of the first patch cord relative to the second patch cord may be, but is not limited to, e.g., opposed, spaced relation, side-by-side relation, and the like. In addition, in accordance with the embodiments of the present disclosure described herein, the patch cord assembly may include the first coupler element detachably securing the first patch cord in juxtaposed relation to the second patch cord by securing the first and second plugs, securing the first and second elongated cords, allowing the first and second plugs to pass each other and securing the first and second elongated cords, a combination of the above, and the like.

In accordance with embodiments of the present disclosure, an exemplary system of patch cord assembly packaging and payout is presented, generally including a housing for packaging patch cord assemblies previously described herein. The patch cord assembly generally includes at least a first patch cord that includes a first elongated cord and a first plug mounted with respect to one end of said first elongated cord and at least a second patch cord that includes a second elongated cord and a second plug mounted with respect to one end of said second elongated cord. The system further includes at least a first coupler element for detachably securing the at least first patch cord relative to the at least second patch cord with the first plug and the second plug in a juxtaposed relation and at least one housing opening in the housing for paying out, e.g., removing and/or feeding, the at least first patch cord and, more particularly, to paying out the plurality of patch cord assemblies continuously reeled within the housing around a rotating core.

The at least one housing opening of the housing of the exemplary system of patch cord assembly packaging and payout can be configured and dimensioned to prevent the at least first patch cord from receding back into the housing and can also include at least a first coupler element remover for detaching the at least first patch cord from the at least second patch cord. Thus, a predetermined and/or fixed quantity of cables can be provided to a job site boxed/packaged and continuously reeled within the packaging. The cable assemblies can be mechanically joined, e.g., detachably secured relative to each other in a juxtaposed relation, such as, for example, end-to-end, and wound around a central, rotating core for an improved payout. As each cable is withdrawn through the at least one housing opening, e.g., an aperture of the container/housing, the cable assemblies can be optionally uncoupled for installation and the subsequent cable protrudes out of the at least one housing opening by at least the first plug. Thus, the box-style packaging remains ready to uncoil and/or deploy the next patch cord assembly until its contents are exhausted. If additional cables are necessary, a subsequent patch cord assembly packaging and payout device can be moved to the site for deployment.

The exemplary systems of patch cord assembly packaging and payout illustrated and described herein are merely for illustrative purposes and, therefore, the present disclosure is neither limited by nor restricted to such exemplary systems and/or implementations. Further, as would be understood by those of ordinary skill in the art, the systems of patch cord assembly packaging and payout described herein can be manufactured from, e.g., paper, cardboard, plastic, metal, or the like, as long as the material is suitable for the packaging of and payout of patch cord assemblies. When discussing the packaging of and payout of patch cord assemblies, it should also be understood that the patch cord assemblies described above can be continuously connected and/or reeled within the housing around a rotating core, thereby providing a compact and convenient packaging and/or payout of a plurality of patch cords for storage and/or installation.

Figure 21A:
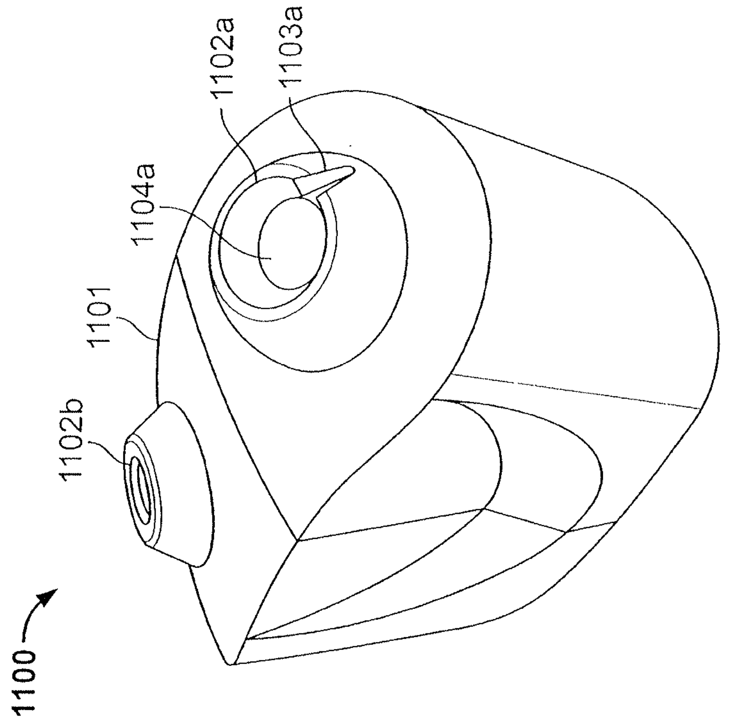
FIGS. 21A-B are views of an exemplary system of patch cord assembly packaging and payout.
Figure 21B:
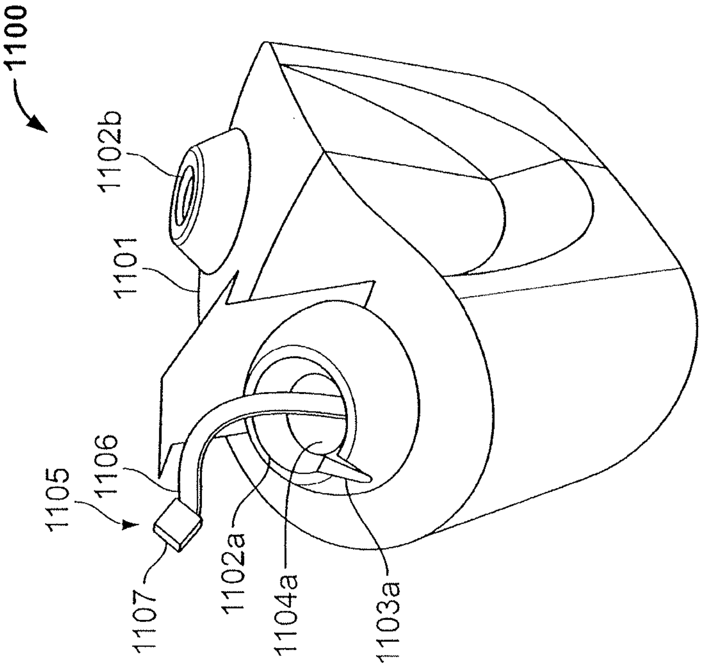

With reference now to FIGS. 21A-B, an exemplary embodiment of the system 1100 of patch cord assembly packaging and payout is illustrated. In particular, the exemplary system 1100 generally includes a housing 1101 configured and dimensioned to house and payout at least one patch cord assembly. The housing 1101 generally further includes at least one housing opening for continuously paying out patch cords of the patch cord assembly. Specifically, housing 1101 includes a first opening 1102*a* and can optionally include a second opening 1102*b* for paying out patch cords. A further discussion of only the first opening 1102*a* shall be made, although it should be understood that the properties and/or elements discussed herein can apply to the second opening 1102*b* as well, since the first and second openings 1102*a* and 1102*b* are generally configured and dimensioned substantially similarly.

As can be seen from FIG. 21A, the first opening 1102*a* can further include a slot 1103*a* configured and dimensioned to prevent patch cords from receding back into the housing 1101. In particular, the slot 1103*a* can initially have a greater/wider opening at the top portion for insertion of an elongated cord of a patch cord and taper down to a smaller/narrower opening at the bottom portion for securely and detachably capturing the patch cord. The first opening 1102*a* can also include a seal 1104*a* which prevents the packaged patch cord assembly from damage during storage and/or transport which can be removed, e.g., torn off, punched out, or the like, prior to use of the exemplary system 1100. Thus, as would be understood by those of ordinary skill in the art, a first patch cord can be removed, e.g., pulled, from the housing 1101 through the first opening 1102*a*. The removal of the first patch cord contemporaneously causes the protrusion of the second patch cord from the first opening 1102*a*, since the first patch cord of the patch cord assembly is detachably coupled to the second patch cord as described above. The user and/or installer can then detach the first patch cord from the second patch cord and, in order to prevent the second patch cord from receding back into the housing through the first opening 1102*a*, the user and/or installer can insert the elongated cord of the second patch cord into the slot 1103*a* such that the plug of the second patch cord abuts the outer surface of the first opening 1102*a*. In particular, the smaller/narrower opening of the slot 1103*a* can be configured and dimensioned to be wide enough to permit the elongated cord to slide freely, while sufficiently narrow enough to prevent the plug of the patch cord to pass, thereby preventing the patch cord from receding back into the housing 1101.

With reference to FIG. 21B, exemplary system 1100 is illustrated during operation, i.e., with the first patch cord 1105 protruding out of the first opening 1102*a*. The first patch cord 1105 can be removed from the first opening 1102*a* by pulling on the first patch cord 1105 in the direction shown by the arrow. Further, as discussed above, to prevent the first patch cord 1105 from receding back into the housing 1101 through the first opening 1102*a*, the first elongated cord 1106 can be placed inside the slot 1103*a* and allowed to slide and/or recede back into the first opening 1102*a* until the first plug 1107 abuts the outer surface of the slot 1103*a*.

Figure 22B:
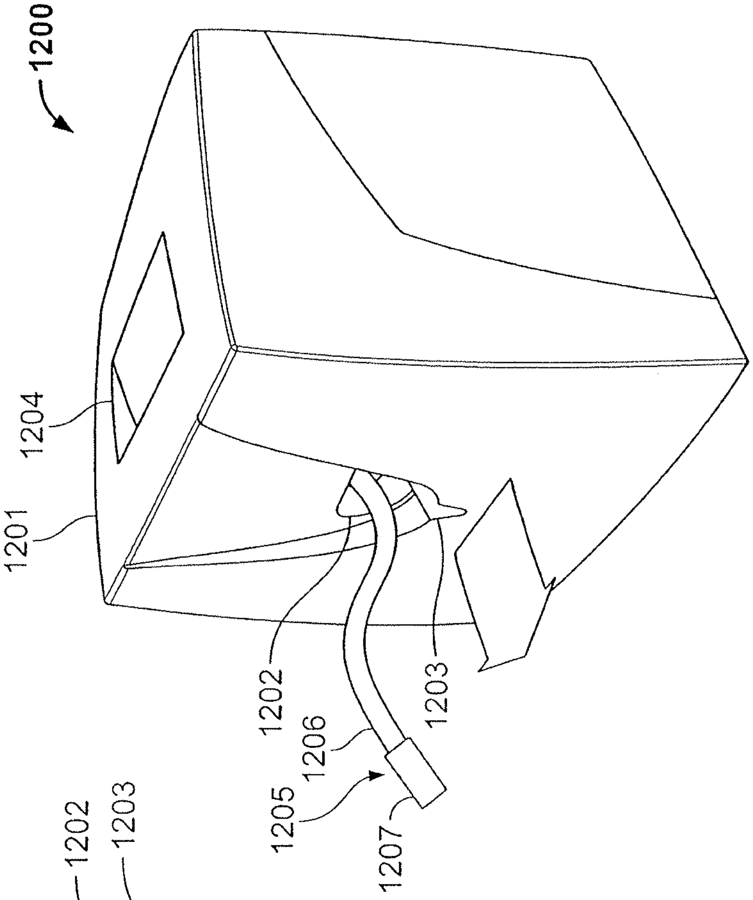
FIGS. 22A-B are views of an alternative exemplary embodiment of a system of patch cord assembly packaging and payout.
Figure 22A:
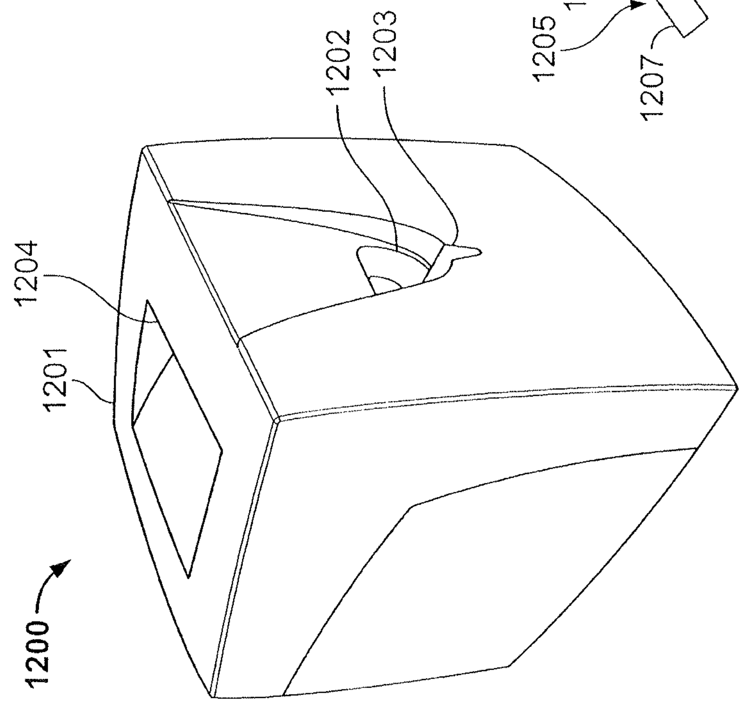

Turning now to FIGS. 22A-B, an alternative exemplary embodiment of the system 1200 of patch cord assembly packaging and payout is illustrated. In particular, exemplary system 1200 generally includes a housing 1201 and a first opening 1202. The first opening 1202 generally further includes a slot 1203 which is configured and dimensioned to prevent the patch cords from receding back into the housing 1201, similarly to the slot 1103*a* of FIGS. 21A-B. The first opening 1202 can optionally include a seal (not shown) for preventing damage to the patch cords inside the housing 1201 during storage and/or transport which can be removed, e.g., torn off, punched out, or the like, prior to use. The housing 1201 can also optionally include a handle 1204 configured as, e.g., an inner ledge and/or pocket permitting the user and/or installer to grip and lift the housing 1201. However, it should be understood that the handle 1204 is not limited to the configuration depicted and instead may be any type of handle, e.g., a handle 1204 protruding out of the top of the housing 1201.

With reference to FIG. 22A, exemplary system 1200 is illustrated during operation, i.e., with the first patch cord 1205 protruding out of the first opening 1202. The first patch cord 1205 can be removed from the first opening 1202 by, e.g., pulling on the first patch cord 1205 in the direction shown by the arrow. Further, as discussed above, to prevent the first patch cord 1205 form receding back into the housing 1201 through the first opening 1202, the first elongated cord 1206 can be placed inside the slot 1203 and allowed to slide and/or recede back into the first opening 1202 until the first plug 1207 abuts the outer surface of the slot 1203.

Figure 23B:
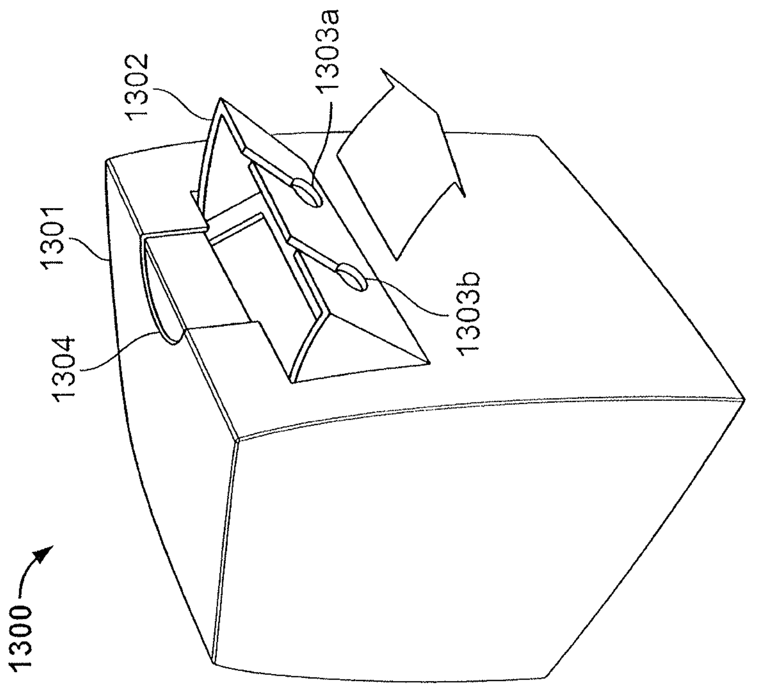
FIGS. 23A-B are views of an alternative exemplary embodiment of a system of patch cord assembly packaging and payout, including a shelf.
Figure 23A:
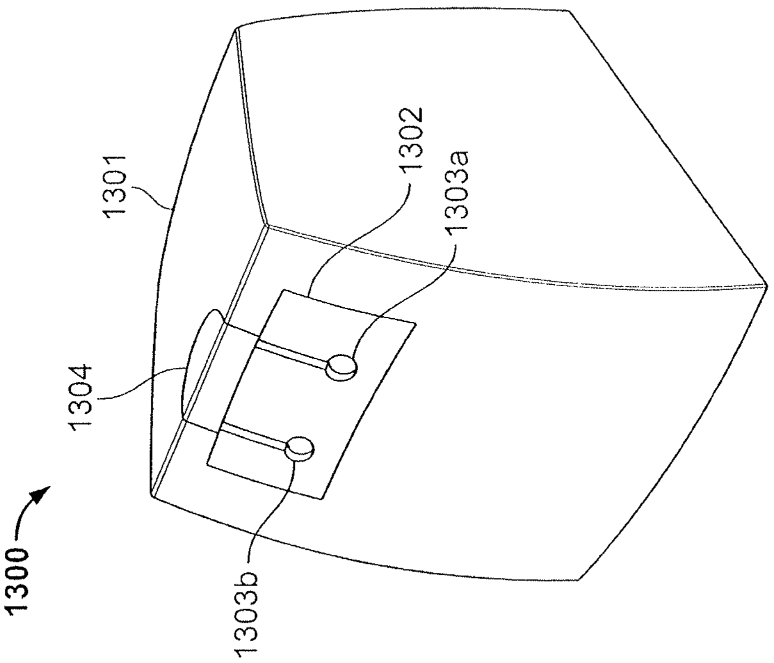

Turning now to FIGS. 23A-B, an alternative exemplary embodiment of the system 1300 of patch cord assembly packaging and payout is illustrated. In particular, exemplary system 1300 generally includes a housing 1301 and a first opening configured as a shelf 1302. The shelf 1302 generally further includes a first slot 1303*a* and optionally a second slot 1303*b* which are configured and dimensioned to prevent the patch cords from receding back into the housing 1301 and for holding the patch cords in place during use and/or installation. The shelf 1302 can also include a seal 1304 for preventing the shelf 1302 from opening during storage and/or transport which can be removed, e.g., torn off, prior to use. FIG. 23A illustrates the exemplary system 1300 in a "packaged" and/or "closed" state with the seal 1304 not yet removed from the housing 1301 and the shelf 1302 closed. On the other hand, FIG. 23B illustrates the exemplary system 1300 in an open configuration with the seal 1304 removed from the housing 1301 and the shelf 1302 open. As would be understood by those of ordinary skill in the art, once the seal 1304 is removed, the shelf 1302 can slide from a closed position to an open position and back, thereby providing access to the patch cords inside.

Figure 24B:
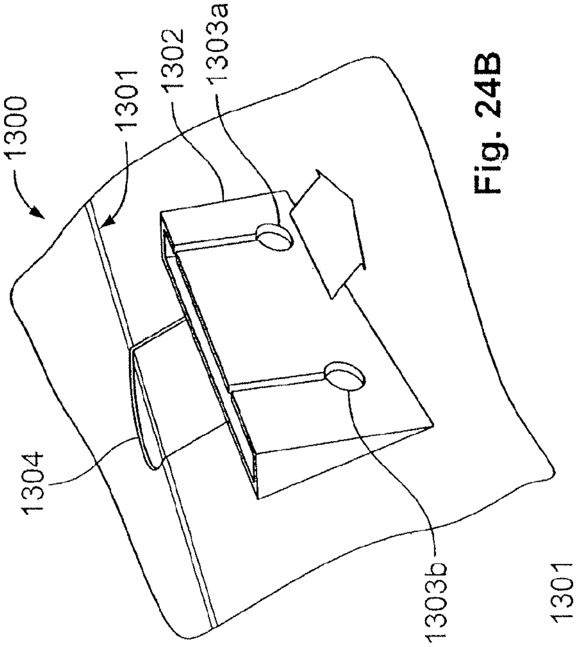
FIGS. 24A-C are views of steps implemented for utilizing a shelf of an exemplary embodiment of a system of patch cord assembly packaging and payout.
Figure 24C:
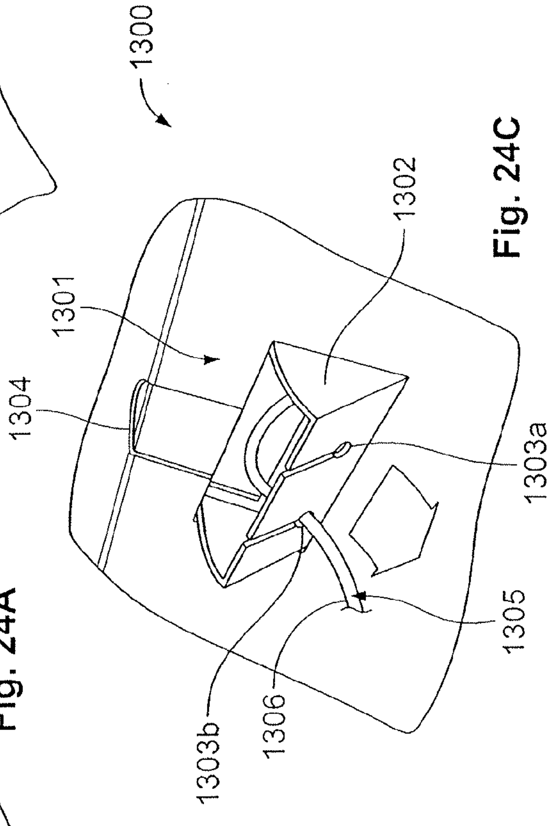
Figure 24A:
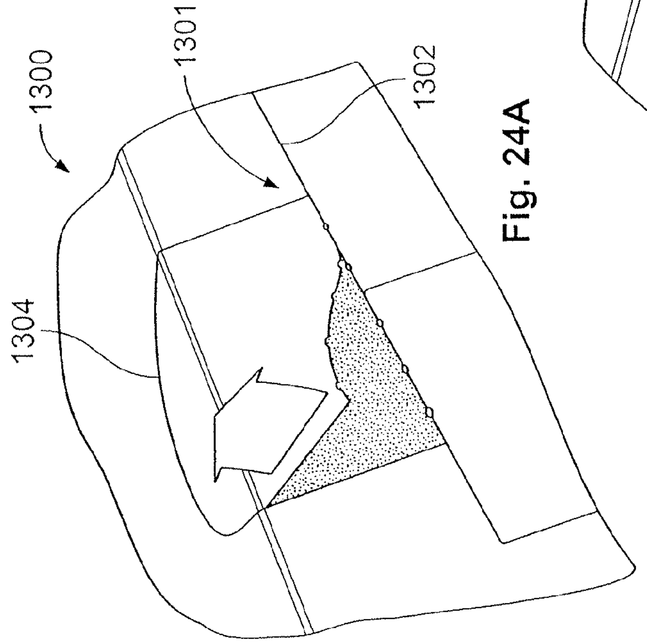

With reference now to FIGS. 24A-C, steps implemented for utilizing the shelf 1302 of the exemplary embodiment of the system 1300 of patch cord assembly packaging and payout are illustrated. Specifically, the detailed removal of the seal 1304 is provided in FIG. 24A. As can be seen, the seal 1304 can be connected to the housing 1301 and includes a perforated edge connecting the seal 1304 to the top portion of the shelf 1302, thus preventing the shelf 1302 from opening while the seal 1304 is still attached. The seal can be manufactured from, e.g., plastic, paper, metal, or the like, and can be configured and dimensioned to provide sufficient support to prevent the shelf 1302 from opening, while being sufficiently thin to tear away and be removed for use of the shelf 1302. Once the seal 1304 has been removed, the shelf 1302 can be opened by pulling on the shelf in the direction indicated in FIG. 24B.

As patch cords 1305 are removed, e.g., pulled out, of the housing 1301 through the shelf 1302, the elongated cord 1306 of the patch cord 1305 can be inserted into the first and/or second slot 1303*a* and/or 1303*b* as shown in FIG. 24C to prevent the patch cord 1305 from receding back into the housing 1301. In particular, the first and second slots 1303*a* and 1303*b* can be configured and dimensioned to have an elongated, narrow portion sufficiently proportioned to permit the elongated cord 1306 of a patch cord 1305 to be passed through with some friction. Further, the first and second slots 1303*a* and 1303*b* can have a lower portion, e.g., a rounded, square, or similar configuration, sufficiently proportioned to permit the elongated cord 1306 of a patch cord 1305 to be passed through freely and/or without friction and sufficiently proportioned and/or configured to permit the plug (not shown) of the patch cord 1305 to pass out of the housing 1301 without damage to the plug when sufficient pressure is applied. However, the lower portion of the first and second slots 1303*a* and 1303*b* is configured and dimensioned to prevent the plug of the patch cord 1305 from passing back into the housing 1301, thus preventing the patch cord from receding back into the housing 1301. Therefore, a user and/or installer can feed the elongated cord 1306 into the first and/or second slot 1303*a* and/or 1303*b*, remove, e.g., pull out, additional patch cords 1305 through the shelf 1302, and allow the patch cord 1305 to remain in the first and/or second slot 1303*a* and 1303*b* for, e.g., organization of patch cords during installation, convenient placement of patch cords during installation, or the like.

Figure 25B:
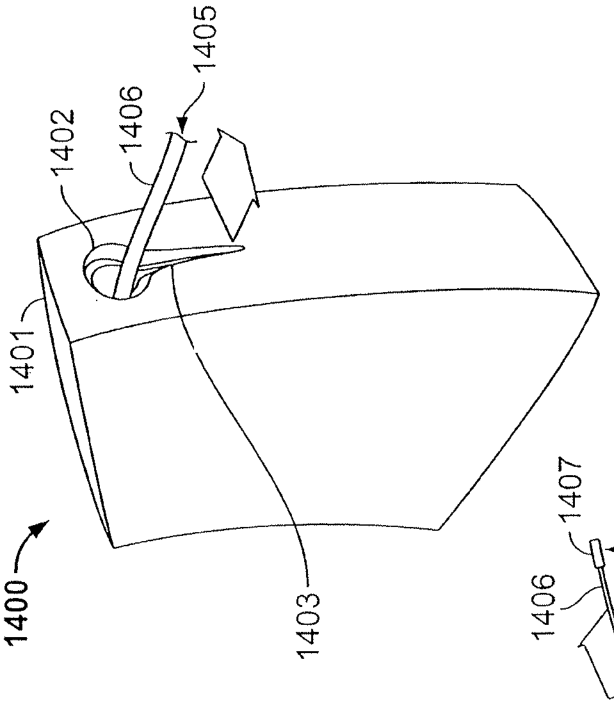
FIGS. 25A-C are views of an alternative exemplary embodiment of a system of patch cord assembly packaging and payout, including a paper slot.
Figure 25C:
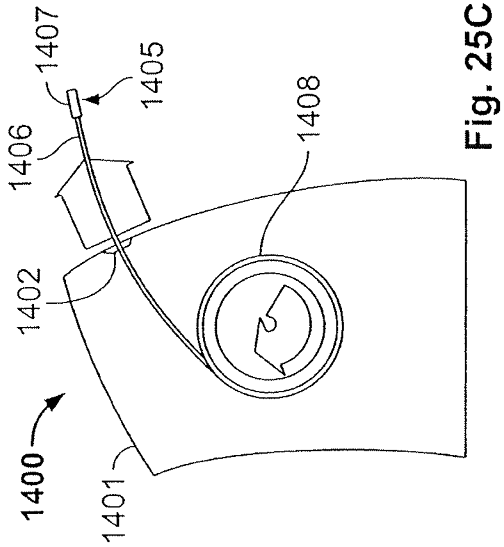
Figure 25A:
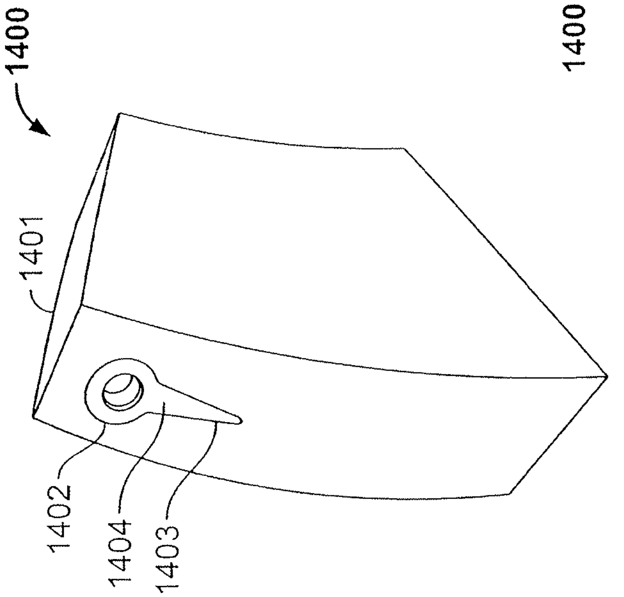

Turning now to FIGS. 25A-C, an alternative exemplary embodiment of the system 1400 of patch cord assembly packaging and payout is illustrated. In particular, exemplary system 1400 generally includes a housing 1401 and a first opening 1402. The first opening 1402 generally further includes a slot 1403 which is configured and dimensioned to prevent patch cords from receding back into the housing 1401. The first opening 1402 can optionally include a seal 1404 for preventing damage to the patch cords inside the housing 1401 during storage and/or transport which can be removed, e.g., torn off, broken, punched out, or the like, prior to use.

FIG. 25A illustrates the exemplary system 1400 in a "closed" and/or "packaged" configuration, particularly showing the seal 1404 attached to the housing 1401, thereby preventing patch cords from being removed from the housing 1401. In contrast, FIG. 25B shows the exemplary system 1400 in an "open" and/or "in use" configuration, depicting the housing 1401 after the seal 1404 has been removed and with a patch cord 1405 protruding out of the first opening 1402. As discussed above, the patch cord assembly is generally continuously reeled within the housing around a rotating core 1408 as illustrated in FIG. 25C. Thus, when the patch cord 1405 is pulled through the first opening 1402 in the direction indicated by the arrow, the rotating core 1408 rotates in the direction shown, i.e., a clockwise direction, thereby unwinding the patch cord assembly to permit the user and/or installer to remove additional patch cords from the housing 1401.

Figure 26C:
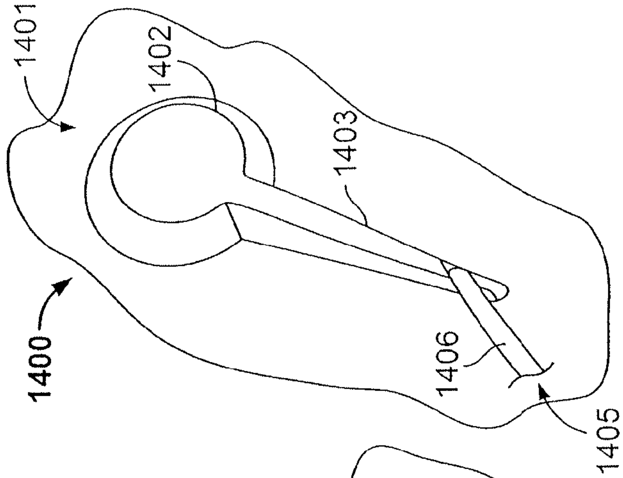
FIGS. 26A-C are views of steps implemented for utilizing a paper slot of the exemplary embodiment of a system of patch cord assembly packaging and payout.
Figure 26B:
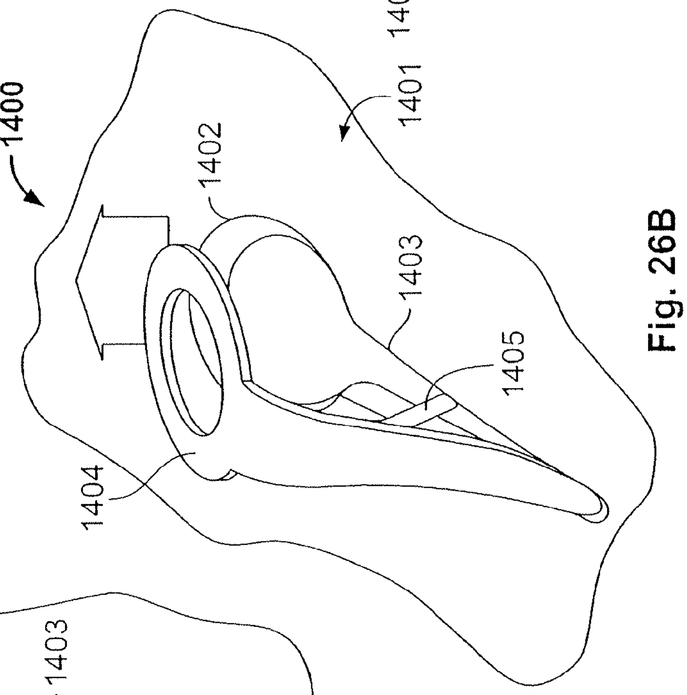
Figure 26A:
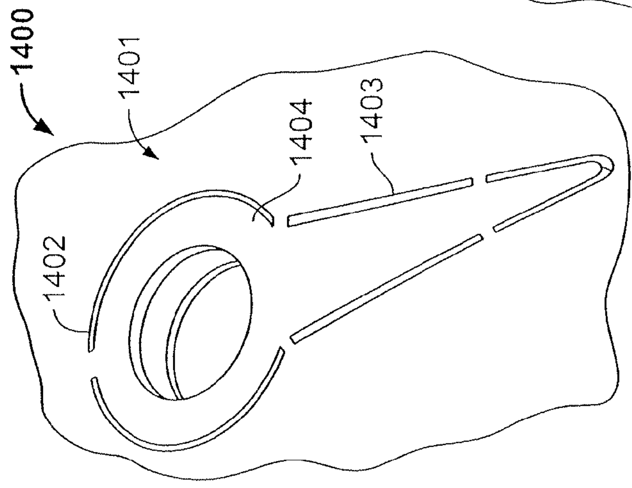

With reference now to FIG. 26A, the seal 1404 is shown in greater detail. In particular, the seal 1404 can be manufactured from, e.g., paper, cardboard, plastic, metal, or the like, being configured and dimensioned to be sufficiently strong to provide protection for the patch cords located inside the housing 1401 while sufficiently flexible and/or thin to permit the seal 1404 to be removed, e.g., along the perforated edges. While FIG. 26A shows the seal 1404 connected to the housing 1401, FIG. 26B shows the seal 1404 being removed, e.g., torn out, from the housing 1401, thereby opening and/or exposing the first opening 1402 and the slot 1403. The seal 1404 can optionally be tethered and/or connected to the first patch cord 1405 to be removed from the housing 1401. Therefore, as the seal 1404 is removed from the housing 1401, the first patch cord 1405 can automatically be fed through the first opening 1402 and be ready for removal. FIG. 26C depicts the first opening 1402 and the slot 1403 after the seal 1404 has been removed and the first patch cord 1405 has been partially removed from the housing 1401. In particular, as can be seen from FIG. 26C, the first opening 1402 can have a substantially round configuration and be dimensioned to permit the patch cords to pass through unimpeded. However, the slot 1403 can have a tapered width configuration and be further configured and dimensioned to permit the elongated cord 1406 of the patch cord 1405 to pass through, while being sufficiently narrow to prevent the plug (not shown) of the patch cord 1405 from passing through, thereby preventing the patch cords from receding back into the housing 1401. The slot 1403 can therefore be implemented as a "stop" for detachably securing and/or storing the next patch cord to be removed prior to its removal from the housing 1401.

Figure 27B:
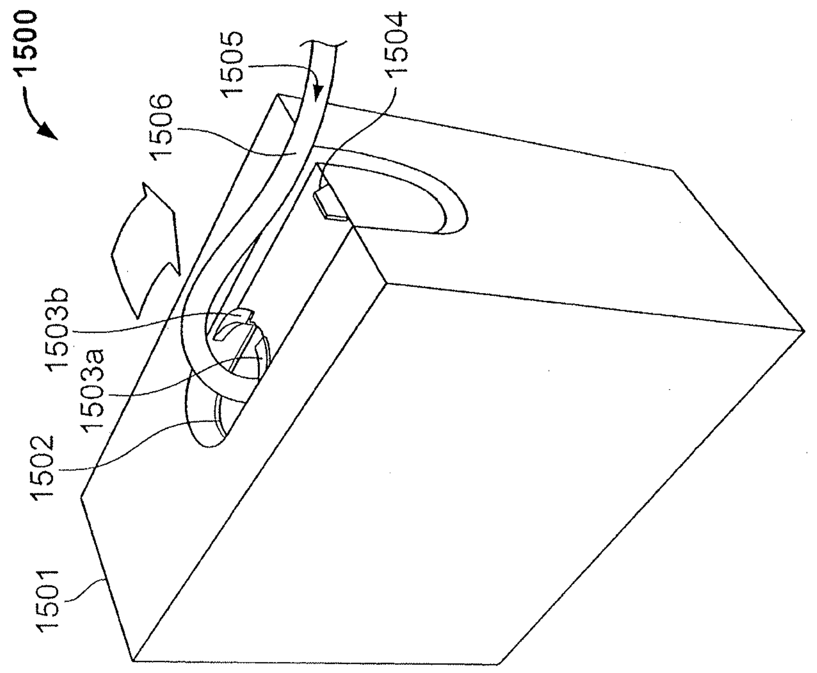
FIGS. 27A-B are views of an alternative exemplary embodiment of a system of patch cord assembly packaging and payout, including a lip.
Figure 27A:
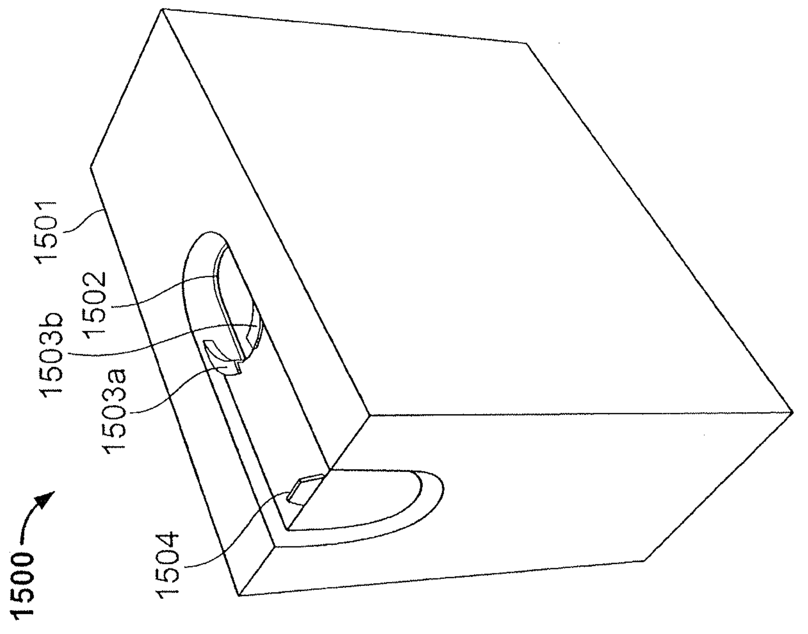

Turning now to FIGS. 27A-B, an alternative exemplary embodiment of the system 1500 of patch cord assembly packaging and payout is illustrated. In particular, exemplary system 1500 generally includes a housing 1501 and a first opening 1502. The housing 1501 can optionally generally further include first and second guiding brackets 1503*a* and 1503*b*, respectively, for guiding patch cords out of the first opening 1502 in a uniform and/or controller manner. In addition, the housing 1501 can include a lip 1504, e.g., a serrated edge, a protrusion, or the like, at one end of the top surface of the housing 1501 for separating the first patch cord from the second patch cord (not shown). Specifically, the lip 1504, e.g., a first coupler element remover, can be implemented to separate the first patch cord from the second patch cord detachably coupled in a juxtaposed relation by, e.g., the first coupler element 601, i.e., first and second covers 602*a* and 602*b*, respectively, and center score lines 603, as illustrated in and discussed with respect to FIGS. 10A-C. It should be understood that the lip 1504 is sufficiently serrated and/or sharp to separate the first patch cord from the second patch cord without causing damage to the patch cords or any associated elements, e.g., elongated cords, plugs, or the like. The housing 1501 can further include a seal (not shown) for covering the first opening 1502 to prevent damage to patch cords stored inside the housing 1501. FIG. 27B illustrates the exemplary system 1500 in an "open" and/or "in use" configuration, with a first patch cord 1505 protruding out of the first opening 1502.

Figure 28B:
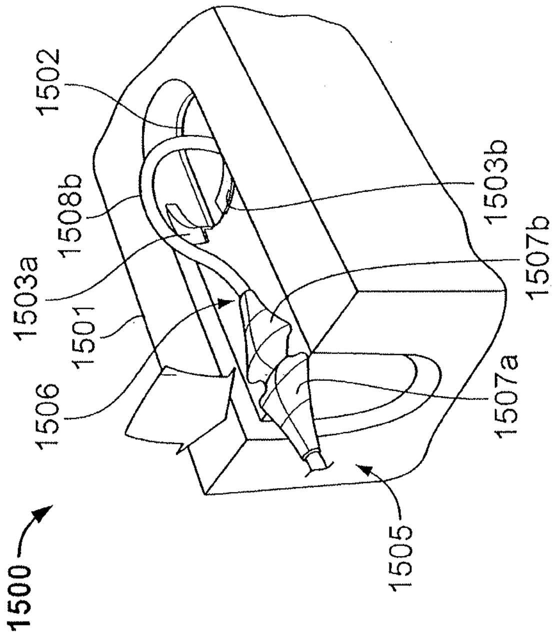
FIGS. 28A-C are views of steps implemented for utilizing a lip of an exemplary embodiment of a system of patch cord assembly packaging and payout.
Figure 28C:
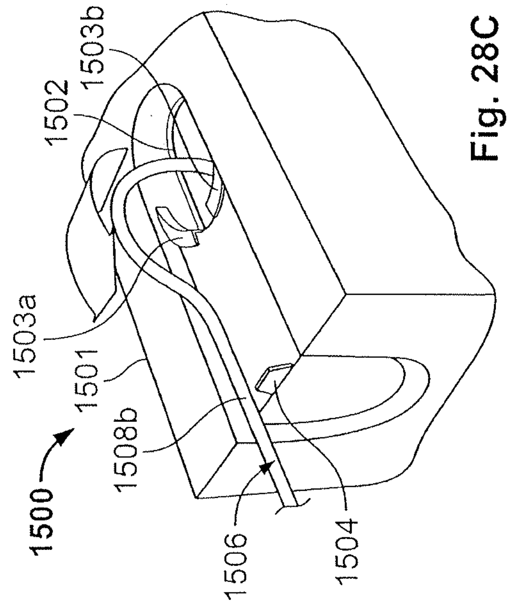
Figure 28A:
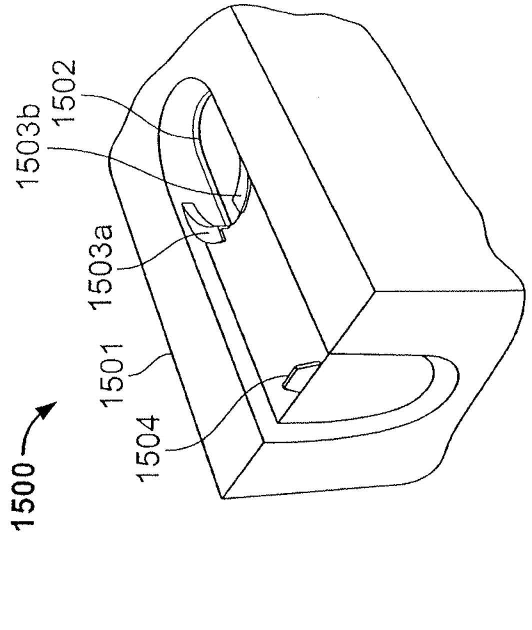

With reference now to FIG. 28A, the exemplary system 1500 is illustrated in a configuration ready for use. As shown in FIG. 28B, by removing the first patch cord 1505 from the housing 1501, the detachably coupled second patch cord 1506 of the patch cord assembly is also at least partially removed. In particular, FIG. 28B depicts the patch cord assembly 600 of FIGS. 10A-C, including the first coupler element 601, the first and second covers 602*a* and 602*b*, and the center score lines 603. Thus, to detach and/or separate the first patch cord 1505 from the second patch cord 1506, the user and/or installer can push the first and second covers 602*a* and 602*b* down and, more particularly, push the center score lines 603 down onto the lip 1504 and tear the first coupler element 601 along the center score lines 603, i.e., depicted as center score lines 1509 in FIG. 28B. Once the first and second patch cords 1505 and 1506 have been separated, the first patch cord 1505 can be utilized as needed by the user and/or installer and the second patch cord 1506 can be further withdrawn from the housing 1501 through the first opening 1502 as illustrated in FIG. 28C.

Figure 29:
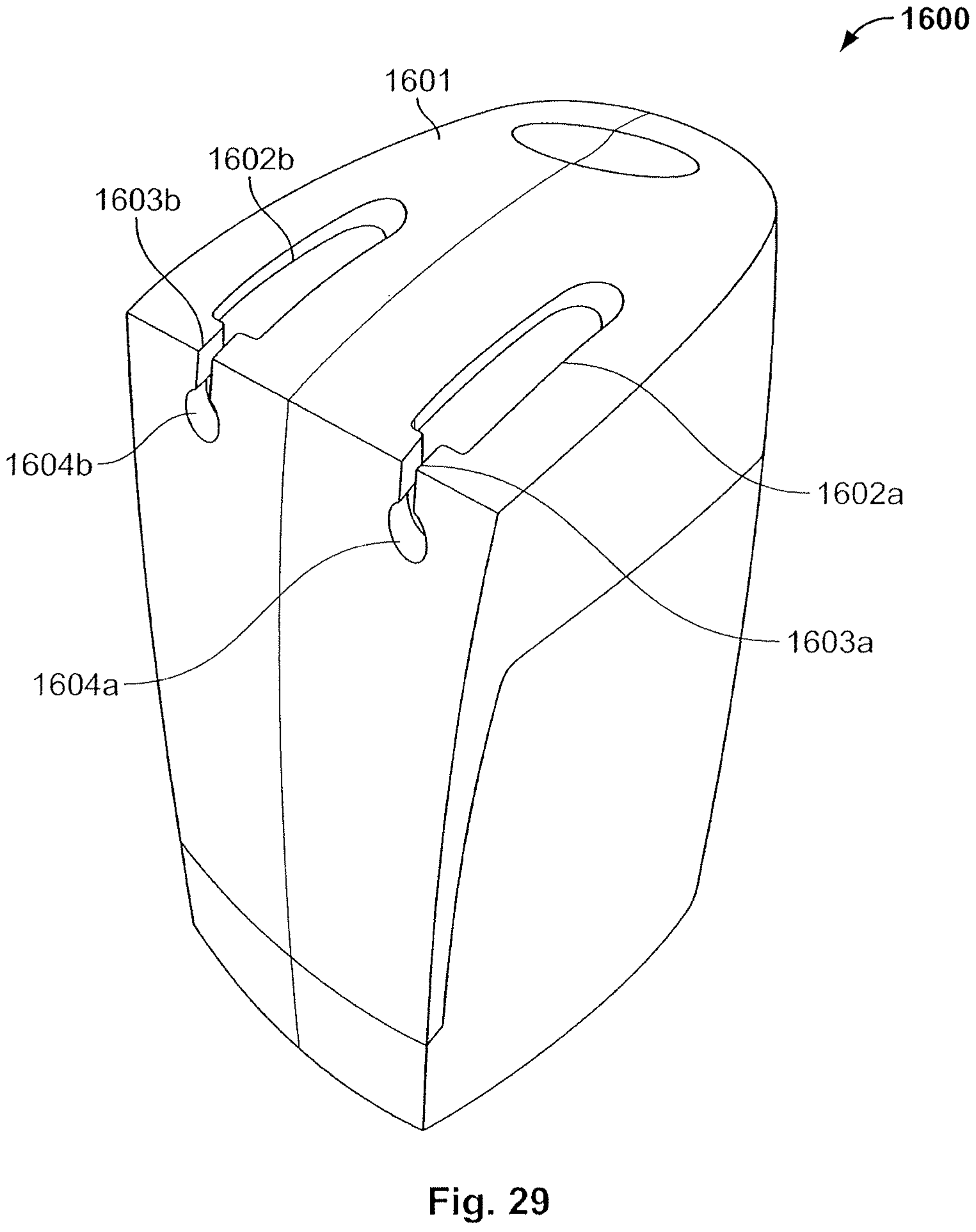
FIG. 29 is a view of an alternative exemplary embodiment of a system of patch cord assembly packaging and payout, including first and second paper slots.

Turning now to FIG. 29, an alternative exemplary embodiment of the system 1600 of patch cord assembly packaging and payout is illustrated. In particular, exemplary system 1600 generally includes a housing 1601, a first opening 1602*a* and optionally a second opening 1602*b*. A further discussion will be made with respect to the first opening 1602*a*, since the second opening 1602*b* is substantially similar to the first opening 1602*a*. The first opening 1602*a* generally further includes a first narrow path 1603*a* connecting the first opening 1602*a* to the first slot 1604*a*, there first slot 1604*a* being configured and dimensioned to prevent the patch cords from receding back into the housing 1601. Specifically, the first opening 1602*a* is configured and dimensioned to permit the patch cords, including the elongated cords, plugs, coupler elements, and the like, to pass unimpeded. The elongated cord of the patch cord can then be passed through the first narrow path 1603*a* into the first slot 1604*a*, which is configured and dimensioned to permit the elongated cords of the patch cords to pass unimpeded, while preventing the plugs of the patch cords from passing through, thus preventing the patch cords from receding back into the housing 1601.

Figures 30A, 30B, 30C:
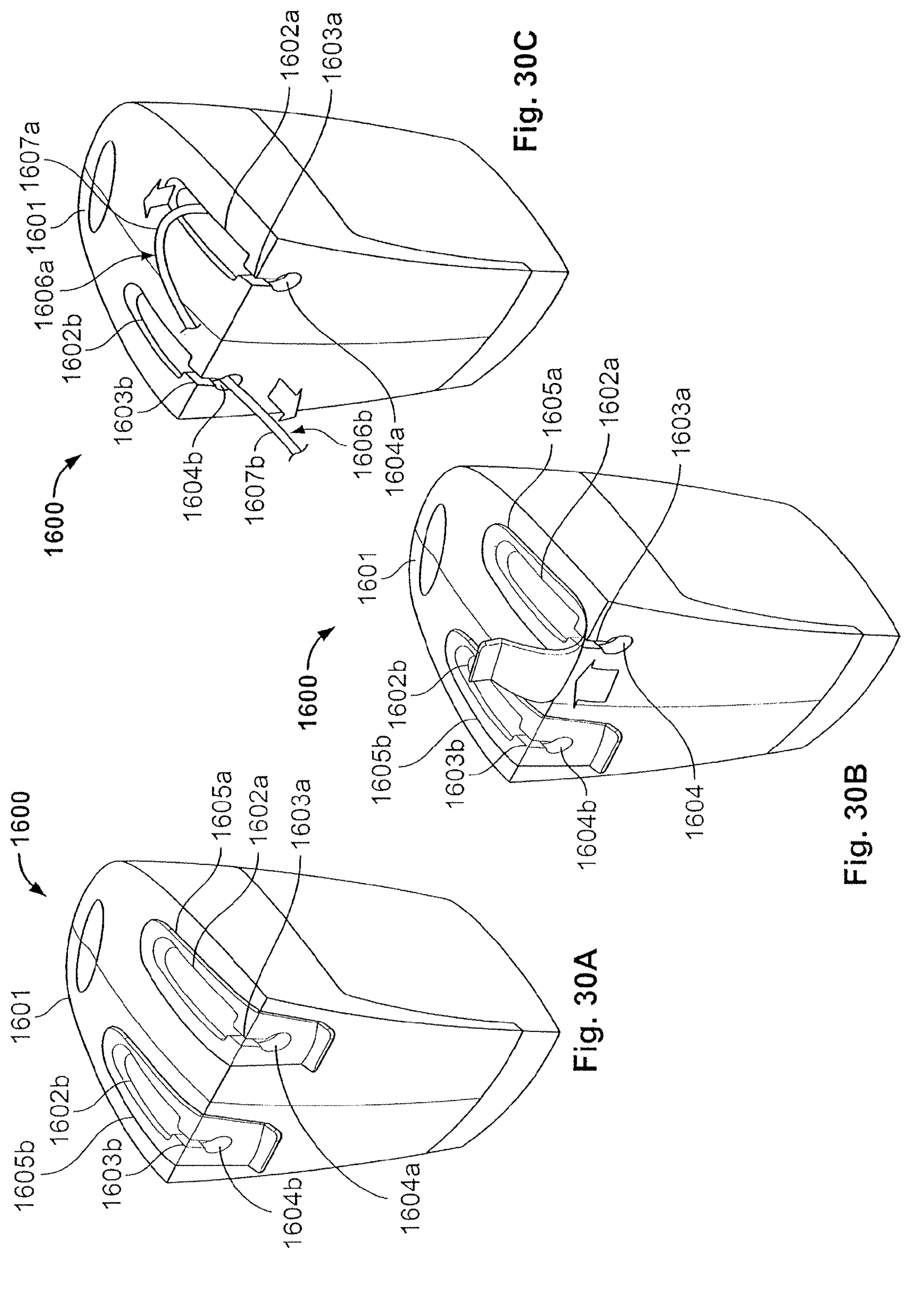
FIGS. 30A-C are views of steps implemented for utilizing a first and second paper slots of an exemplary embodiment of a system of patch cord assembly packaging and payout.

With reference to FIG. 30A, the exemplary system 1600 is depicted in a packaged and/or closed state. Specifically, the housing 1601 can further include a first and second cover 1605*a* and 1605*b*, respectively, for sealing and/or covering the first and second openings 1602*a* and 1602*b*, the first and second narrow paths 1603*a* and 1603*b*, and the first and second slots 1604*a* and 1604*b*, thereby preventing damage and/or removal of patch cords inside the housing 1601. The first and second covers 1605*a* and 1605*b* can be fabricated from, e.g, plastic, paper, or the like, and can be attached to the housing 1601 by, e.g., adhesive. The first and second covers 1605*a* and 1605*b* can be removed for implementation of exemplary system 1600 by the user and/or installer by lifting the first and second covers 1605*a* and 1605*b* in the direction shown by the arrow in FIG. 30B. Although not illustrated, it should be understood that the first and second covers 1605*a* and 1605*b* can also be configured to be removed by, e.g., tearing out, punching out, or the like, similarly to the seal 1404 of FIG. 26A. Subsequently, as depicted in FIG. 30C, the first and second patch cords 1606*a* and 1606*b*, respectively, can be removed, e.g., funneled, fed, or the like, through the first and second openings 1602*a* and 1602*b* and/or the first and second slots 1604*a* and 1604*b*. The first and second slots 1604*a* and 1604*b* can then be utilized for securely storing and/or maintaining the patch cords to be removed next in a convenient location for the user and/or installer, specifically permitting the patch cords to be passed through and out of the housing 1601, but not permitting the patch cords to recede back into the housing 1601. As would be understood by those of ordinary skill in the art, once the user and/or installer has completed the installation of patch cords, the remaining patch cords of exemplary system 1600 can be removed from the first and second slots 1604*a* and 1604*b* through the first and second narrow paths 1603*a* and 1603*b* and further stored in the housing 1601 for future use.

Figure 31:
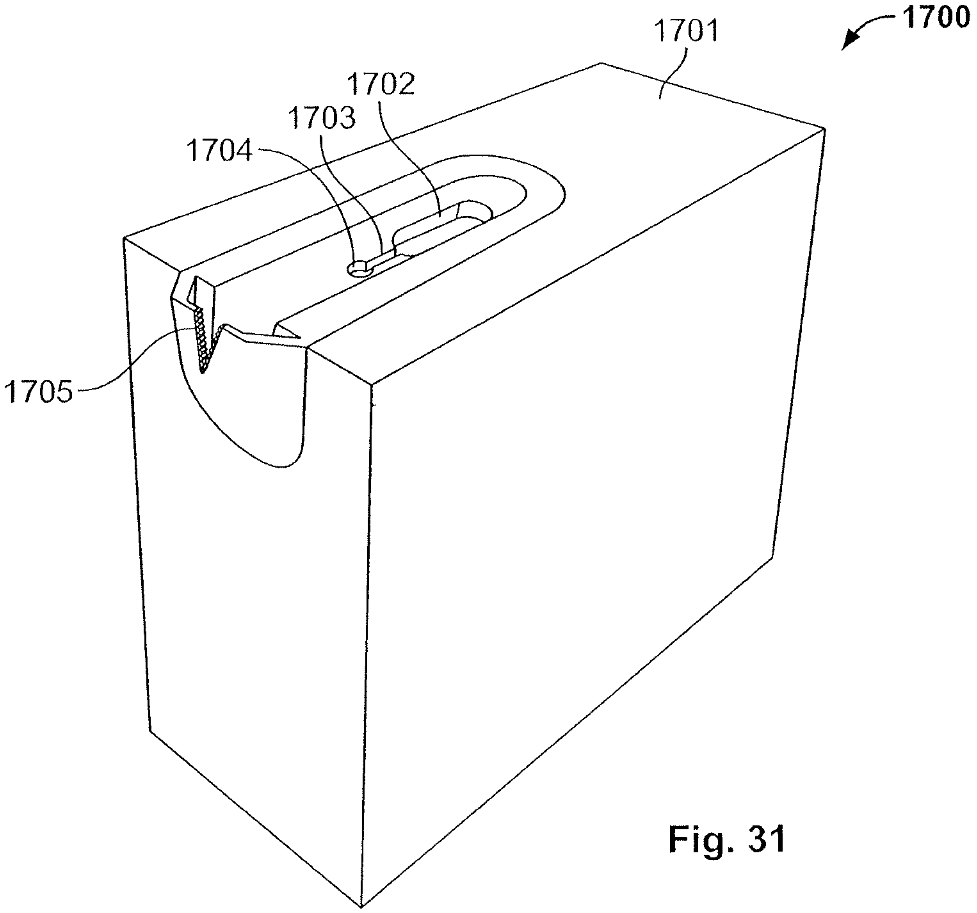
FIG. 31 is a view of an alternative exemplary embodiment of a system of patch cord assembly packaging and payout, including a mouth with a serrated end.

Turning now to FIG. 31, an alternative exemplary embodiment of the system 1700 of patch cord assembly packaging and payout is illustrated. In particular, exemplary system 1700 generally includes a housing 1701 and a first opening 1702. The first opening 1702 can be located in a receded portion of the top surface of the housing 1701 and can be fabricated from, e.g., plastic, metal, or the like. The first opening 1702 can further include a narrow path 1703 and a slot 1704. Specifically, the narrow path 1703 can be configured and dimensioned to permit the user and/or installer to feed the elongated cable of a patch cord through from the first opening 1702 into the slot 1704. The slot 1704 is also configured and dimensioned to permit patch cords to be removed from the housing 1701 through the slot 1704, thus permitting, e.g., the elongated cords, plugs, coupler elements, or the like, to pass out of the housing 1701 through the slot 1704. However, slot 1704 is further configured and dimensioned to prevent the plugs of the patch cords from receding back into the housing 1701, thereby preventing the patch cords from receding back into the housing 1701. Thus, the slot 1704 can be implemented as a storage and/or holding portion of the housing 1701 for storing the next patch cord to be removed from the housing 1701 until future use. The housing 1701 can further include a serrated end 1705 configured as, e.g., a V-shaped portion, a rectangular portion, or the like, for separating and/or cutting a coupler element of a patch cord assembly to in turn separate the first patch cord from the second patch cord.

Figure 32A:
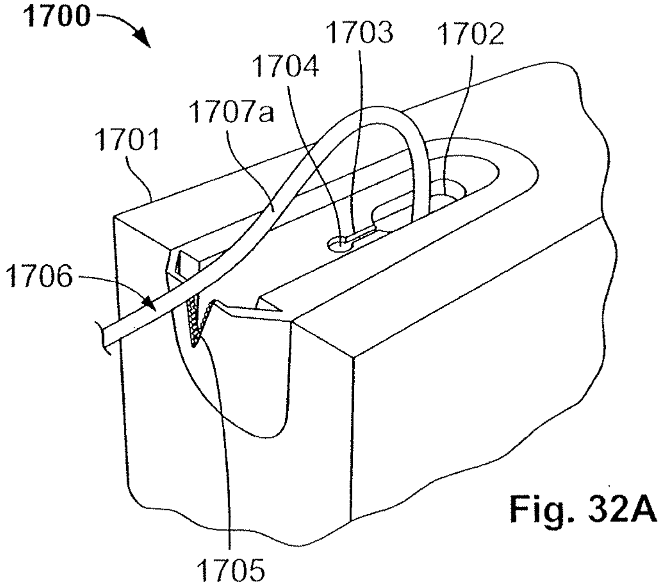
FIGS. 32A-C are views of steps implemented for utilizing a mouth with a serrated end of an exemplary embodiment of a system of patch cord assembly packaging and payout.

With reference to FIG. 32A, the exemplary system 1700 is illustrated in use, i.e., with a second patch cord 1706 protruding out, i.e., pulled out, of the first opening 1702. As noted above, the second elongated cord 1707*a* of the second patch cord 1706 can further be passed through the narrow path 1703 and into the slot 1704 for storage and/or a more controlled removal of patch cords. It should further be noted that the serrated end 1705 has serrated components which are sharp enough to separate a couple element, but not sharp enough to damage the components of the second patch cord 1706, e.g., the second elongated cord 1707*a*, the plug (not shown), or the like.

Figure 32B:
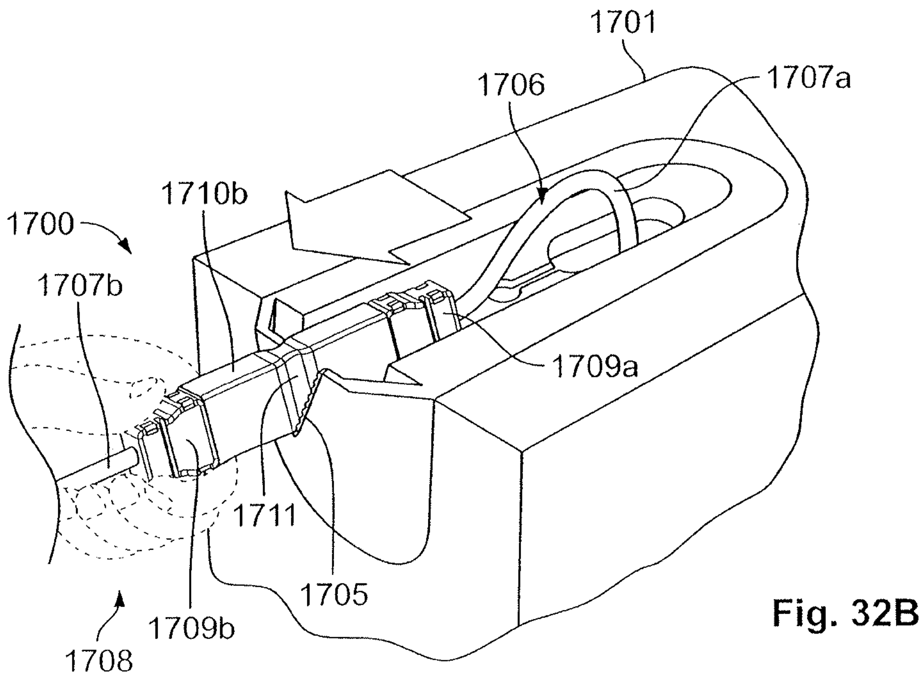
Figure 32C:
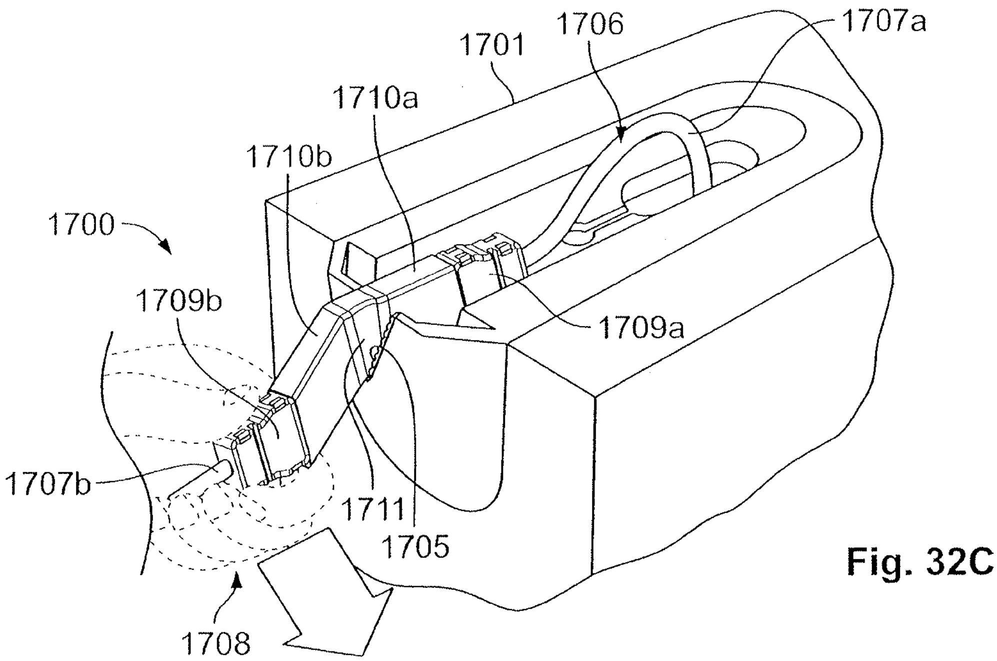

FIGS. 32B and C illustrate the exemplary system 1700 as utilized to separate a coupler element. In particular, the coupler element shown is similar to the first coupler element 601, including a first cover 602*a* (1710*a*), a second cover 602*b* (1710*b*), and center score lines 603 (1711). Once the user and/or installer has pulled out the first patch cord 1708 from the first opening 1702, the detachably coupled second patch cord 1706 is also automatically pulled out of the first opening 1702. Thus, by placing the first coupler element 601, i.e., placing the center score lines 1711, along the serrated end 1705 and pulling down as shown in FIG. 32C, the first and second patch cords 1706 and 1708 can be detached. Specifically, as would be understood by those of ordinary skill in the art, the serrated end 1705 can be used to separate, e.g., tear apart, the first cover 1710*a* from the second cover 1710*b* along the center score lines 1711. Although illustrated with a coupler element similar to that of the first coupler element 601, it should be noted that the exemplary system 1700 can be further implemented with alternative coupler elements.

Figure 33:
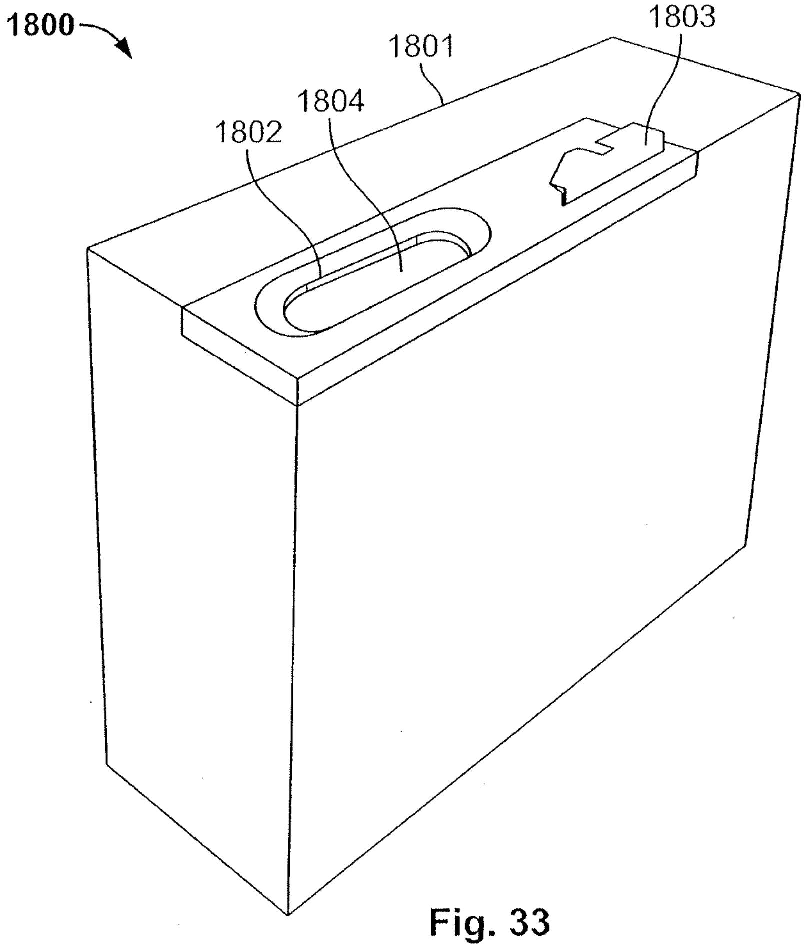
FIG. 33 is a view of an alternative exemplary embodiment of a system of patch cord assembly packaging and payout, including an edge to pull cables apart.

Turning now to FIG. 33, an alternative exemplary embodiment of the system 1800 of patch cord assembly packaging and payout is illustrated, specifically for use with, e.g., patch cord assemblies 1000, 1000' and/or 1000" depicted in FIGS. 18, 19 and 20, respectively. In particular, exemplary system 1800 generally includes a housing 1801 and a first opening 1802. The first opening 1802 can optionally include a seal 1804 which can be removed, e.g., torn out, punched out, or the like, prior to use of exemplary system 1800. The housing 1801 can further include an edge 1803 configured and dimensioned to separate patch cord assemblies, e.g., patch cord assemblies 1000 and 1000'.

Figure 34A:
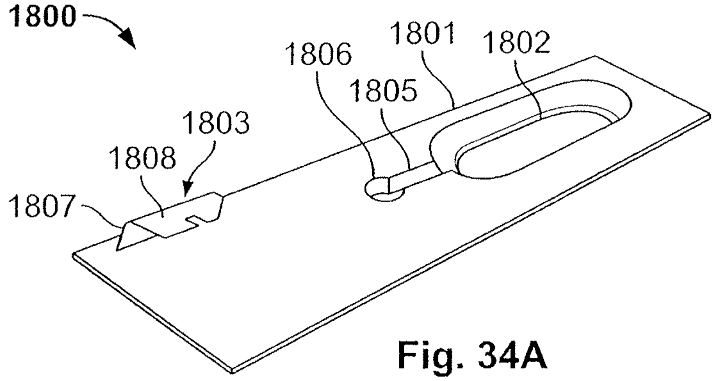
FIGS. 34A-C are views of steps implemented for utilizing an edge to pull cables apart of an exemplary embodiment of a system of patch cord assembly packaging and payout.

With reference to FIG. 34A, the housing 1801 and the first opening 1802 can be seen in greater detail. Similarly to exemplary system 1700 of FIG. 32B, the housing 1801 can further include a narrow path 1805 and a slot 1806 configured and dimensioned to permit a user and/or installer to pass an elongated cord of a patch cord through the narrow path 1805 and into the slot 1806 for a more convenient feeding and/or storing of the next patch cord to be removed from the housing 1801. In addition, the edge 1803 can include a substantially vertical component, i.e., side surface 1807, and a substantially horizontal component, i.e., top surface 1808, thus creating a substantially L-shaped bracket. The edge 1803 can be fabricated from, e.g., plastic, metal, or the like, to provide sufficient support and/or resistance for separating patch cords. A greater discussion of the implementation of the edge 1803 for separating patch cord assemblies is provided below.

Figure 34B:
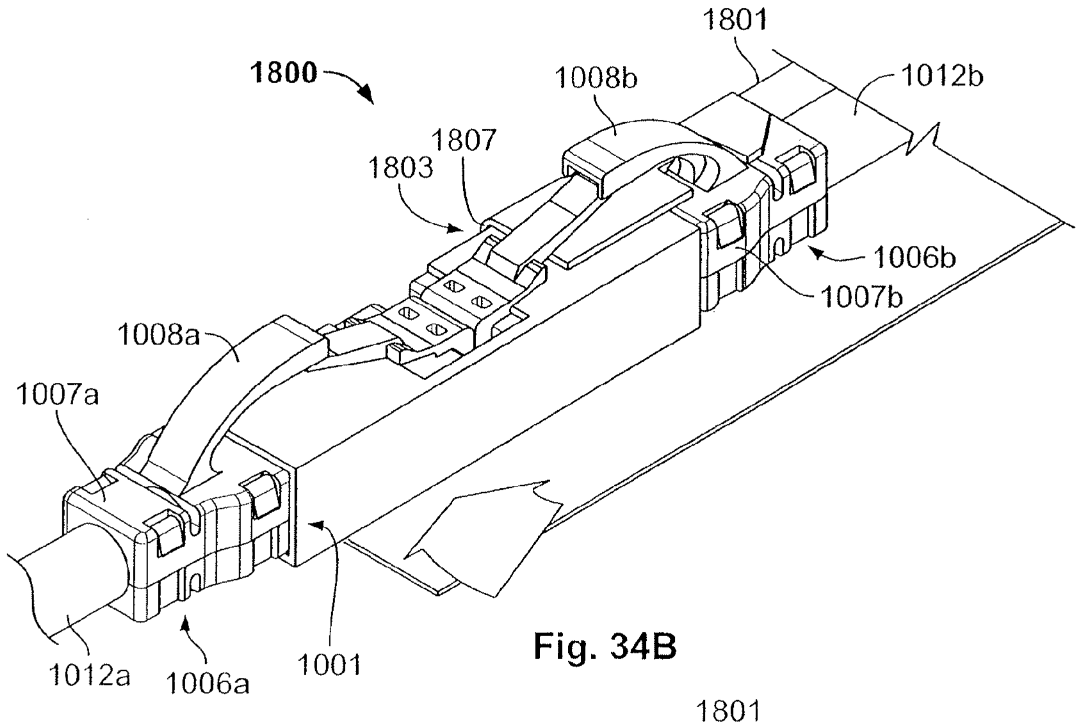
Figure 34C:
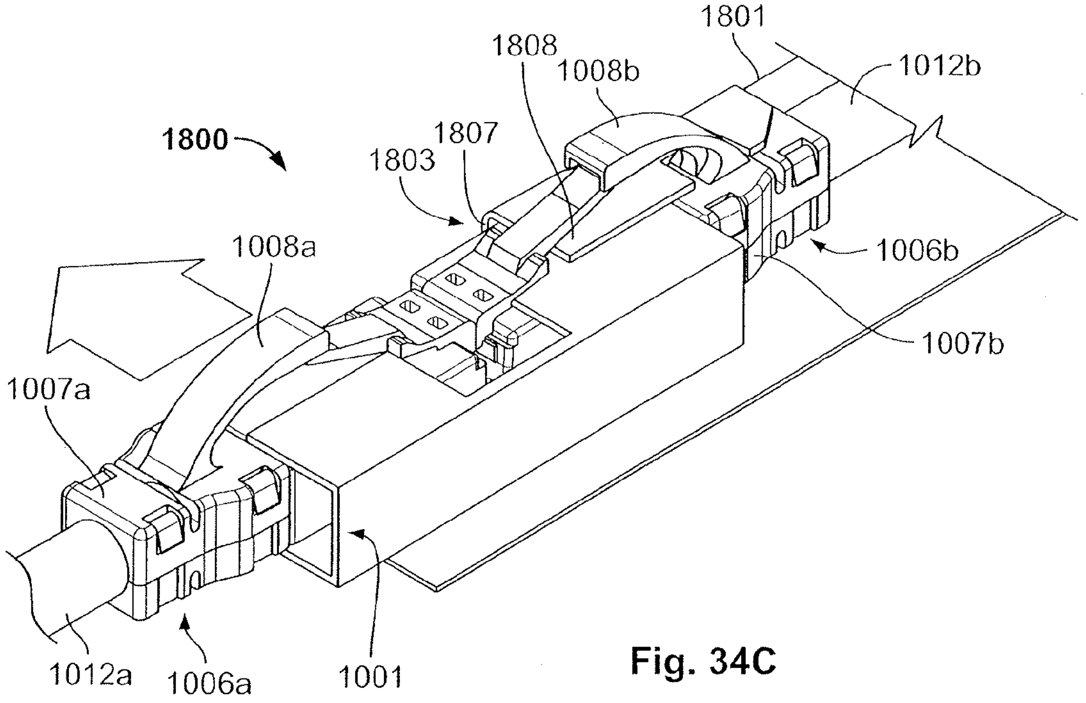

Once a first patch cord 1006*a* has been removed from the housing 1801, the detachably coupled second patch cord 1006*b* is also removed from the housing 1801, as would be understood by those of ordinary skill in the art. Although a user and/or installer can separate the first and second patch cords 1006*a* and 1006*b* by hand, the edge 1803 can also be utilized. In particular, as shown in FIGS. 34B and C, the first coupler element 1001 can be positioned substantially flat against the top surface of the housing 1801 and moved into the edge 1803. As can be seen in FIG. 34B, as the first coupler element 1001 is placed into the edge 1803, the first coupler element 1001 abuts the side surface 1807 and is below the top surface 1808. Further, the top surface 1808 engages the first coupler element 1001 and the second bridge 1008*b* of the second plug 1007*b* of the second patch cord 1006*b* by being placed between the top surface of the first coupler element 1001 and the bottom surface of the second bridge 1008*b*. Thus, a secure engagement is created to prevent the first coupler element 1001 and the second patch cord 1006*b* from substantial movement. The user and/or installer can then pull the first plug 1007*a* of the first patch cord 1006*a* sideways in the direction indicated by the arrow in FIG. 34C to release the first patch cord 1006*a* from the first coupler element 1001, leaving the second patch cord 1006*a* connected to and secured within the first coupler element 1001. In particular, the side surface 1807 of the edge 1803 provides sufficient support to embrace the first coupler element 1001 and the second patch cord 1006*b* as the first patch cord 1006*a* is detached.

Figure 35:
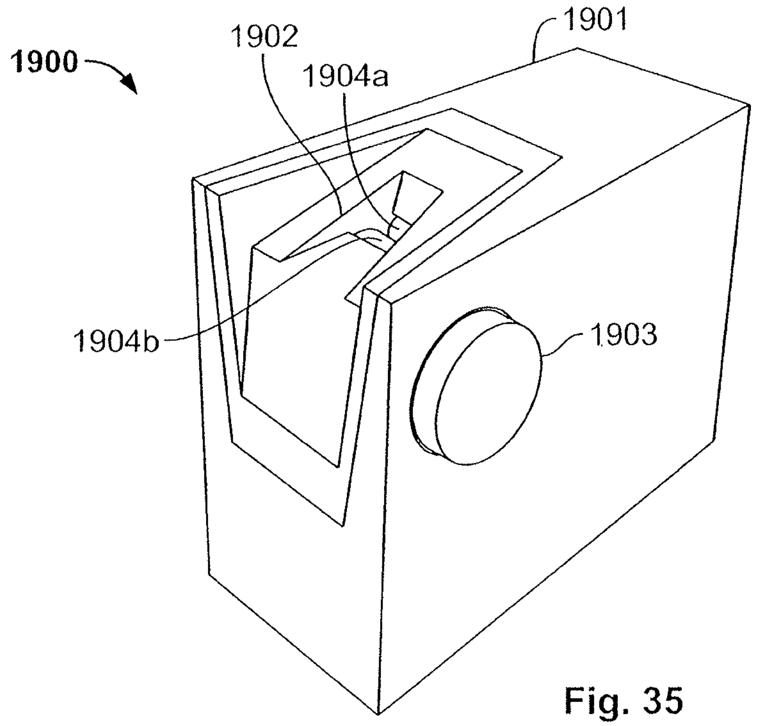
FIG. 35 is a view of an alternative exemplary embodiment of a system of patch cord assembly packaging and payout, including a crank.
Figure 36A:
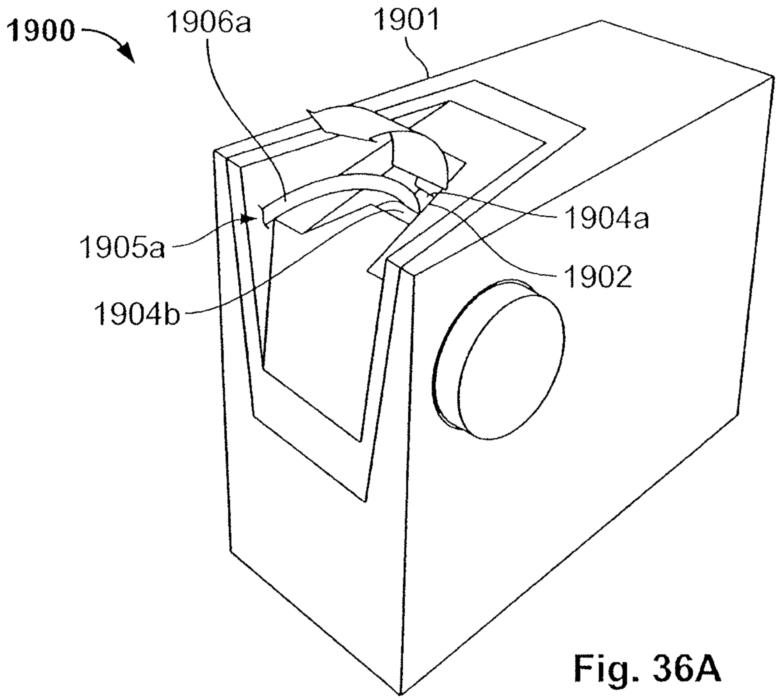
FIGS. 36A-D are views of steps implemented for utilizing a crank of an exemplary embodiment of a system of patch cord assembly packaging and payout.

Turning now to FIG. 35, an alternative exemplary embodiment of the system 1900 of patch cord assembly packaging and payout is illustrated. In particular, exemplary system 1900 generally includes a housing 1901, a first opening 1902, and a crank 1903 for turning the first inner wheel 1904*a* and the second inner wheel 1904*b* for dispensing patch cords. The first opening 1902, the crank 1903 and the first and second inner wheels 1904*a* and 1904*b* can be fabricated from, e.g., plastic, metal, cardboard, or the like. FIG. 36A illustrates the exemplary system 1900 with a first patch cord 1905*a* protruding out of the first opening 1902. As can be seen, the first patch cord 1905*a* is removed from the first opening 1902 and is generally dispensed from the first opening 1902 between the first and second inner wheels 1904*a* and 1904*b*. Specifically, the friction from the first and second inner wheels 1904*a* and 1904*b* can assist in moving the patch cords out of the housing 1901.

Figure 36D:
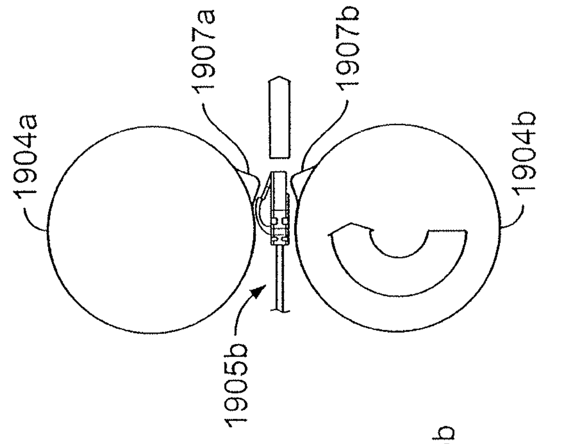
Figure 36C:
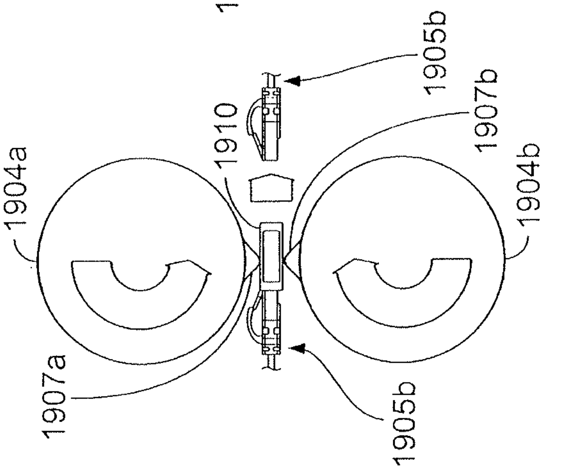
Figure 36B:
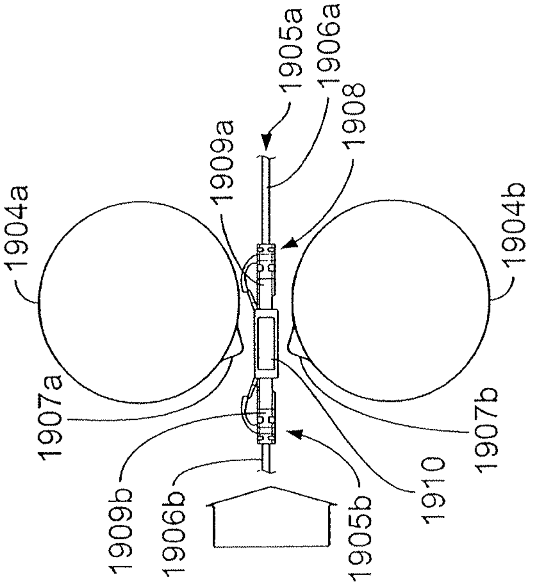

With reference now to FIGS. 36B-D, the detailed function of the first and second inner wheels 1904*a* and 1904*b* is depicted. In particular, the first and second inner wheels 1904*a* and 1904*b* are located inside the housing 1901 and are configured and dimensioned to rotate to catch and/or capture the first and second patch cords 1905*a* and 1905*b* with the first and second protrusions 1907*a* and 1907*b* as a user and/or installer pulls on the first patch cord 1905*a* protruding out of the first opening 1902. As can be seen in FIG. 36C, as the first and second inner wheels 1904*a* and 1904*b* rotate, the first and second protrusions 1907*a* and 1907*b* pinch and/or capture the first coupler element 1910 and/or the patch cords of the patch cord assembly 1908. Thus, as the user and/or installer continues to pull on the first patch cord 1905*a*, the first patch cord 1905*a* is released/detached from the first coupler element 1910 and is extracted from the first opening 1902. The second patch cord 1905*b* remains detachably secured to the first coupler element 1910, which in turn remains detachably secured by the first and second inner wheels 1904*a* and 1904*b*. If the user desires to remove the second patch cord 1905*b* from the housing 1902, the user can rotate, i.e., crank, the crank 1903 located on an outer surface of the housing 1902, which causes at least one of the first and second inner wheels 1904*a* and 1904*b* to rotate and push/feed the second patch cord 1905*b* out of the first opening 1902. The second plug 1909*b* of the second patch cord 1905*b* thus protrudes out of the first opening 1902 and can be removed, i.e., pulled on, by the user and/or installer to repeat the steps described above.

Figure 37:
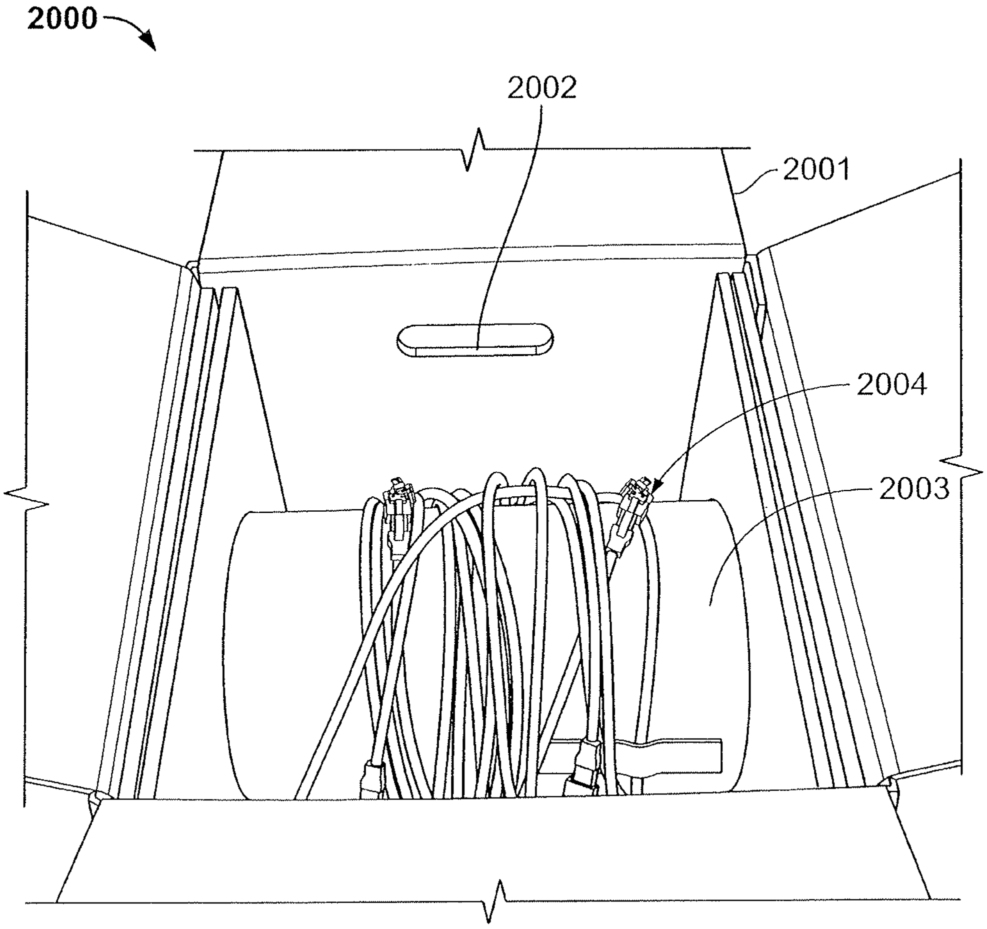
FIG. 37 is a view of an exemplary embodiment of a spool implemented in exemplary embodiments of systems of patch cord assembly packaging and payout disclosed herein.

Turning now to FIG. 37, the inner mechanism 2000 of the exemplary systems of patch cord assembly packaging and payout is illustrated. In particular, the inner mechanism 2000 can be located within a housing 2001, i.e., an exemplary housing described above, such as housing 1401 depicted in FIG. 25C, and the housing 2001 can optionally include handles 2002 of various configurations for transporting the exemplary systems. The inner mechanism 2000 also includes a rotating core 2003, e.g., a spool, which can be fabricated from, e.g., metal, plastic, cardboard, or the like, and can be configured and dimensioned for holding a plurality of patch cord assemblies 2004. Thus, the diameter of the rotating core 2003 can vary according to the housing 2001 utilized and the number of patch cord assemblies 2004 to be packaged. In addition, the plurality of patch cord assemblies 2004 can be continuously reeled and/or wound around the rotating core 2003 as illustrated in FIG. 37, so that a continuous and/or smooth removal of the patch cords can be made through the openings in the housing as discussed above. As would be understood by those of ordinary skill in the art, as the user and/or installer removes, i.e., pulls, the patch cord of interest out of an opening in the housing, the rotating core 2003 can rotate accordingly to release the patch cord of interest and align the subsequently coupled patch cord to be removed in a position suitable for extraction.

Figure 38:
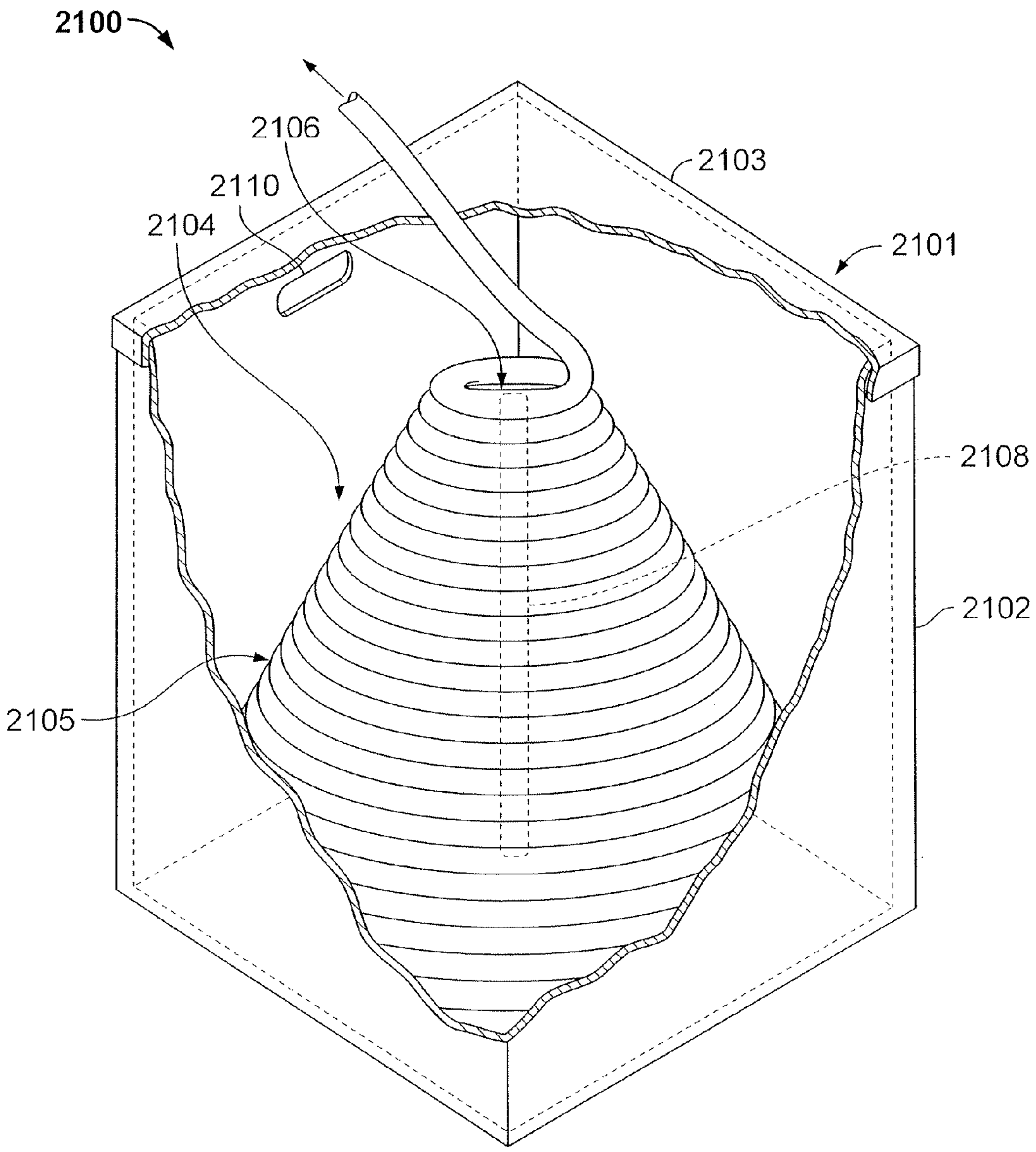
FIG. 38 is a view of an alternative exemplary embodiment of a system of patch cord assembly packaging and payout, including a coiled patch cord assembly.

With reference to FIG. 38, a cutaway view of an alternative exemplary embodiment of a system 2100 of patch cord assembly packaging and payout is illustrated. It should be understood that the system 2100 can be used with any of the patch cord assemblies (or combinations of the patch cord assemblies) discussed herein. In particular, exemplary system 2100 generally includes a housing 2101 and an opening (not shown) for dispensing patch cords. For example, the opening can be located on one of the housing 2101 walls and allows a user to pull patch cords out for use. The housing 2101 can be fabricated from, e.g., plastic, metal, cardboard, or the like, and can include a base 2102 and a cover 2103, e.g., a lid. In some exemplary embodiments, the housing 2101 can be any of the exemplary housings described herein. In some embodiments, the housing 2101 can be collapsible. The base 2102 can be configured and dimensioned to provide a bottom surface and side walls for surrounding the patch cord assemblies 2104 disposed within the housing 2101, while leaving a top surface open for replacement of patch cord assemblies 2104. Rather than including a rotating core for holding a plurality of patch cord assemblies 2104, the plurality of patch cord assemblies 2104 can be continuously coiled within the housing 2101. The plurality of patch cord assemblies 2104 can include patch cords detachably secured relative to each other by any of the exemplary means discussed herein.

As illustrated in FIG. 38, continuous coiling of the plurality of patch cord assemblies 2104 generally allows for dispensing of patch cords through an opening in the housing 2101 from an outer coil diameter 2105. For example, the patch cord assemblies 2104 can be coiled to define inner coils of the patch cord assemblies 2104 which define an inner coil diameter 2106 and further patch cord assemblies 2104 coiled around the inner coil diameter 2106 to define outer coils of the patch cord assemblies 2104 which define an outer coil diameter 2105. Thus, the plurality of patch cord assemblies 2104 can be coiled such that pulling on a patch cord protruding from the housing 2101 directs the uncoiling direction of the plurality of patch cords from an outer coil diameter 2105 to an inner coil diameter 2106. For example, by pulling on a patch cord protruding from the housing 2101, the plurality of patch cords can initially unwind from an outer coil layer before unwinding from the subsequent inner coil layer.

In some exemplary embodiments, the housing 2101 can include a vertical rotating core 2108 around which the plurality of patch cord assemblies 2104 can be coiled. The vertical rotating core 2108 can rotate as a patch cord is pulled from the housing 2101, thereby providing a smoother extraction of patch cords from the housing 2101. In some embodiments, the vertical rotating core 2108 can be detachable from the base 2102 to permit replacement of the coil of patch cord assemblies 2104 after all cables have been used. In some embodiments, the housing 2101 can include a coupler element remover which assists a user in removing the coupler element from the patch cords and/or removing the patch cords from the coupler element. In some embodiments, the housing 2101 can include a handle 2110, e.g., a strap, one or more side openings configured to receive a user's fingers, and the like, for lifting and transporting the system 2100.

Figure 39:
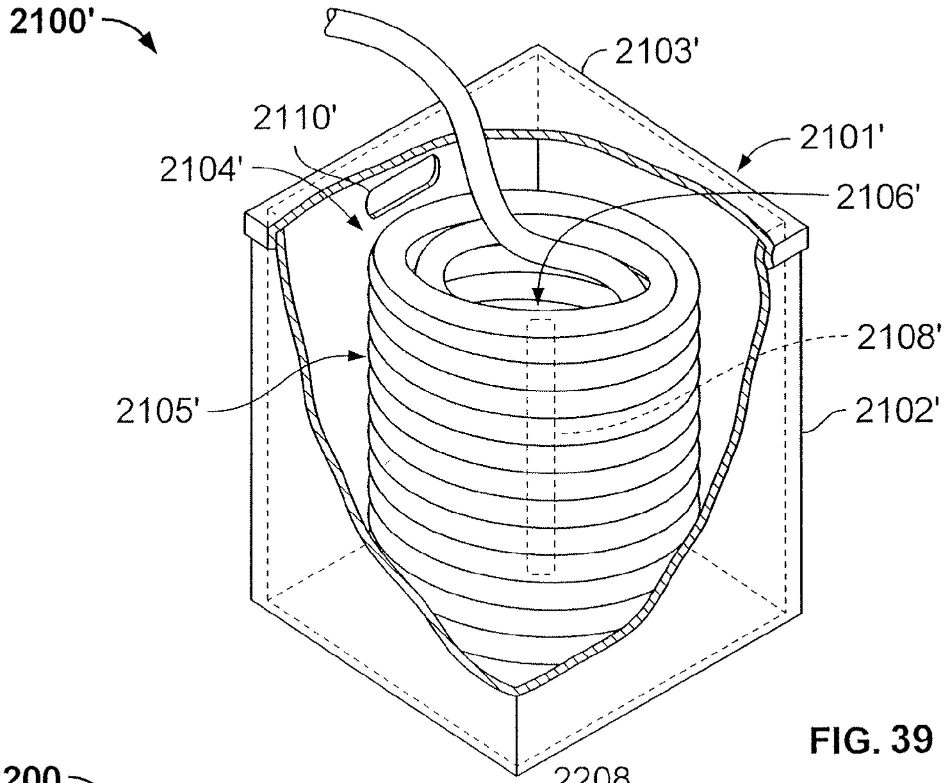
FIG. 39 is a view of an alternative exemplary embodiment of a system of patch cord assembly packaging and payout, including a coiled patch cord assembly for dispensing from an inner diameter.

FIG. 39 shows a cutaway view of an alternative exemplary embodiment of a system 2100' of patch cord assembly packaging and payout. It should be understood that the system 2100' can be used with any of the patch cord assemblies (or combinations of the patch cord assemblies) discussed herein. The exemplary system 2100' can be substantially similar to system 2100 described above, including a housing 2101' defined by a base 2102' and a cover 2103'. In some exemplary embodiments, the system 2100' can include a plurality of patch cord assemblies 2104' continuously coiled within the housing 2101' such that dispensing of patch cords occurs from an inner coil diameter 2106'. For example, the patch cord assemblies 2104' can be coiled to define outer coils of the patch cord assemblies 2104' which define the outer coil diameter 2105' and further patch cord assemblies 2104' can be coiled within the outer coil diameter 2105' to define inner coils of the patch cord assemblies 2104' which define the inner coil diameter 2106'. Thus, the plurality of patch cord assemblies 2104' can be coiled such that pulling on a patch cord protruding from the housing 2101' directs the uncoiling direction of the plurality of patch cords from an inner coil diameter 2106' to an outer coil diameter 2105'. For example, by pulling on a patch cord protruding from the housing 2101', the plurality of patch cords can initially unwind from an inner coil layer before unwinding from the subsequent surrounding outer coil layer.

In some exemplary embodiments, the housing 2101' can include a vertical rotating core 2108' around which the plurality of patch cord assemblies 2104' can be coiled. The vertical rotating core 2108' can rotate as a patch cord is pulled from the housing 2101', thereby providing a smoother extraction of patch cords from the housing 2101'. In some embodiments, the vertical rotating core 2108' can be detachable from the base 2102' to permit replacement of the coil of patch cord assemblies 2104' after all patch cords have been used. In some embodiments, the housing 2101' can include a coupler element remover which assists a user in removing the coupler element from the patch cords and/or removing the patch cords from the coupler element. In some embodiments, the housing 2101' can include a handle 2110', e.g., a strap, one or more side openings configured to receive a user's fingers, and the like, for lifting and transporting the system 2100'.

Figure 40:
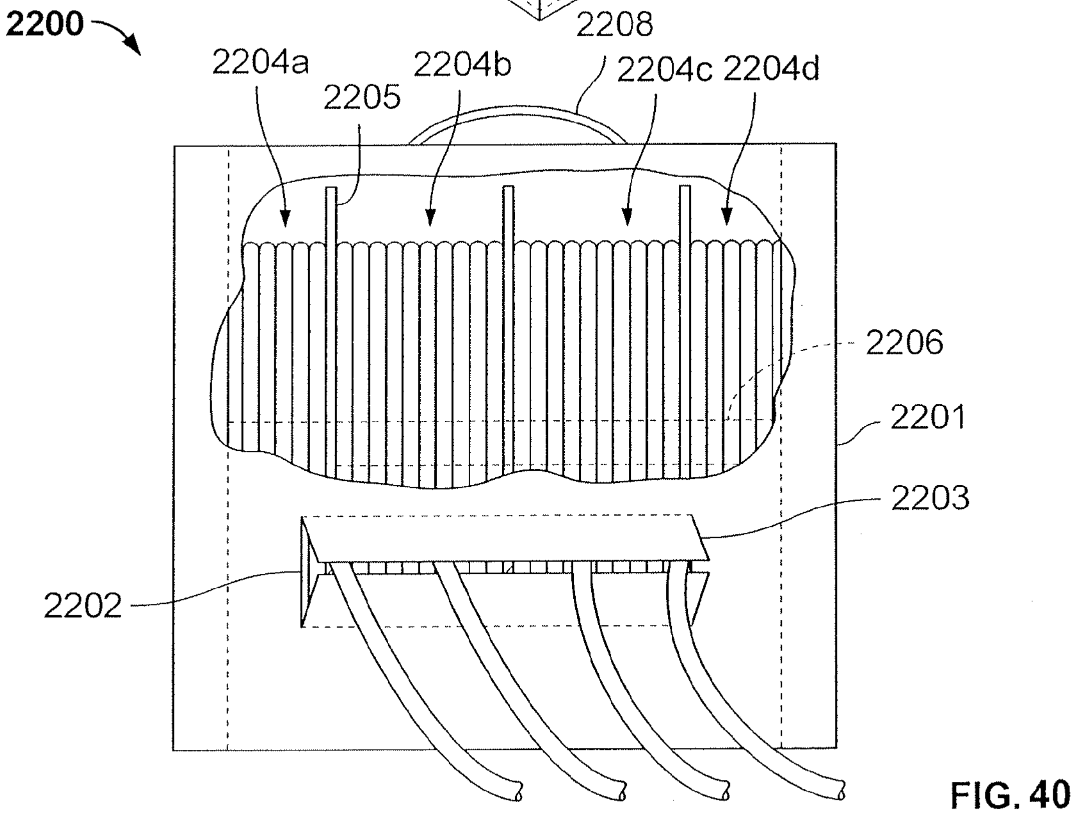
FIG. 40 is a view of an alternative exemplary embodiment of a spool implemented in exemplary embodiments of systems of patch cord assembly packaging and payout disclosed herein, including partitions.

FIG. 40 shows a cutaway view of an alternative exemplary embodiment of a system 2200 of patch cord assembly packaging and payout. The exemplary system 2200 generally includes a housing 2201 and at least one opening 2202. The opening 2202 can include outwardly directed flaps 2203 hingedly joined to at least a portion of the perimeter of the opening 2202. The flaps 2203 can be configured and dimensioned to permit the passage of patch cords therethrough. In addition, if a patch cord begins to slide back into the housing 2201, the flaps 2203 can prevent the patch cord from receding back into the housing 2201 by, e.g., preventing the plugs from passing through the opening 2202, creating friction against the elongated cord, and the like. For example, the flaps 2203 can hingedly swing in an outward direction away from the opening 2202 and away from the housing 2201 to increase the size of the opening 2202 and to allow extraction of a patch cord therefrom. Similarly, if a patch cord begins to slide or recede back into the housing 2201, the flaps 2203 can hingedly swing in the direction of the housing 2201 to reduce the size of the opening 2202, thereby preventing passage of the patch cord back into the housing 2201.

Patch cord assemblies 2204*a-d* can be continuously reeled within the housing 2201 around a rotating core 2206, e.g., a spool. Although illustrated with four patch cord assemblies 2204*a-d*, it should be understood that the exemplary system 2200 may be implemented with, e.g., one, two, three, four, five, six, seven, eight, and the like, patch cord assemblies. Thus, one housing 2201 can include a plurality of patch cords varying by, e.g., plug type, length, color, and the like. The rotating core 2206 can include at least one partition 2205 positioned coaxially around said core, thereby separating the plurality of patch cord assemblies 2204*a-d*. The rotating core 2206 can include, e.g., thrust washers, and the like, to ensure that each patch cord assembly 2204*a-d* can be dispensed independently of the other patch cord assemblies 2204*a-d*.

For example, the first patch cord assembly 2204*a* can be dispensed from the housing 2201, while the second, third and fourth patch cord assemblies 2204*b-d* remain substantially static around the rotating core 2206. Each patch cord assembly 2204*a-d* can therefore rotate independently of the other patch cord assemblies 2204*a-d* on the rotating core 2206. A user can thereby select and dispense a patch cord of interest without dispensing the other patch cords located in the exemplary housing 2201. In some embodiments, the housing 2201 can include a selection element (not shown) which permits a user to select whether the patch cord assemblies 2204*a-d* rotate independently of each other or rotate simultaneously. In some embodiments, the housing 2201 can include a coupler element remover which assists a user in removing the coupler element from the patch cords and/or removing the patch cords from the coupler element. In some embodiments, the housing 2201 can include a handle 2208, e.g., a strap, one or more side openings configured to receive a user's fingers, and the like, for lifting and transporting the system 2200.

Figure 41A:
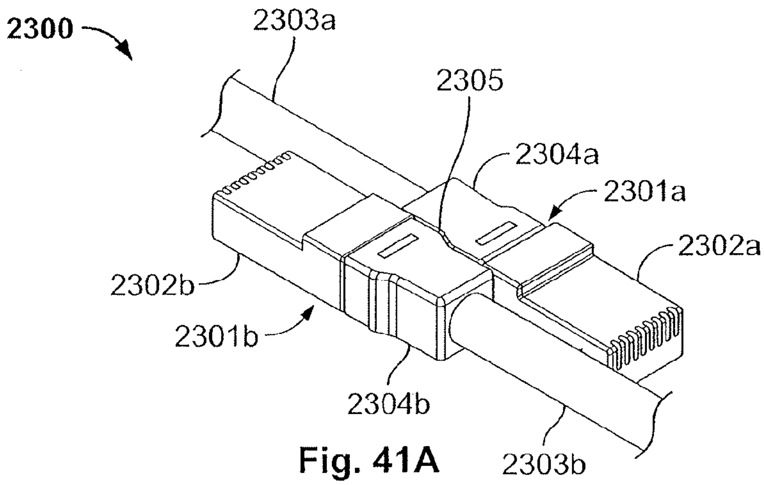
FIGS. 41A-E are views of an exemplary embodiment of a first coupler element configured as male and female components.
Figure 41B:
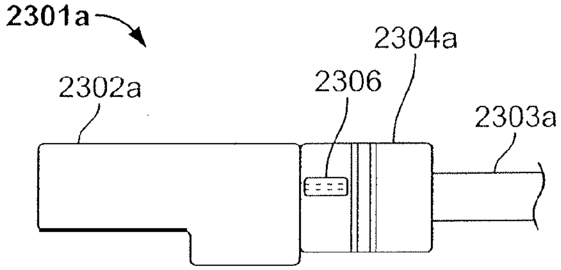
Figure 41D:
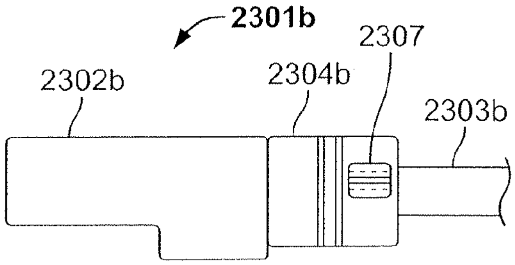
Figure 41C:
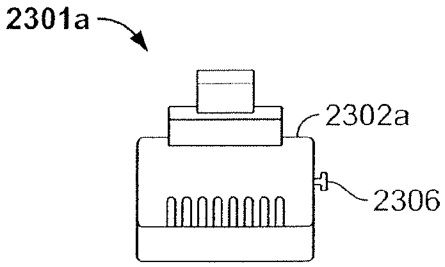
Figure 41E:
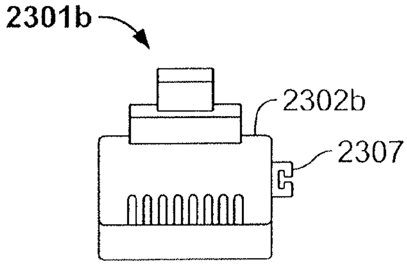

Turning now to FIGS. 41A-E, an exemplary embodiment of a patch cord assembly 2300 is illustrated. In particular, FIG. 41A shows the exemplary patch cord assembly 2300 in an interlocked state, FIGS. 41B and D show side views of exemplary first and second patch cords 2301*a* and 2301*b*, and FIGS. 41C and E show front views of exemplary first and second patch cords 2301*a* and 2301*b*. The first and second patch cords 2301*a* and 2301*b*, e.g., RJ-45 type cords, and the like, generally include first and second plugs 2302*a* and 2302*b*, first and second elongated cords 2303*a* and 2303*b*, and first and second boots 2304*a* and 2304*b*. The first and second boots 2304*a* and 2304*b* generally define an angled portion 2305 thereon. The first and second boots 2304*a* and 2304*b* can include a coupler element which can be configured as, e.g., a keyway mechanism, a V-groove mechanism, a male/female mechanism, a ball and socket joint, and the like.

FIGS. 41B-E illustrate an exemplary coupler element configured as a male/female mechanism. In particular, the male/female mechanism generally includes a male component 2306, e.g., a T-shaped protrusion, a fin-shaped protrusion, and the like, located on the first patch cord 2301*a* and a female component 2307, e.g., a groove, channel, cavity, recess, receiving feature and/or surface, slot, and the like, located on the second patch cord 2301*b*. The female component 2307 can be configured and dimensioned to slidably receive the male component 2306 in a detachable manner. For example, in some exemplary embodiments, the male component 2306 can be configured as a substantially T-shaped protrusion and the female component 2307 can be configured as a complementary T-shaped groove configured and dimensioned to receive the T-shaped protrusion.

The male component 2306 can generally be slid into the female component 2307 such that the angled portions 2305 of the first and second boots 2304*a* and 2304*b* substantially mate against each other. As would be understood by those of ordinary skill in the art, the angled portion 2305 can maintain the first and second patch cords 2301*a* and 2301*b* in an interlocked state when the first and second patch cords 2301*a* and 2301*b* are pulled away from each other. The male component 2306 can be slid out of the female component 2307 in order to detach the first patch cord 2301*a* from the second patch cord 2301*b*. In some exemplary embodiments, the first and second patch cords 2301*a* and 2301*b* may be separated by breaking away the first patch cord 2301*a* from the second patch cord 2301*b*, e.g., breaking away the male component 2306 such that the male component 2306 remains within the female component 2307.

Figure 42A:
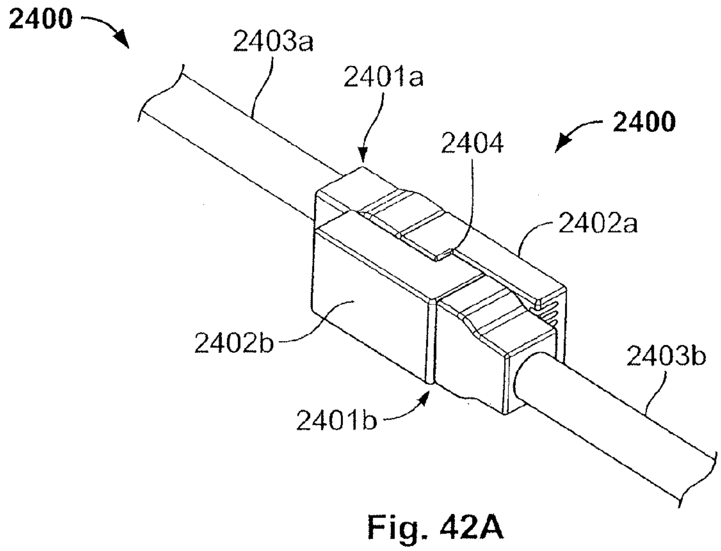
FIGS. 42A-E are views of an alternative exemplary embodiment of a first coupler element configured as male and female components
Figure 42B:
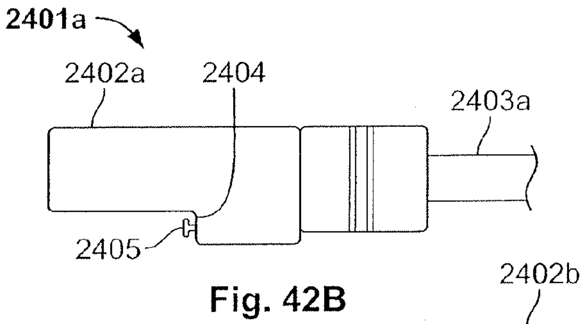
Figure 42D:
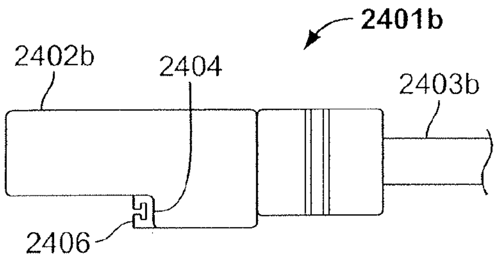
Figure 42C:
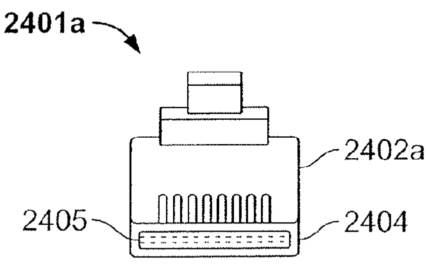
Figure 42E:
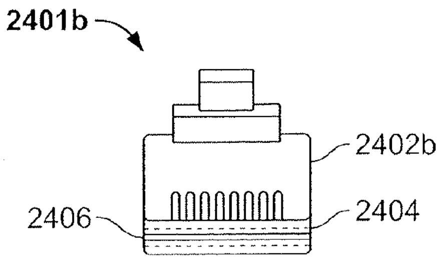

With reference to FIGS. 42A-E, an exemplary embodiment of a patch cord assembly 2400 is illustrated. In particular, FIG. 42A shows the exemplary patch cord assembly 2400 in an interlocked state, FIGS. 42B and D show side views of exemplary first and second patch cords 2401*a* and 2401*b*, and FIGS. 42C and E show front views of exemplary first and second patch cords 2401*a* and 2401*b*. The first and second patch cords 2401*a* and 2401*b*, e.g., RJ-45 type cords, and the like, generally include first and second plugs 2402*a* and 2402*b* and first and second elongated cords 2403*a* and 2403*b*. The first and second plugs 2402*a* and 2402*b* generally include an overmold section 2404 configured and dimensioned as, e.g., a step, and the like. The overmold section 2404 can include a coupler element which can be configured as, e.g., a keyway mechanism, a V-groove mechanism, a male/female mechanism, a ball and socket joint, and the like.

FIGS. 42B-E illustrate an exemplary coupler element configured as a male/female mechanism. In particular, the male/female mechanism generally includes a male component 2405, e.g., a T-shaped protrusion, a fin-shaped protrusion, and the like, located on the first patch cord 2401*a* and a female component 2406, e.g., a groove, channel, cavity, recess, receiving feature and/or surface, slot, and the like, located on the second patch cord 2401*b*. The female component 2406 can be configured and dimensioned to slidably receive the male component 2405 in a detachable manner. For example, in some exemplary embodiments, the male component 2405 can be configured as a substantially T-shaped protrusion and the female component 2406 can be configured as a complementary T-shaped groove configured and dimensioned to receive the T-shaped protrusion.

The male component 2405 can generally be slid into the female component 2406 such that the overmold sections 2404 of the first and second patch cords 2401*a* and 2401*b* substantially mate against each other. As would be understood by those of ordinary skill in the art, male/female mechanism can maintain the first and second patch cords 2401*a* and 2401*b* in an interlocked state when the first and second patch cords 2401*a* and 2401*b* are pulled away from each other. The male component 2405 can be slid out of the female component 2406 in order to detach the first patch cord 2401*a* from the second patch cord 2401*b*. In some exemplary embodiments, the first and second patch cords 2401*a* and 2401*b* may be separated by breaking away the first patch cord 2401*a* from the second patch cord 2401*b*, e.g., breaking away the male component 2405 such that the male component 2405 remains within the female component 2406.

Figure 43:
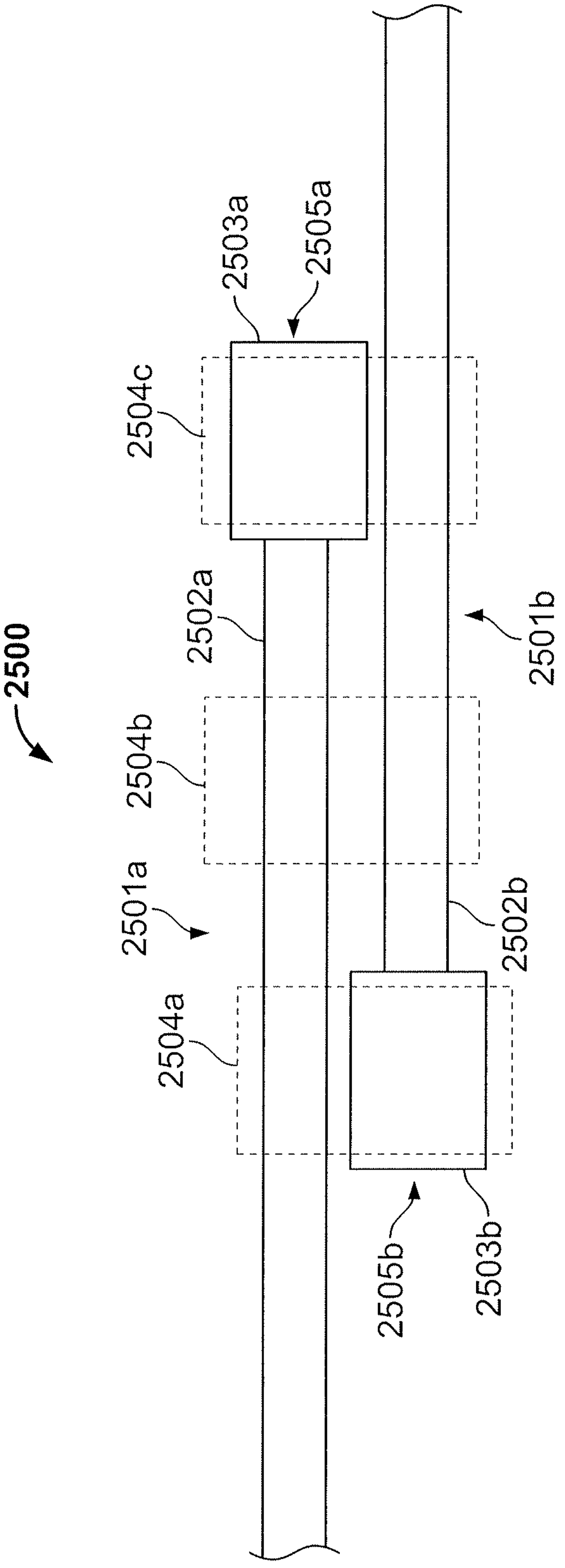
FIG. 43 is a view of an exemplary embodiment of a cable assembly.

Turning now to FIG. 43, an exemplary cable assembly 2500 is provided that generally includes a first cable 2501*a* and a second cable 2501*b*. The first cable 2501*a* generally includes a first elongated cord 2502*a* and a first connector 2503*a*. The second cable 2501*b* generally includes a second elongated cord 2502*b* and a second connector 2503*b*. The first and second connector 2503*a* and 2503*b* can be, e.g., a plug, a jack, and the like. The first and second connectors 2503*a* and 2503*b* can be positioned in an opposing direction relative to each other. In particular, the front end 2505*a* of the first connector 2503*a* can face in one direction and the front end 2505*b* of the second connector 2503*b* can face in an opposing direction. In some embodiments, the first and second cables 2501*a* and 2501*b* can be positioned in a substantially parallel configuration.

In addition, the first and second cables 2501*a* and 2501*b* can be positioned such that the first connector 2503*a* passes the second connector 2503*b* and is positioned substantially adjacent to the second elongated cord 2502*b*. Similarly, the second connector 2503*b* can pass the first connector 2503*a* and can be positioned substantially adjacent to the first elongated cord 2502*b*. In some embodiments, the first connector 2503*a* can be positioned adjacent to the second elongated cord 2502*b* and the second connector 2503*b* can be positioned adjacent to the first elongated cord 2502*b* in a passing and slightly spaced relation.

At least one coupler element can be used for maintaining the first connector 2503*a* positioned adjacent to the second elongated cord 2502*b* and the second connector 2503*b* positioned adjacent to the first elongated cord 2502*a*. The coupler element can be, e.g., adhesive tape, Velcro®, a clip, and the like. The coupler element can also be one of the coupler elements discussed above. For example, at least one of the coupler element 2504*a*, 2504*b* and 2504*c* can be used. Coupler element 2504*a* detachably secures the second connector 2503*b* to the first elongated cord 2502*a*. Coupler element 2504*b* detachably secures the first elongated cord 2502*a* to the second elongated cord 2502*b*. Coupler element 2504*c* detachably secures the first coupler element 2503*a* to the second elongated cord 2502*b*. It should be understood that at least one or some combination of the above coupler elements 2504*a*, 2504*b*, 2504*c* can be used to detachably secure the first cable 2501*a* and second cable 2501*b* to maintain the position of the first and second connectors 2503*a* and 2503*b* positioned adjacent to the second and first elongated cords 2502*b* and 2502*a*, respectively. In some embodiments, a spacer element (not shown) substantially similar to the spacer elements discussed above can be positioned between, e.g., the first connector 2503*a* and the second elongated cord 2502*b*, the second connector 2503*b* and the first elongated cord 2502*a*, the first elongated cord 2502*a* and the second elongated cord 2502*b*, combinations thereof, and the like.

Figure 44:
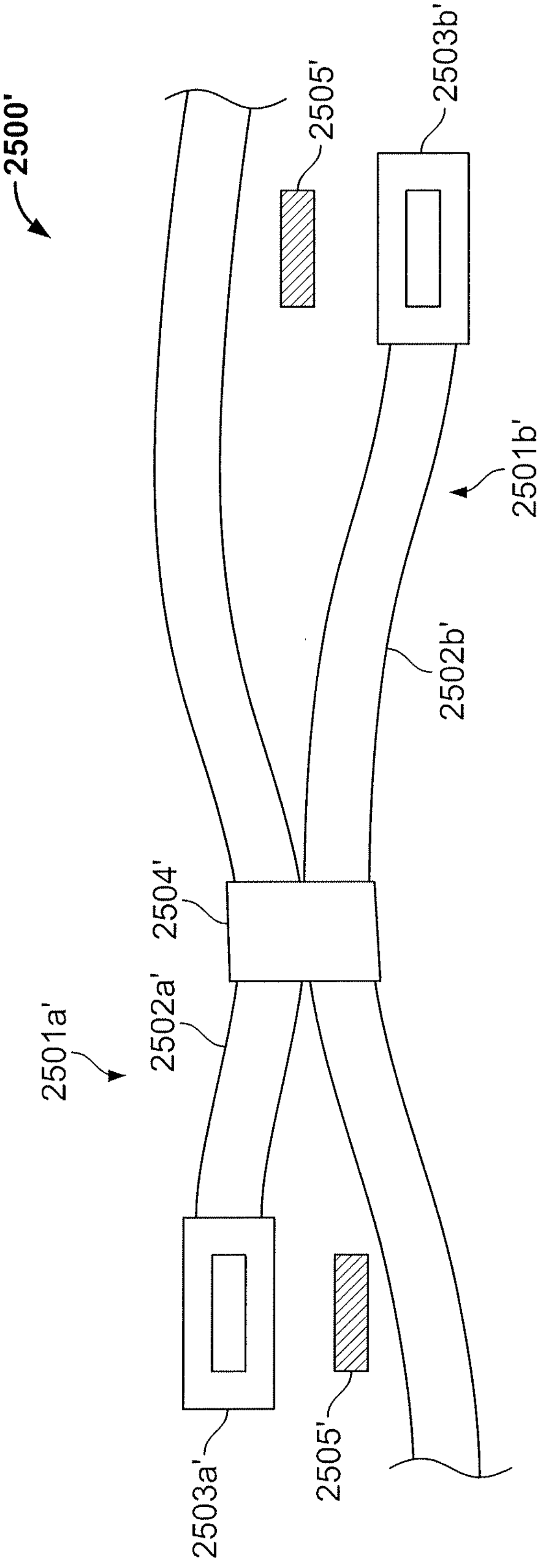
FIG. 44 is a view of an alternative exemplary embodiment of a cable assembly.

FIG. 44 illustrates an exemplary cable assembly 2500' substantially similar to the cable assembly 2500 discussed above. In particular, the cable assembly 2500' generally includes a first cable 2501*a*' and a second cable 2501*b*'. The first cable 2501*a*' generally includes a first elongated cord 2502*a*' and a first connector 2503*a*', e.g., a plug, jack, and the like. The second cable 2501*b*' generally includes a second elongated cord 2502*b*' and a second connector 2503*b*', e.g., a plug, jack, and the like. The first and second connectors 2503*a*' and 2503*b*' can be positioned in an opposing and passing relation. The first connector 2503*a*' can then be positioned adjacent to the second elongated cord 2503*b*' and the second connector 2503*b*' can be positioned adjacent to the first elongated cord 2503*a*'. A coupler element 2504', e.g., adhesive tape, Velcro®, a clip, and the like, can be used to detachably secure and maintain the first and second cables 2501*a*' and 2501*b*' in the opposing, passing and side-by-side relation. FIG. 44 also illustrates exemplary spacer elements 2505' positioned between the first connector 2503*a*' and the second elongated cord 2502*b*' and the second connector 2503*b*' and the first elongated cord 2502*a*', respectively. In some embodiments, the spacer element 2505' can be positioned between the first elongated cord 2502*a*' and the second elongated cord 2502*b*'. Although shown as a separate component, it should be understood that in some embodiments, the spacer element 2505' can be integrally formed and/or connected to the coupler element 2504'.

Figure 45:
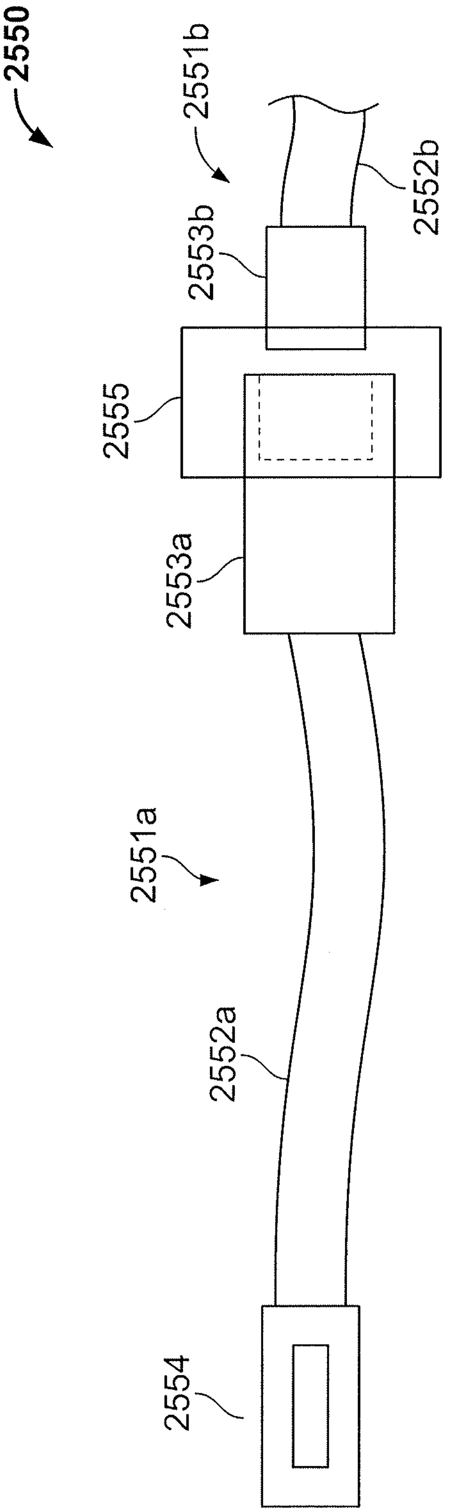
FIG. 45 is a view of an alternative exemplary embodiment of a cable assembly.

With reference to FIG. 45, an exemplary cable assembly 2550 is provided that generally includes a first cable 2551*a* and a second cable 2551*b*. The first cable generally includes a first elongated cord 2552*a* and a first connector 2553*a* mounted with respect to one end of the first elongated cord 2552*a*. FIG. 45 also illustrates an additional connector 2554 mounted with respect to an end of the first elongated cord 2552*a* opposing the first connector 2553*a*. The connectors 2553*a*, 2554 can be, e.g., a plug, a jack, and the like. For example, FIG. 45 shows the first connector 2553*a* as a jack and the additional connector 2554 as a plug. Thus, the exemplary cables discussed herein can have, e.g., a plug/plug combination, a plug/jack combination, and a jack/jack combination. The second cable 2551*b* generally includes a second elongated cord 2552*b* and a second connector 2553*b*, e.g., a plug or jack. FIG. 45 illustrates the second connector 2553*b* as a plug, although it should be understood that the second connector 2553*b* could also be a jack. It should also be understood that an end of the second elongated cord 2552*b* opposing the second connector 2553*b* can include an additional connector, e.g., a plug, a jack, and the like. For assembly, the first connector 2553*a* and the second connector 2553*b* can be positioned in a juxtaposed relation, e.g., an opposing relation as shown in FIG. 45, and detachably secured relative to each other with a coupler element 2555. In some embodiments, a spacer element (not shown) substantially similar to the spacer elements discussed above can be positioned between, e.g., the first connector 2551*a* and the second connector 2551*b*, to protect the first and second connectors 2551*a* and 2551*b* from potential damage during packaging, payout and/or transport.

Figure 46:
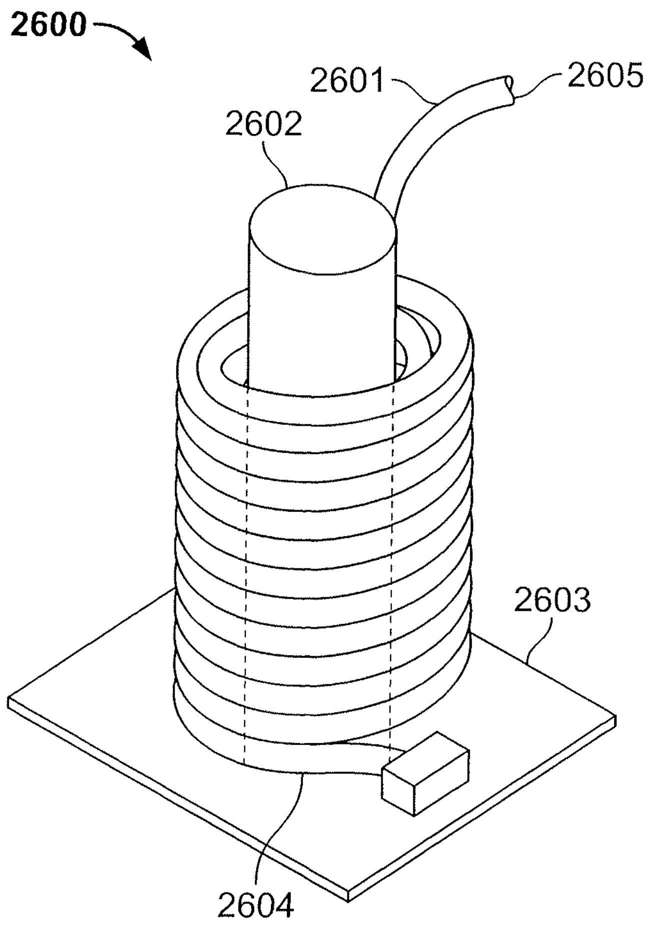
FIG. 46 is a view of an exemplary cable assembly system.

Turning now to FIG. 46, an exemplary cable assembly system 2600 for packaging and payout of cable assemblies is provided. In particular, system 2600 generally includes a support structure 2602, e.g., a rotating spindle, which is configured and dimensioned to receive at least one cable assembly 2601. It should be understood that cable assembly 2601 can be any of the exemplary cable assemblies discussed herein. The cable assembly 2601 can be coiled around the support structure 2602 for packaging and payout. The support structure 2602 can also include a base 2603 for providing a stable surface on which the support structure 2602 can axially rotate at point 2604. In some embodiments, the system 2600 includes a housing (not shown) for encasing the support structure 2602, base 2603 and cable assembly 2601. In the embodiment shown in FIG. 46, system 2600 does not include a housing. Rather, for dispensing cables, an exposed end 2605 of a cable assembly 2601 can be pulled such that the support structure 2602 rotates about point 2604. The cable assemblies 2601 can then be separated by the user and installed in the field.

Figure 47:
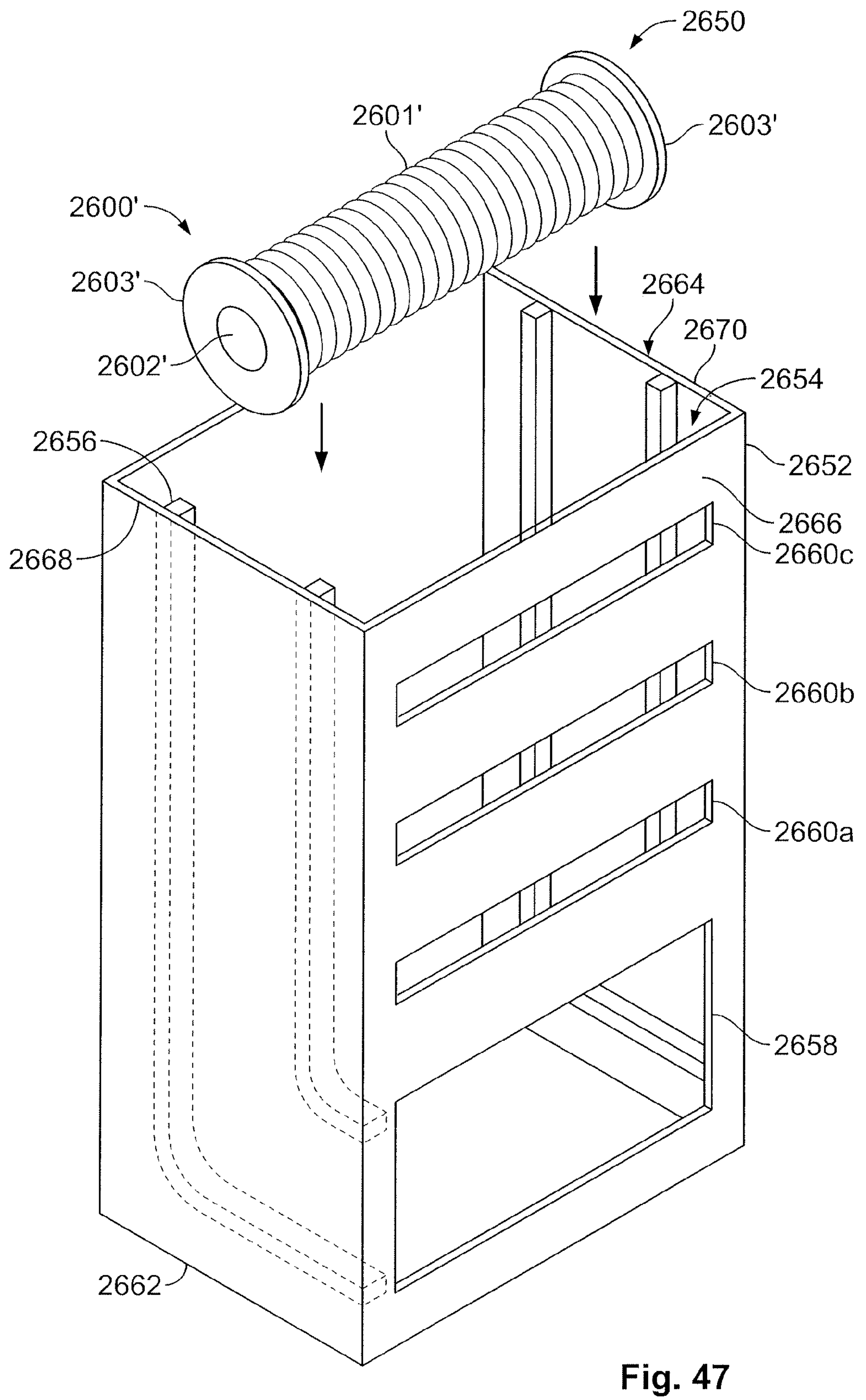
FIG. 47 is a view of an exemplary cable assembly system.

FIG. 47 illustrates an exemplary cable assembly system 2650 which includes a cable assembly system 2600' similar to the cable assembly system 2600 of FIG. 46. In particular, system 2600' generally includes two bases 2603', e.g., round bases, connected to opposing ends of a support structure 2602', e.g., an axle which can rotate relative to the bases 2603'. The system 2600' also includes plurality of cable assemblies 2601' coiled around the support structure 2602' to form a spool of cable assemblies 2601'. The system 2600' can be used in combination with a housing 2652. The housing 2652 can be fabricated from, e.g., plastic, aluminum, Plexiglas®, cardboard, and the like. In particular, housing 2652 generally defines an interior cavity 2654 configured and dimensioned to receive one or more systems 2600'. A top side 2664 of the housing 2652 can include an opening to the interior cavity 2654.

The interior surfaces of side walls 2668 and 2670 of the housing 2652 can include tracks 2656, e.g., channels, grooves, and the like, configured and dimensioned to receive the bases 2603' of the system 2600'. As would be understood by those of ordinary skill in the art, the system 2600' can be loaded into the housing 2652 and can slide along the tracks 2656. The housing 2652 also includes openings 2660*a*-2660*c*, e.g., feed out ports, on the front side 2666 of the housing 2652. The housing 2652 also includes an exit opening 2658, e.g., an empty spool exist, on the front side 2666 and adjacent to the bottom side 2662 of the housing 2652. The openings 2660*a*-2660*c* can be vertically spaced along the front side 2666 of the housing 2652 such that when systems 2600' are inserted into the housing 2652, the systems 2600' can substantially align with the openings 2660*a*-2660*c* to dispense the spooled cable assemblies 2601' through a dedicated opening 2660*a*-2660*c*. When the spool of system 2600' has been fully used and/or when a user decides to replace the cables in the housing 2652, the system 2600' can be removed from the exit opening 2662. In particular, the tracks 2656 can extend from the top side 2664 of the housing 2652 and can curve in the direction of the exist opening 2662 such that empty spools can be ejected from the housing 2652. In some embodiments, the housing 2652 can include a window for visualization of the systems 2600' within the housing 2652. The bottom side 2662 can also include an anti-movement feature, e.g., a textured surface, a friction surface, Velcro®, and the like, to prevent the system 2650 from sliding when cable assemblies 2601' are dispensed from the housing 2652.

Figure 48:
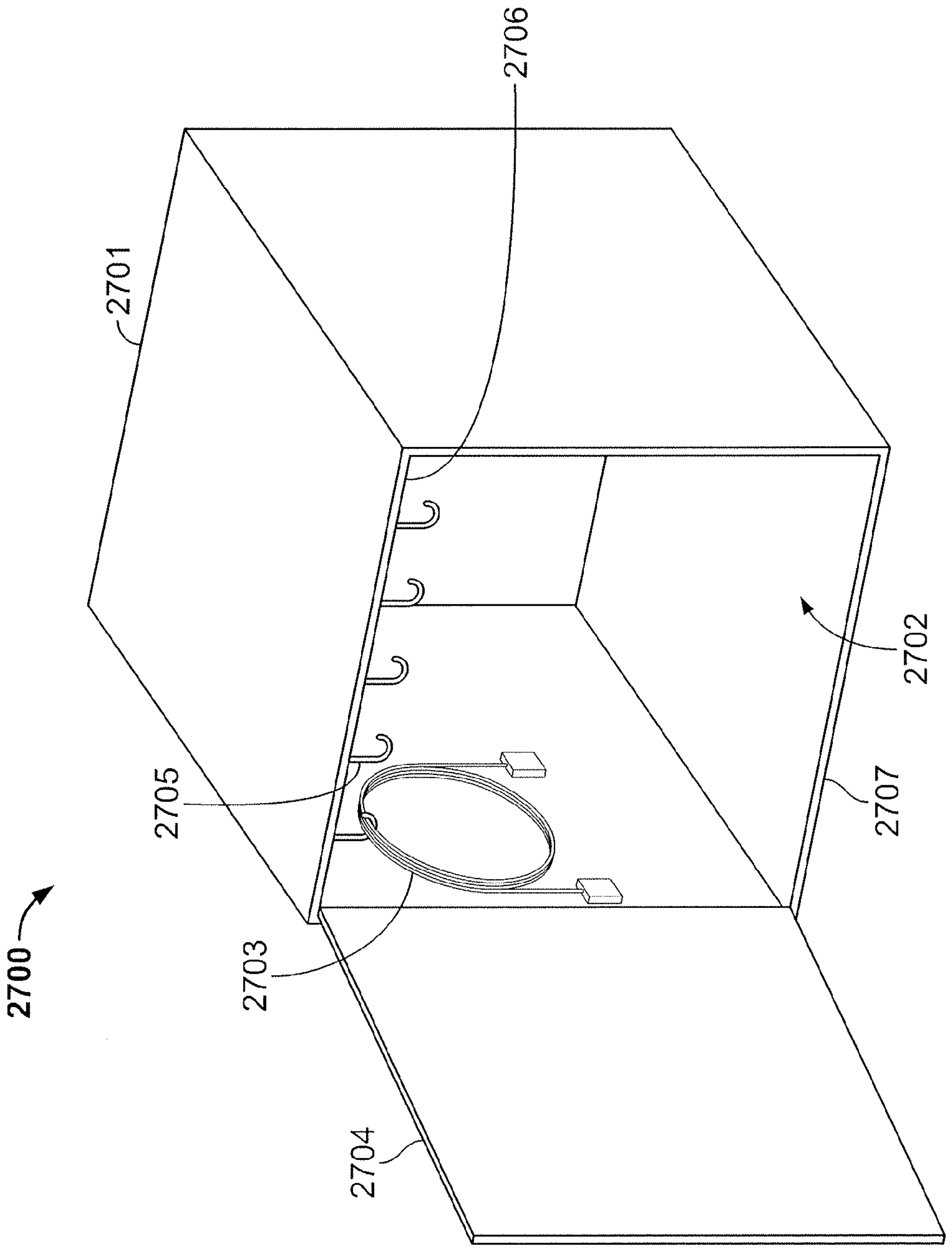
FIG. 48 is a view of an exemplary cable assembly system.

With reference to FIG. 48, an exemplary cable assembly system 2700 is provided. System 2700 generally includes a housing 2701, e.g., a box, a container, a closet, and the like, defining an interior space 2702 or cavity with a plurality of support structures 2705, e.g., hooks, and the like, fixated to an inner surface of the top side 2706 of the housing 2701. Cable assemblies 2703 can be positioned and/or packaged within the housing 2701 by hanging the cable assemblies 2703 on one or more of the support structures 2705. The cable assemblies 2703 can thereby be isolated from other cable assemblies 2703 located in the housing 2701. In some embodiments, the housing 2701 can include dividers (not shown) between at least some of the support structures 2705 to isolate cable assemblies 2703 relative to adjacently positioned cable assemblies 2703. The housing 2701 may also include a door 2704 which can be attached at a hinge for accessing the interior space 2702 of the housing 2701. In some embodiments, the housing 2701 can include a window (not shown) on one of the walls for visualizing the contents of the housing 2701. The bottom side 2707 of the housing 2701 can also include an anti-movement feature, e.g., a textured surface, a friction surface, Velcro®, and the like, to prevent the system 2700 from sliding when cable assemblies 2703 are dispensed from the housing 2701.

Figure 49:
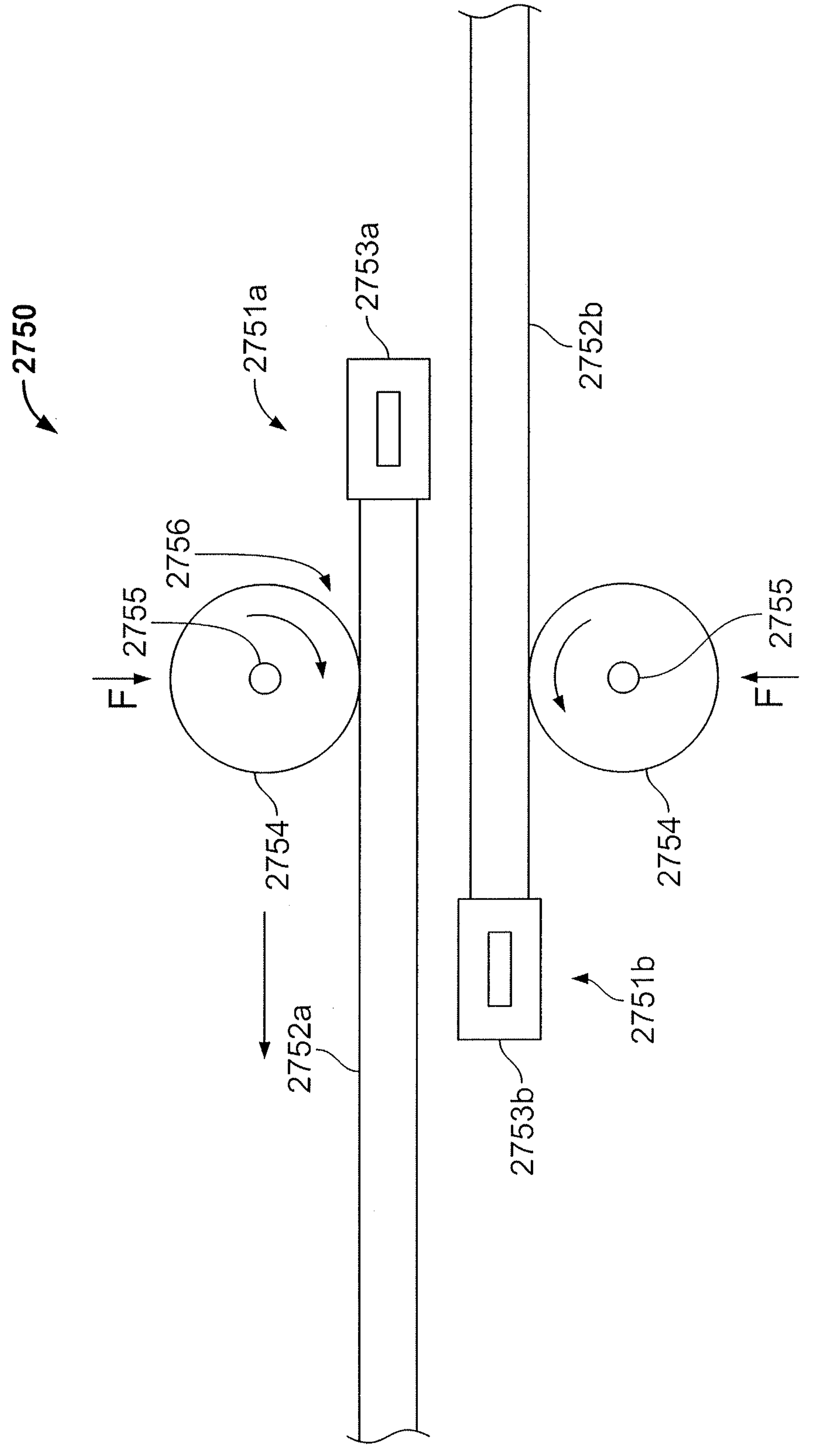
FIG. 49 is a view of exemplary internal components of an exemplary cable assembly system.

Turning now to FIG. 49, an exemplary force-imparting structure 2750 is shown which can be implemented in any of the exemplary housings discussed herein for paying out cable assemblies. The force-imparting structure 2750 is shown in FIG. 49 as two rollers 2754, e.g., spring-loaded and/or adjustable rollers 2754. However, it should be understood that the force-imparting structure 2750 can be, e.g., adjustable bladders, and the like. Each of the rollers 2754 can be adjustable in position by, e.g., a spring-loaded mechanism, to vary the constriction point 2756 between the rollers 2754 and can rotate along axis 2755 when a cable is being pulled out of the housing. The adjustable position of the rollers 2754 also adjusts the force F imparted by the rollers 2754 on the first and second cables 2751*a* and 2751*b* passing through the constriction point 2756. The first and second cables 2751*a* and 2751*b* include first and second elongated cords 2752*a* and 2752*b* and first and second connectors 2753*a* and 2753*b*, e.g., plugs, jacks, and the like.

The force F imparted by the rollers 2754 on the first and second cables 2751*a* and 2751*b* can create an engagement of the first and second cables 2751*a* and 2751*b* relative to each other due to, e.g., frictional cooperation. Thus, as the first cable 2751*a* is being pulled out of a housing through the constriction point 2756 in the direction shown in FIG. 49, the frictional cooperation between the first and second cables 2751*a* and 2751*b* can cause the second cable 2751*b* to be at least partially pulled out of the housing in preparation for full payout. It should be understood that the force F imparted by the rollers 2754 can be adjusted as the components of the first and second cables 2751*a* and 2751*b* passing through the constriction point 2756 vary. For example, the constriction point 2756 can be narrow when the first and second elongated cords 2752*a* and 2752*b* are passing through the constriction point 2756. However, the position of the rollers 2754 can be automatically adjusted to increase the constriction point 2756 when the first and/or second connectors 2753*a* and/or 2753*b* are passing through the constriction point 2756 while still maintaining a force F on the first and second cables 2751*a* and 2751*b* for frictional cooperation.

Although illustrated as two cables passing through the force-imparting structure 2750, in some embodiments, 2751*a* and 2751*b* can designate separate cable assemblies which are not coupled relative to each other. For example, two cable assemblies 2550 can be passed through the force-imparting structure 2750 such that as a first cable assembly 2550 is being pulled out of the housing, the frictional cooperation between the first and second cable assemblies 2550 forces the second cable assembly 2550 to also pass through the constriction point 2756. Thus, the cables and/or cable assemblies of separate cable assemblies passing through the force-imparting structure 2750 are not adjoined relative to each other. Rather, the cables and/or cable assemblies can be, e.g., tucked, folded, pressed, and the like, together temporarily upon reaching the constriction point 2756 to ensure frictional cooperation between the cables and/or cable assemblies. Although two rollers 2754 are illustrated in FIG. 49, in some exemplary embodiments, only one adjustable roller 2754 can be positioned adjacent to a solid structure for creating a constriction point 2756 between the roller 2754 and the solid structure, e.g., a wall of the housing. In some exemplary embodiments, a plurality of rollers 2754 can be used to maintain the frictional cooperation between the cables and/or cable assemblies.

Figure 50:
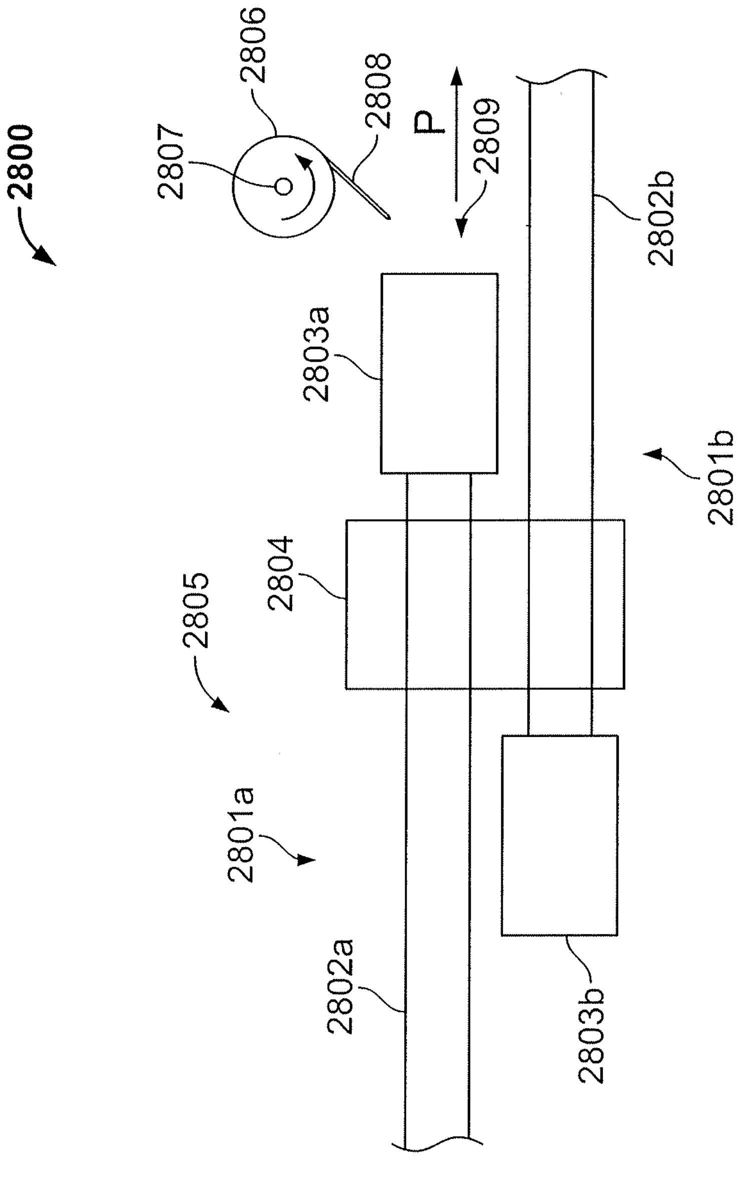
FIG. 50 is a view of an exemplary counter mechanism of an exemplary cable assembly system.

With reference to FIG. 50, an exemplary counter mechanism 2800 is provided which can be implemented with the exemplary housings described herein. For example, the counter mechanism 2800 is illustrated in FIG. 50 with a cable assembly 2805 which includes first and second cables 1801*a* and 2801*b*. The first and second cables 2801*a* and 2801*b* include first and second elongated cords 2802*a* and 2802*b* and first and second connectors 2803*a* and 2803*b*, e.g., plugs, jacks, and the like. The first and second cables 2801*a* and 2801*b* can be detachably secured relative to each other with a coupler element 2804.

The counter mechanism 2800 generally includes a roller 2806 rotatable about axle 2807. The roller 2806 can include at least one protrusion 2808, e.g., tooth, extending out of the roller 2806. Although one protrusion 2808 is shown in FIG. 50, in some embodiments, a plurality of protrusions 2808 can be used. The counter mechanism 2800 can generally be aligned with a path P of motion of the cable assembly 2805. In particular, the counter mechanism 2800 can be aligned with the path P of the cable assembly 2805 such that as the cable assembly 2805 is pulled out of the housing through, e.g., a constriction point 2809, at least one of the first connector and/or second connector 2803*a* and/or 2803*b* press against and actuate the protrusion 2808. The counter mechanism 2800 can be, e.g., a ratchet mechanism, which includes a plurality of protrusions 2808 which rotate upon each actuation by a first and/or second connector 2803*a* and/or 2803*b*. The counter mechanism 2800 can be, e.g., a spring-loaded mechanism, which includes at least one protrusion 2808 which makes a 360° revolution on roller 2807 upon actuation by a first and/or second connector 2803*a* and/or 2803*b* to reposition the protrusion 2808 for the next cable passing through the constriction point 2809.

Thus, as each cable of the cable assembly 2805 is passed through the constriction point 2809 during payout from a housing, the counter mechanism 2800 can be actuated to, e.g., count down from the original or total number of cables in the housing to zero. The counter mechanism 2800 can also be reset when the housing is refilled with additional cables and/or cable assemblies 2805. Although illustrated as having one roller 2806, in some embodiments, two or more rollers 2806 can be used in the counter mechanism 2800, e.g., one roller 2807 positioned to actuate upon passing of a first connector 2803*a* and another roller 2807 positioned to actuate upon passing of a second connector 2803*b*.

Figure 51:
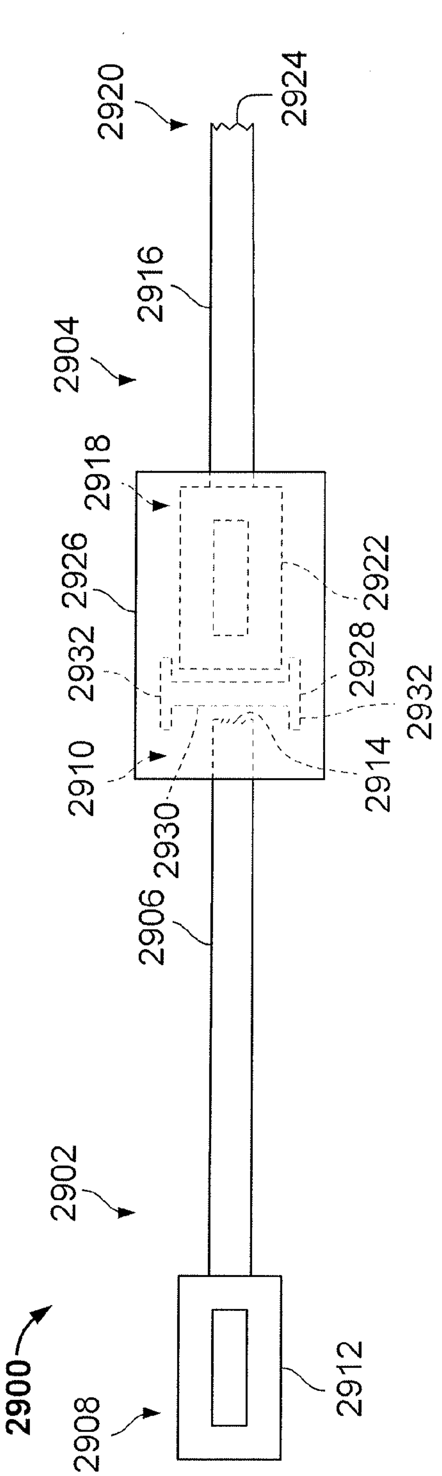
FIG. 51 is a side view of an exemplary cable assembly with a first and second cable in an opposed relation according to the present disclosure.

With reference to FIG. 51, an exemplary embodiment of a cable assembly 2900 is shown. The cable assembly 2900 includes a first cable 2902 and a second cable 2904. The first cable 2902 includes a first elongated cord 2906 which defines two opposing ends, e.g., a first end 2908 and a second end 2910. A first connector 2912, e.g., a plug, a jack, and the like, can be mounted to the first end 2908 of the first elongated cord 2906. The second end 2910 of the first elongated cord 2906 can be defined by a first bare cable 2914, e.g., a cable having exposed internal wires for connection to an electrical component. Similarly, the second cable 2904 includes a second elongated cord 2916 which defines two opposing ends, e.g., a first end 2918 and a second end 2920. A second connector 2922, e.g., a plug, a jack, and the like, can be mounted to the first end 2918 of the second elongated cord 2916. The second end 2920 of the second elongated cord 2916 can be defined by a second bare cable 2924.

The cable assembly 2900 further includes a coupler element 2926, e.g., a clip coupler, a cover, one or more elongated bands, and the like, for detachably securing the first cable 2902 relative to the second cable 2904. For example, a clip coupler can include a grasping means which detachably secures to the first and/or second elongated cords 2906, 2916 and/or the first and/or second connectors 2912, 2922. The first and second cables 2902, 2904 can be separated from each other by unclipping the clip coupler from the desired cable. As a further example, a cover coupler can be a transparent plastic cover which receives therein and is sealed around at least a portion of the first and/or second elongated cords 2906, 2916 and/or the first and/or second connectors 2912, 2922. The first and second cables 2902, 2904 can be separated from each other by breaking the seal of the cover coupler. In yet a further example, one or more elongated band couplers can include band elements which wrap around at least a portion of the first and/or second elongated cords 2906, 2916 and/or the first and/or second connectors 2912, 2922 and include score lines at which the elongated band couplers can be torn. The first and second cables 2902, 2904 can be separated from each other by tearing the appropriate elongated band coupler at the score line to release the desired cable.

In particular, the coupler element 2926 detachably secures the first cable 2902 relative to the second cable 2904 such that the first bare cable 2914 and the second connector 2922 are positioned in a juxtaposed relation, e.g., an adjoining relation, an opposed relation, a side-by-side relation, a co-planar relation, a spaced relation, a passing relation, combinations thereof, and the like. The clip coupler element 2926 can be detachably secured around the first bare cable 2914 and the second connector 2922 by, e.g., inserting the first bare cable 2914 and the second connector 2922 between two spring-loaded surfaces which compress around the first bare cable 2914 and the second connector 2922. It should be noted that the compression created by the spring-loaded surfaces can be gauged to securely hold the first bare cable 2914 and the second connector 2922, while preventing damage to the first bare cable 2914 and the second connector 2922.

FIG. 51 shows the first and second cables 2902, 2904 detachably coupled by the coupler element 2926 such that the first bare cable 2914 and the second connector 2922 are in an opposed, spaced and co-planar relation. In particular, the first and second cables 2902, 2904 are positioned such that the first bare cable 2914 faces the second connector 2922 and the first and second elongated cords 2906, 2916 are substantially aligned relative to each other. The coupler element 2926 can, for example, surround, cover and/or encase the first bare cable 2914 and the second connector 2922. In some embodiments, the coupler element 2926 can surround, cover and/or encase portions of the first and second elongated cords 2906, 2916 adjacent to the first bare cable 2914 and/or the second connector 2922. The first cable 2902 and the second cable 2904 can be detached from the coupler element 2926 (and from each other) by, e.g., pulling the first bare cable 2914 or the second connector 2922 from the coupler element 2926, breaking or tearing the coupler element 2926, releasing or opening the spring-loaded surfaces of the coupler element 2926, and the like. In some embodiments, the coupler element 2926 can be fabricated from a flexible material, e.g., a plastic, such that the cable assembly 2900 can be coiled and/or reeled within a housing for packaging and payout of the cable assembly 2900.

Still with reference to FIG. 51, the cable assembly 2900 can optionally include a spacer element 2928 positioned between the first bare cable 2914 and the second connector 2922. The spacer element 2928 can function to prevent contact between the first bare cable 2914 and the second connector 2922, thereby substantially preventing or minimizing damage to the first bare cable 2914 and/or the second connector 2922. Although the spacer element 2928 is shown in FIG. 51 as an independent structure, the spacer element 2928 can be formed as an extension of the coupler element 2926 structure. The spacer element 2928 can be fabricated from, e.g., foam, STYROFOAM®, a non-conductive material, and the like.

In some embodiments, the spacer element 2928 can define an I-shaped form to, e.g., ensure separation between the first bare cable 2914 and the second connector 2922, limit translation of the first bare cable 2912 and the second connector 2922, and the like. For example, the spacer element 2928 can include an elongated body section 2930 and end protrusions 2932 on opposing ends of the elongated body section 2930. The elongated body section 2930 and the end protrusions 2932 can be dimensioned such that when the first bare cable 2914 and/or the second connector 2922 are positioned adjacent to the spacer element 2928, the end protrusions 2932 are positioned immediately adjacent to the sides of the first bare cable 2914 and/or the second connector 2922 to prevent or reduce translation of the first bare cable 2912 and/or the second connector 2922 within the coupler element 2926. In some embodiments, the distance between the end protrusions 2932 on one end of the spacer element 2928 can be different from the distance between the end protrusions 2932 on the opposing end to accommodate the different sizes and configurations of the first bare cable 2914 and the second connector 2922.

Figure 52:
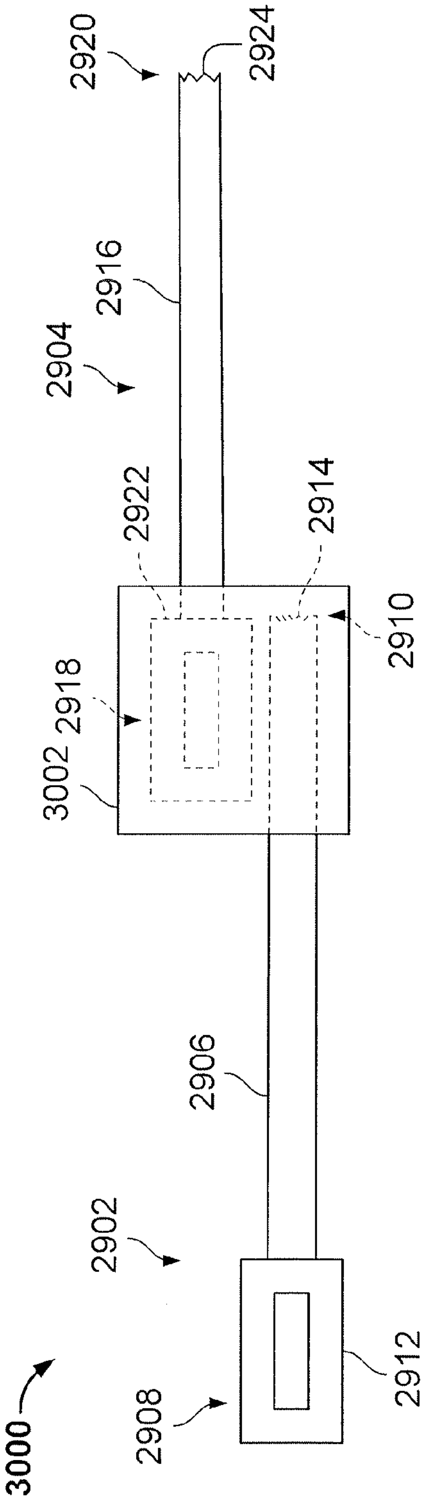
FIG. 52 is a side view of an exemplary cable assembly with a first and second cable in a side-by-side relation according to the present disclosure.

FIG. 52 shows an exemplary cable assembly 3000 which is substantially similar in structure and function to the cable assembly 2900 of FIG. 51, except for the distinctions noted herein. Therefore, like reference numbers represent like structures. In particular, the coupler element 3002, e.g., a clip coupler, a cover, one or more elongated bands, and the like, can be used to detachably secure the first bare cable 2914 relative to the second connector 2922 in a different orientation. For example, as shown in FIG. 52, the first cable 2902 and the second cable 2904 can be detachably secured relative to each other by the coupler element 3002 such that the first bare cable 2914 and the second connector 2922 are in an adjacent, co-planar and side-by-side relation. The coupler element 3002 can, for example, surround, cover and/or encase the first bare cable 2914 and the second connector 2922. In some embodiments, the coupler element 3002 can surround, cover and/or encase portions of the first and second elongated cords 2906, 2916 adjacent to the first bare cable 2914 and/or the second connector 2922.

The adjacent, co-planar and side-by-side relation can be represented by the side of the first elongated cord 2906 being positioned adjacent to the side of second connector 2922. The first and second cables 2902, 2904 are thereby positioned such that the first and second elongated cords 2906, 2916 are substantially parallel relative to each other. In addition, the adjacent, co-planar and side-by-side relation can be represented by the second end 2910 of the first cable 2904 with the first bare cable 2914 being substantially aligned with an area of engagement between the second connector 2922 and the second elongated cord 2916. The first cable 2902 and the second cable 2904 can be detached from the coupler element 3002 (and from each other) by, e.g., pulling the first bare cable 2914 or the second connector 2922 from the coupler element 3002, breaking or tearing the coupler element 3002, releasing or opening the spring-loaded surfaces of the coupler element 3002, and the like.

Although illustrated without a spacer element, it should be understood that a spacer element can optionally be positioned between the first bare cable 2914 and the second connector 2922. For example, the spacer element can define an S-shaped form to provide a separation between the first bare cable 2914 and the second connector 2922, while at least partially wrapping around the second end 2910 of the first cable 2904 and the first end 2918 of the second cable 2906 to limit translation of and/or prevent damage to the first bare cable 2914 and the second connector 2922 within the coupler element 3002.

Figure 53:
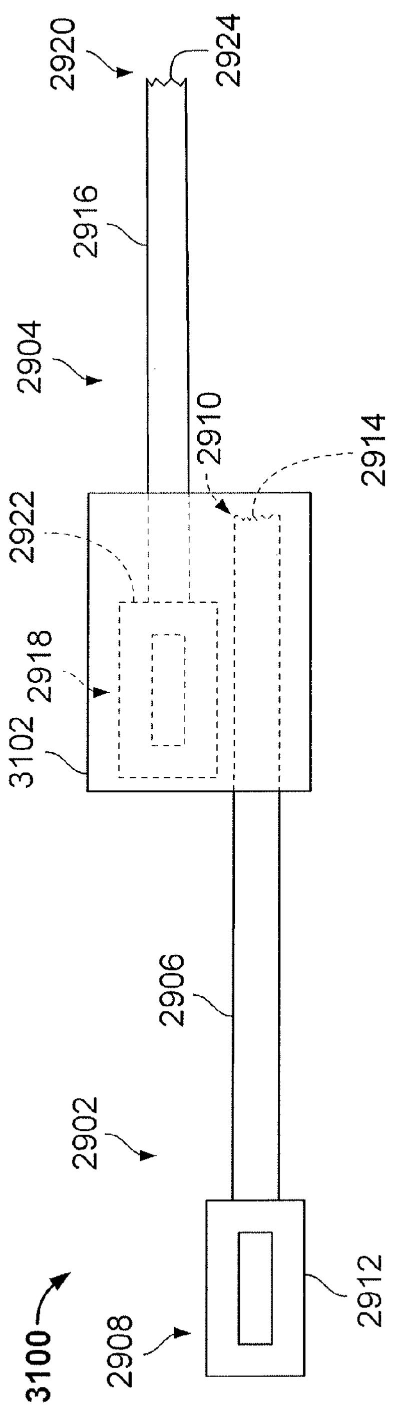
FIG. 53 is a side view of an exemplary cable assembly with a first and second cable in a passing, side-by-side relation according to the present disclosure.

FIG. 53 shows an exemplary cable assembly 3100 which is substantially similar in structure and function to the cable assemblies 2900, 3000 of FIGS. 51 and 52, except for the distinctions noted herein. Therefore, like reference numbers represent like structures. In particular, the coupler element 3102, e.g., a clip coupler, a cover, one or more elongated bands, and the like, can be used to detachably secure the first bare cable 2914 relative to the second connector 2922 in a different orientation. For example, the first cable 2902 and the second cable 2904 can be detachably secured relative to each other by the coupler element 3102 such that the first bare cable 2914 and the second connector 2922 are in a passing, co-planar and side-by-side relation. The coupler element 3102 can, for example, surround, cover and/or encase the first bare cable 2914 and the second connector 2922. In some embodiments, the coupler element 3102 can surround, cover and/or encase portions of the first and second elongated cords 2906, 2916 adjacent to the first bare cable 2914 and/or the second connector 2922.

The passing, co-planar and side-by-side relation can be represented by the side of the first elongated cord 2906 being positioned adjacent to the side of second connector 2922. The first and second cables 2902, 2904 are thereby positioned such that the first and second elongated cords 2906, 2916 are substantially parallel relative to each other. As can be seen from FIG. 53, the passing, co-planar and side-by-side relation can be further represented by the second end 2910 of the first cable 2902 with the first bare cable 2914 passing an area of engagement between the second connector 2922 and the second elongated cord 2916, resulting in the first bare cable 2914 being positioned adjacent to the second elongated cord 2916 and the second connector 2922 being positioned adjacent to the first elongated cord 2906. The first cable 2902 and the second cable 2904 can be detached from the coupler element 3102 (and from each other) by, e.g., pulling the first bare cable 2914 or the second connector 2922 from the coupler element 3102, breaking or tearing the coupler element 3102, releasing or opening the spring-loaded surfaces of the coupler element 3102, and the like.

Although illustrated without a spacer element, it should be understood that a spacer element can optionally be positioned between, e.g., the first bare cable 2914 and the second elongated cord 2916, the second connector 2922 and the first elongated cord 2906, combinations thereof, and the like. For example, the spacer element can define an S-shaped form to provide a separation between the first bare cable 2914, the second connector 2922 and the first and second elongated cords 2906, 2916, while at least partially wrapping around the second end 2910 of the first cable 2904 and the first end 2918 of the second cable 2906 to limit translation of and/or prevent damage to the first bare cable 2914 and the second connector 2922 within the coupler element 3002.

Figure 54:
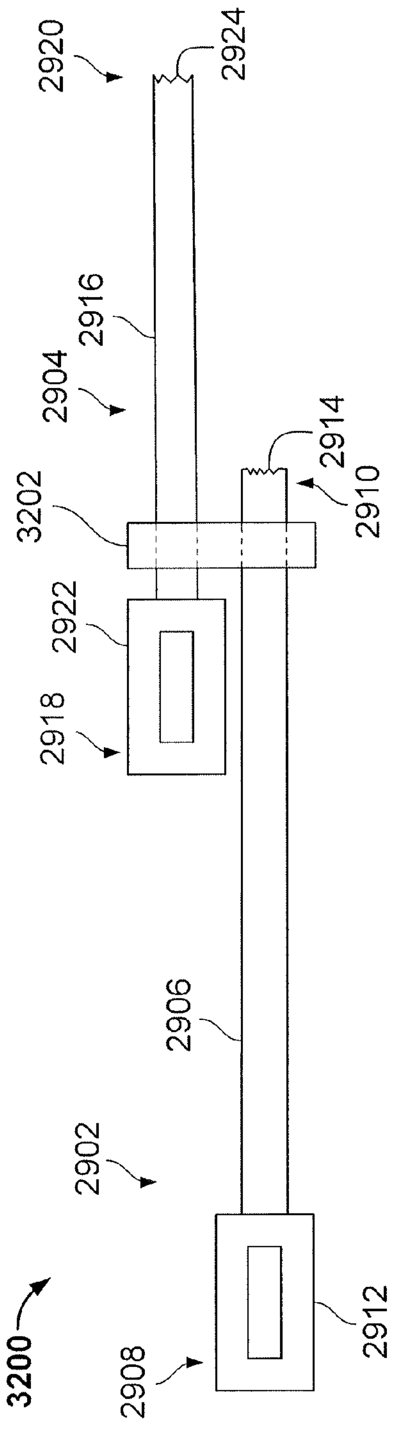
FIG. 54 is a side view of an exemplary cable assembly with a first and second cable in a passing, side-by-side relation according to the present disclosure.

FIG. 54 shows an exemplary cable assembly 3200 which is substantially similar in structure and function to the cable assemblies 2900, 3000, 3100 of FIGS. 51-53, except for the distinctions noted herein. Therefore, like reference numbers represent like structures. In particular, the coupler element 3202, e.g., a clip coupler, a cover, one or more elongated bands, a rubber band, adhesive tape, and the like, can be used to detachably secure the first bare cable 2914 relative to the second connector 2922 in a passing and co-planar orientation. For example, the first cable 2902 and the second cable 2904 can be detachably secured relative to each other by the coupler element 3202 such that the first bare cable 2914 and the second connector 2922 are in a passing and co-planar relation.

As can be seen in FIG. 54, the passing and co-planar relation can be represented by the first bare cable 2914 completely passing the second connector 2922, resulting in the first bare cable 2914 being positioned adjacent to the second elongated cord 2916 and the second connector 2922 being positioned adjacent to the first elongated cord 2906. The first and second cables 2902, 2904 are thereby positioned such that the first and second elongated cords 2906, 2916 are substantially parallel relative to each other. In addition, rather than coupling the first bare cable 2914 and the second connector 2922, the coupler element 3202 detachably couples the first and second elongated cords 2906, 2916. For example, the coupler element 3202 can surround, cover and/or encase a portion of the first and second elongated cords 2906, 2916 between the first and second ends 2908, 2918, 2910, 2920, respectively. Thus, rather than surrounding, covering and/or encasing the first bare end 2914 and the second connector 2922, the coupler element 3202 can detachably secure the first and second cables 2902, 2904 by the first and second elongated cords 2906, 2916. The first cable 2902 and the second cable 2904 can be detached from the coupler element 3202 (and from each other) by, e.g., pulling the first bare cable 2914 or the second connector 2922 from the coupler element 3202, breaking or tearing the coupler element 3202, releasing or opening the spring-loaded surfaces of the coupler element 3202, and the like.

Although illustrated without a spacer element, it should be understood that a spacer element can be positioned between, e.g., the first bare cable 2914 and the second elongated cord 2916, the second connector 2922 and the first elongated cord 2906, combinations thereof, and the like. For example, the spacer element can define an S-shaped form to provide a separation between the first bare cable 2914, the second connector 2922 and the first and second elongated cords 2906, 2916, while at least partially wrapping around the second end 2910 of the first cable 2904 and the first end 2918 of the second cable 2906 to limit translation of and/or prevent damage to the first bare cable 2914 and the second connector 2922 secured by the coupler element 3202.

The exemplary cable assemblies discussed herein generally allow a more cost effective and efficient packaging, organization, removal and/or installation of cables. For example, the cable assemblies discussed herein provide an organized means of packaging cables for future removal and/or installation. Although only two cables 2902 and 2904 are illustrated in FIGS. 51-54, it should be understood that the cable assemblies may be utilized with a plurality of cable pairs and such pairs may be advantageously stacked or otherwise combined for inventory and/or shipping purposes. Thus, rather than removing each cable individually from a sealed package, the cable assemblies allow for a plurality of cables, e.g., patch cords, fiber optic cords, and the like, to be packaged together and individually removed by detaching the desired cable from the coupler element.

In some exemplary embodiments, the cable assemblies described herein can be packaged in bundles, e.g., multiple cable assemblies detachably coupled relative to each other, such that two or more cable assemblies can be dispensed from a housing at one time. In some exemplary embodiments, the housing can be a bag, e.g., a plastic bag, a cloth bag, and the like, configured and dimensioned to package therein at least one cable assembly. The housing configured as a bag can also include at least one opening for paying out the cables of the cable assembly and may include coupler separation features thereon for separating the cables from the coupler elements.

It should be understood that the exemplary cable assemblies discussed herein can be implemented in combination with and/or independently from other cable assemblies and can be packaged for payout in the exemplary housings discussed. Thus, the exemplary cable assemblies, systems and methods facilitate cost effective packaging and/or efficient cable access and installation in the field.

Although the present disclosure has been described with reference to exemplary embodiments and implementations, it is to be understood that the present disclosure is neither limited by nor restricted to such exemplary embodiments and/or implementations. Rather, the present disclosure is susceptible to various modifications, enhancements and variations without departing from the spirit or scope of the present disclosure. Indeed, the present disclosure expressly encompasses such modifications, enhancements and variations as will be readily apparent to persons skilled in the art from the disclosure herein contained.

What is claimed is:

1. A system of patch cord assembly packaging and payout, comprising:

a housing for packaging and payout of a patch cord assembly, and a patch cord assembly removably positioned within the housing, wherein the patch cord assembly includes: (i) at least a first patch cord that includes a first elongated cord and a first plug mounted with respect to one end of said first elongated cord, (ii) at least a second patch cord that includes a second elongated cord and a second plug mounted with respect to one end of said second elongated cord, and (iii) at least a first coupler element for detachably securing the at least first patch cord relative to the at least second patch cord with the first plug and the second plug in a juxtaposed relation; and at least one housing opening for paying out the at least first patch cord, the first elongated cord, the first plug, the at least second patch cord, the second elongated cord, the second plug, and the at least first coupler element.

2. The system of claim 1, wherein the at least one housing opening is configured and dimensioned to prevent the at least first patch cord from receding back into the housing.

3. The system of claim 2, wherein the at least one housing opening includes a slot configured and dimensioned to prevent the at least first patch cord from receding back into the housing.

4. The system of claim 1, wherein the at least first coupler element remover is configured and dimensioned to separate the at least first patch cord, the at least second patch cord and the at least first coupler element.

5. The system of claim 1, wherein a sideways force on the at least first patch cord can detach the at least first patch cord from the at least first coupler element.

6. The system of claim 1, wherein the at least first and second patch cords are continuously reeled within the housing around a rotating core.

7. The system of claim 1, wherein the at least one housing opening includes a seal to prevent damage to the patch cord assembly.

8. The system of claim 7, wherein the seal is connected to the at least first patch cord.

9. The system of claim 1, wherein the housing includes a handle configured and dimensioned to permit lifting of the housing.

10. The system of claim 1, wherein the housing includes a first guiding bracket and a second guiding bracket for guiding the at least first patch cord out of the at least one housing opening.

11. The system of claim 1, further comprising a window for visualizing an interior of the housing.

* * * * *